(12) United States Patent
Wan et al.

(10) Patent No.: US 12,459,939 B2
(45) Date of Patent: Nov. 4, 2025

(54) ACYLAMINOPYRROLO-PYRIDONE COMPOUND, PREPARATION METHOD THEREFOR AND USE THEREOF

(71) Applicant: SHANGHAI RINGENE BIOPHARMA CO., LTD., Shanghai (CN)

(72) Inventors: Huixin Wan, Nantong (CN); Jianfeng Pan, Nantong (CN); Jingui Ma, Nantong (CN)

(73) Assignee: SHANGHAI RINGENE BIOPHARMA CO., LTD., Shanghai (CN)

( * ) Notice: Subject to any disclaimer, the term of this patent is extended or adjusted under 35 U.S.C. 154(b) by 936 days.

(21) Appl. No.: 17/440,040

(22) PCT Filed: Mar. 12, 2020

(86) PCT No.: PCT/CN2020/078963
§ 371 (c)(1),
(2) Date: Sep. 16, 2021

(87) PCT Pub. No.: WO2020/187123
PCT Pub. Date: Sep. 24, 2020

(65) Prior Publication Data
US 2022/0185808 A1 Jun. 16, 2022

(30) Foreign Application Priority Data

Mar. 17, 2019 (CN) .......................... 201910200772.2
Nov. 6, 2019 (CN) .......................... 201911073573.6

(51) Int. Cl.
C07D 471/04 (2006.01)
A61P 35/00 (2006.01)
A61P 35/02 (2006.01)

(52) U.S. Cl.
CPC ............ *C07D 471/04* (2013.01); *A61P 35/00* (2018.01); *A61P 35/02* (2018.01)

(58) Field of Classification Search
CPC ........ C07D 471/04; A61P 35/00; A61P 35/02; A61P 19/02; A61P 17/00; A61P 29/00
See application file for complete search history.

(56) References Cited

FOREIGN PATENT DOCUMENTS

| WO | WO-2014206150 A1 * | 12/2014 | .......... A61K 31/437 |
|----|--------------------|---------|------------------------|
| WO | 2015164480 A1 | 10/2015 | |
| WO | 2020092638 A1 | 10/2019 | |

OTHER PUBLICATIONS

Albers et al. Journal of National Cancer Institute. Nov. 7, 2015;108(2):djv309 1-8 (Year: 2015).*
European Search Report dated Mar. 10, 2023 from European Patent Application No. 20773591.1.
Singapore Office Action dated Apr. 25, 2023 from Singapore Patent Application No. 11202110099Y.
Russian Office Action dated May 31, 2023 from Russian Patent Application No. 2021130056.
First Office Action issued in Canadian Patent Application No. 3,133,131 dated Oct. 20, 2023.
First Office Action issued in Japanese Patent Application No. 2021-556665 dated Dec. 12, 2023.
Partial European Search Report issued in European Patent Application No. 20773591.1 dated Dec. 6, 2022.

* cited by examiner

*Primary Examiner* — Kortney L. Klinkel
*Assistant Examiner* — Richard Grant Peckham
(74) *Attorney, Agent, or Firm* — SZDC Law PC

(57) ABSTRACT

Disclosed are a Acylaminopyrrolo-pyridone represented by general formula I, or a pharmaceutically acceptable salt thereof, or an enantiomer, a diastereomer, a tautomer, a solvate, a polymorph, or a prodrug thereof, a preparation method therefor and use thereof in pharmacy, the definition of each group being as described in the description.

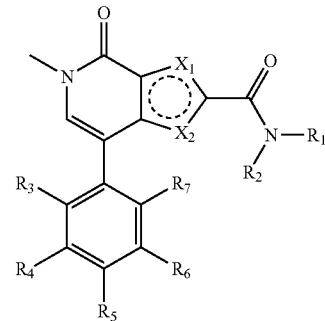

14 Claims, No Drawings

ACYLAMINOPYRROLO-PYRIDONE COMPOUND, PREPARATION METHOD THEREFOR AND USE THEREOF

The present application is the national stage application of PCT/CN2020/078963, filed on Mar. 12, 2020, which claims the priority of the Chinese patent application 201910200772.2 with the filing date of 2019 Mar. 17, and the priority of the Chinese patent application 201911073573.6 with the filing date of 2019 Nov. 6. The present application refers to the full text of the above Chinese patent applications.

TECHNICAL FIELD

The present application belongs to the field of medicinal chemistry, and specifically related to a class of acylaminopyrrolo-pyridone BET-BRD signal pathway inhibitor compound, a preparation method therefor and a use thereof.

PRIOR ART

The abnormality of epigenetic regulation is one of the important factors leading to tumorigenesis. The latest research found that epigenetic abnormalities mediated by BRD protein are closely related to the overexpression of oncogenes, and closely related to the growth and proliferation of cancer cells. BRD4 is a member of the BET protein family, due to its potential value in anti-tumor, it has attracted great attention from major pharmaceutical companies and scientific research institutions.

BET protein, also known as epigenetic recognition protein, can recognize changes in epigenetic information in cell histones and transmit signals that stimulate cell division. Take leukemia as an example, the gene mutation of the BET protein in blood cells can interfere with this signal transmission, causing diseased cells to divide uncontrollably, thereby damaging human tissues and organs. The formation of BRD-NUT fusion proto-oncogene by the translocation of BRD3/BRD4 bromodomain coding region and NUT (nucleoprotein in testis) gene chromatin is the pathogenesis of midline cancer, and it is also the direct evidence that BRD4 protein is involved in tumor pathogenesis. At the same time, studies have also found that in models of hematopoietic cancers including AML, Burkitt lymphoma, multiple myeloma and B-cell acute lymphoblastic leukemia, MYC is directly silenced by interfering with the binding of BRD4 at the MYC site. Since various isomers of MYC are known to be important regulators of cell proliferation and survival, and MYC is a possible oncogene that is overexpressed in many cancers, bromodomain antagonism also provides an opportunity for the first time to target MYC-driven tumors. Recently, it has also been found that BRD4 also plays an important role in the transcriptional regulation of viral genes, and has a certain connection with the pathogenesis of viral tumors. These research results indicate that BRD4 is closely related to a variety of tumors, especially in some tumors that are difficult to cure or have no effective treatment, research on its relationship with tumors provides new strategies for tumor treatment. Targeting therapy of tumor can be achieved by acting on the small molecule compounds of the bromodomain of BRD4 protein, interfering with the specific binding of the bromodomain and acetylated lysine, and affecting the transcriptional regulation and other cellular processes.

Therefore, BRD4 protein is a very promising new epigenetic target, and small molecule inhibitors acting on the bromodomain of BRD4 protein also have broad application prospects in tumor research, and it is possible to develop novel anti-tumor drugs from them. Selective inhibitors of BRD4 protein, such as JQ1 and IBET151 etc., have been reported, and their crystal complexes show that these small molecular inhibitors are bound to acetylated lysine recognition pocket of bromine domain, thus blocking acetylation regulation mediated by bromine domain. The therapeutic effects of these inhibitors in several cancers have been confirmed. At present, most of the known BRD4 protein small molecule inhibitors have few structural types and their selectivity for the bromodomain of BD1 and BD2 is not outstanding enough, which limits people's in-depth research on the biological functions of bromodomain-containing proteins and their anti-tumor potentials. In addition, the effect of existing BRD protein inhibitors needs to be improved and the mechanism needs to be further clarified. Abbv744 of Abbvie is a BRD4-BD2 selective inhibitor with high selectivity and high killing effect on some leukemia and prostate cancer cell lines, at the same time, the ADME property of ABBV744 needs to be further optimized and improved. Therefore, it is a hot spot in epigenetic anti-tumor research to find efficient and selective inhibitors of novel small molecule BRD protein specific BD domain or BRD protein degradation agents.

CONTENT OF THE PRESENT INVENTION

One of the technical problems to be solved by the present disclosure is to provide a novel type of BRD enzyme inhibitor or degrading agent for the preparation of a therapeutic medicament for tumors or inflammatory diseases.

The solutions to the above technical problems are as follows:

An acylaminopyrrolo-pyridone compound represented by general formula I, or a pharmaceutically acceptable salt thereof, or an enantiomer, a diastereomer, a tautomer, a solvate, a polymorph, or a prodrug thereof,

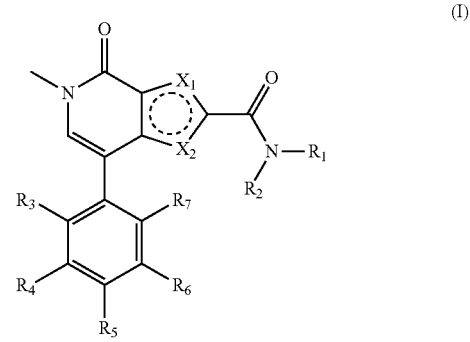

wherein:
R1 is independently selected from hydrogen, C1-C8 alkyl, 3-8 membered cyclohydrocarbyl or heterocycloalkyl, alkoxyalkyl, alkylaminoalkyl, heterocyclylalkyl, arylalkyl, etc.; R2 is independently selected from hydrogen, C1-C6 alkyl;

X1 and X2 are each independently selected from CH or NH;

R3 and R5 are each independently selected from hydrogen, halogen, and C1-C6 alkyl;

R4, R6, and R7 are independently selected from hydrogen, halogen, cyano, nitro, alkenyl, alkynyl, acylamino, ether or thioether, substituted or unsubstituted C1-C6 alkyl, 3-8 membered cyclohydrocarbyl or heterocycloalkyl, 5-10 membered aryl or heteroaryl, alkoxy, substituted or unsubstituted amino, alkylsulfone, alkylsulfoxide, alkylsulphonamino, alkylsulfinylamino, ureido, sulphonylureido, sulfinylureido, etc.;

or R6 and R7 may form a 3-8-membered saturated, unsaturated or partially unsaturated ring system between them through a carbon atom or a heteroatom.

One or more hydrogen atoms on any of the groups may be substituted by the substituents selected from the following group: including but not limited to deuterium, halogen, hydroxyl, amino or cycloamino, cyano, nitro, sulfone or sulfoxide, C1-C8 alkyl, 3-8 membered cycloalkyl or heterocycloalkyl, C1-C8 alkoxy or alkylthio, C1-C8 alkylamino, alkenyl, alkynyl, acyl or sulphonyl, ureido or sulphonylureido, 5-8 membered aryl or heteroaryl; wherein the heteroaryl includes 1-3 heteroatoms selected from the following group: N, O, P or S, and the heterocycloalkyl includes 1-3 heteroatoms selected from the following group: N, O, P or S, and the ring system includes a saturated or partially unsaturated ring system such as spiro ring, bridged ring, condensed ring, and fused ring, etc.

In a further embodiment, the compound represented by general formula (I) or the pharmaceutically acceptable salt thereof, or the enantiomer, the diastereomer, the tautomer, the solvate, the polymorph, or the prodrug thereof, is preferably represented by formula (II):

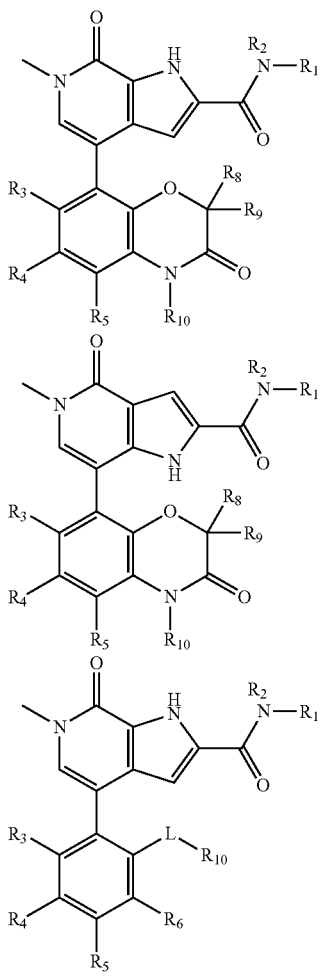

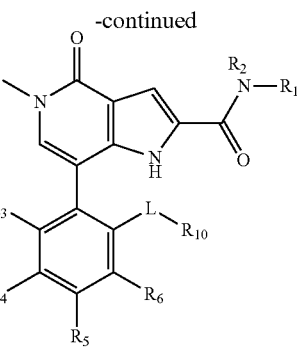

Wherein, R8 and R9 are independently selected from hydrogen, halogen, C1-C6 alkyl, 3-8 membered cycloalkyl or heterocycloalkyl, or R8 together with R9 and the carbon atoms or heteroatoms they are attached to form a 3-8 membered saturated, unsaturated or partially unsaturated ring system; R10 is selected from hydrogen, C1-C10 alkyl, 3-10 membered cycloalkyl or heterocycloalkyl, 5-10 membered aryl or heteroaryl; L is selected from O, S, NH, etc.; and R1, R2, R3, R4, R5, R6 are as defined above.

In a further preferred embodiment, the compound represented by general formula (1) or the pharmaceutically acceptable salt thereof, or the enantiomer, the diastereomer, the tautomer, the solvate, the polymorph, or the prodrug thereof, wherein:

R1 is preferably selected from substituted or unsubstituted C2-C8 alkyl, substituted or unsubstituted 3-8 membered cycloalkyl or heterocycloalkyl; R2 is preferably selected from hydrogen, C1-C6 alkyl; or R1 and R2 form a 4-8 membered nitrogen-containing heterocyclic ring between them; more preferably selected from substituted or unsubstituted ethyl, ethoxyethyl, etc.;

R3, R5 and R6 are each independently selected from hydrogen, fluorine, and C1-C6 alkyl;

R4 is preferably selected from C1-C6 sulfone, C1-C6 sulfonamino, C1-C6 sulfoxide, C1-C6 sulfinylamino, C1-C6 sulphonylimino, and C1-C6 substituted alkyl;

R8 and R9 are each independently preferably selected from hydrogen, C1-C3 alkyl, or form a 3-6 membered ring system with each other;

R10 is preferably selected from hydrogen, C1-C8 alkyl, 3-8 membered cycloalkyl and heterocycloalkyl, 5-8 membered aryl and heteroaryl; further preferably

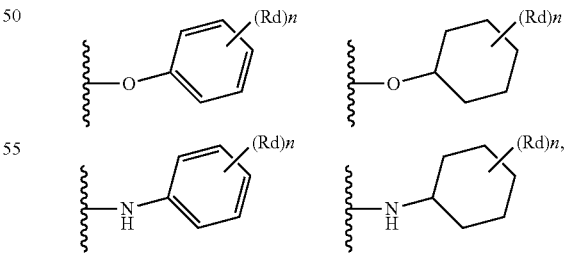

wherein Rd is selected from hydrogen, halogen, cyano, sulfone, sulfoxide, C1-C3 alkyl or alkoxy, and Rd together with benzene ring or cyclohexane ring or another Rd substituent may form a 3-8 membered saturated or partially unsubstituted ring system; n=0-5, preferably 2 or 3.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows,

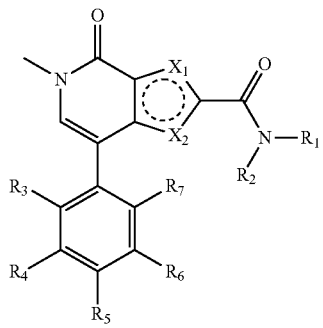

I

Wherein, X1 is CH; X2 is NH;

R1 is hydrogen, C1-C8 alkyl, 3-8 membered cycloalkyl, 3-8 membered heterocycloalkyl, C1-C8 alkyl substituted by 3-8 membered cycloalkyl, C1-C8 alkyl substituted by 3-8 membered heterocycloalkyl or

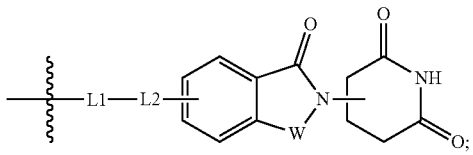

the 3-8 membered heterocycloalkyl in the 3-8 membered heterocycloalkyl and C1-C8 alkyl substituted by 3-8 membered heterocycloalkyl, the heteroatom is selected from one or more of N, O, S, —S(=O)— and —S(=O)$_2$—, the number of the heteroatom is 1, 2 or 3; the C1-C8 alkyl, 3-8 membered cycloalkyl, 3-8 membered heterocycloalkyl, C1-C8 alkyl substituted by 3-8 membered cycloalkyl, or C1-C8 alkyl substituted by 3-8 membered heterocycloalkyl and

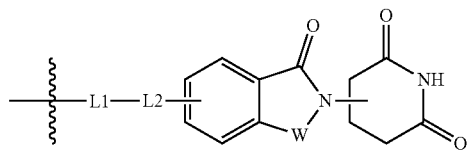

are optionally substituted by one or more substituents, the substituents are independently selected from: halogen, cyano, hydroxyl, =O, C1-C6 alkyl, C1-C6 alkyl-O—, C1-C6 alkyl-(SO$_2$)— and

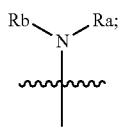

when there are multiple substituents, they are the same or different;

Ra and Rb are independently hydrogen or C1-C8 alkyl;

L1 is a connecting bond, —(C1-C8 alkyl)-, —(C2-C6 alkynyl)-, or —(C1-C6 alkyl)-(CH$_2$OCH$_2$)$_{m1}$—(C1-C6 alkyl)-;

m1 is 1, 2, 3 or 4;

L2 is a connecting bond, —O—,

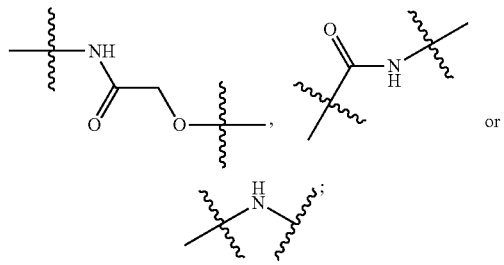

W is —CH$_2$— or —C(O)—;

R2 is hydrogen or C1-C6 alkyl;

or, R1 together with R2 and the N they are attached to form a 3-8 membered heterocycloalkyl or a 3-8 membered heterocycloalkyl substituted by one or more halogens; besides N, the heteroatom in the 3-8 membered heterocycloalkyl and the 3-8 membered heterocycloalkyl substituted by one or more halogens also includes 0 to 2 heteroatoms selected from N, O, S, —S(=O)— and —S(=O)$_2$—; when there are multiple substituents, they are the same or different;

R3 and R5 are each independently hydrogen, halogen or C1-C6 alkyl;

R4, R6 and R7 are independently hydrogen or -L-R10;

L is independently a connecting bond, —O—, —(SO$_2$)— or —(SO$_2$)—NH— (comprising —NH—(SO$_2$)—);

R10 is independently C1-C6 alkyl, 6-10 membered aryl, C1-C6 alkyl substituted by one or more substituents, or 6-10 membered aryl substituted by one or more substituents; the substituents in the C1-C6 alkyl substituted by one or more substituents and the 6-10 membered aryl substituted by one or more substituents are independently halogen, hydroxy, cyano or C1-C6 alkyl; when there are multiple substituents, they are the same or different;

or, R6 together with R7 and the carbon atoms they are attached to form: a 6-membered heterocycloalkyl or a 6-membered heterocycloalkyl substituted by one or more substituents, the heteroatoms in the 6-membered heterocycloalkyl are selected from one or more of N, O, S, —S(=O)— and —S(=O)$_2$—, and the number of the heteroatom is 1, 2 or 3; the substituent is independently C1-C6 alkyl or =O; when the substituents are multiple, they are the same or different.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, R1 is C1-C8 alkyl, 3-8-membered cycloalkyl, 3-8-membered heterocycloalkyl, C1-C8 alkyl substituted by 3-8 membered cycloalkyl or

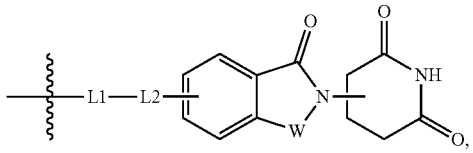

for example, C1-C8 alkyl, 3-8-membered cycloalkyl or

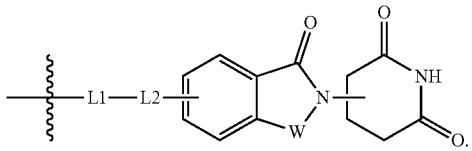

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, R1 is C1-C8 alkyl, 3-8-membered cycloalkyl, 3-8-membered heterocycloalkyl, or C1-C8 alkyl substituted by 3-8 membered heterocycloalkyl, for example, C1-C8 alkyl, or 3-8 membered cycloalkyl.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, R1 is

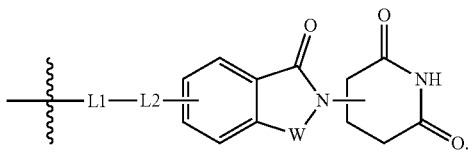

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, m1 is 3.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, L2 is a connecting bond,

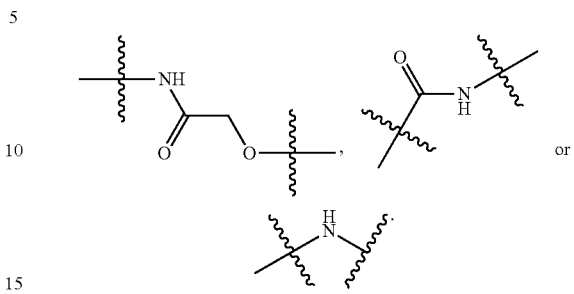

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, R2 is H.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, R1 together with R2 and the N they are attached to form a 3-8 membered heterocycloalkyl or a 3-8 membered heterocycloalkyl substituted by one or more halogens.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, R3 is H.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, R5 is H.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, R6 is H.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, L is independently a connecting bond, —O— or —(SO$_2$)—, for example a connecting bond or —(SO$_2$)—.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows,
L is independently —O—.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows,
R10 is independently C1-C6 alkyl, C1-C6 alkyl substituted by one or more substituents.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows,
R10 is independently 6-10 membered aryl, or 6-10 membered aryl substituted by one or more substituents.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows,
R4 is H or -L-R10, for example -L-R10, for another example L is a connecting bond or —(SO$_2$)—, and/or, R10 is independently C1-C6 alkyl, C1-C6 alkyl substituted by one or more substituents.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows,
R7 is H or -L-R10, for example -L-R10, for another example L is —O—, and/or, R10 is independently 6-10 membered aryl, or 6-10 membered aryl substituted by one or more substituents.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows,
R6 together with R7 and the carbon atom they are attached to form: a 6 membered heterocycloalkyl or a 6 membered heterocycloalkyl substituted by one or more substituents.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows,
In R1, the substituents are independently selected from halogen, cyano, hydroxyl, =O, C1-C6 alkyl, C1-C6 alkyl-O— and C1-C6 alkyl-(SO$_2$)—; for example, halogen, cyano, C1-C6 alkyl, C1-C6 alkyl-O— and C1-C6 alkyl-(SO$_2$)—.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows,
When R1 is C1-C8 alkyl and the C1-C8 alkyl is substituted by one or more substituents, the substituents are selected from halogen, cyano, C1-C6 alkyl, C1-C6 alkyl-O— and C1-C6 alkyl-(SO$_2$)—.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows,
When R1 is 3-8 membered cycloalkyl, C1-C8 alkyl substituted by 3-8-membered cycloalkyl, the 3-8-membered cycloalkyl and the C1-C8 alkyl substituted by 3-8-membered cycloalkyl are independently substituted by one or more substituents, the substituents are selected from halogen, hydroxyl, cyano, C1-C6 alkyl, C1-C6 alkyl-O— and C1-C6 alkyl-(SO$_2$)—; for example, halogen, C1-C6 alkyl or hydroxyl, and for another example halogen.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows,
When R1 is C1-C8 alkyl substituted by 3-8 membered cycloalkyl, and the C1-C8 alkyl substituted by 3-8 membered cycloalkyl is substituted by one or more substituents, the substituents are selected from halogen, hydroxyl, cyano, C1-C6 alkyl, C1-C6 alkyl-O— and C1-C6 alkyl-(SO$_2$)—; for example, halogen or hydroxyl, for another example halogen.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows,

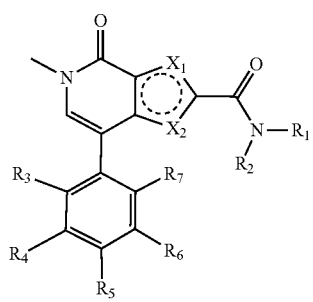

I

Wherein, X1 is CH; X2 is NH;
R1 is C1-C8 alkyl, 3-8 membered cycloalkyl, 3-8 membered heterocycloalkyl, C1-C8 alkyl substituted by 3-8 membered cycloalkyl or

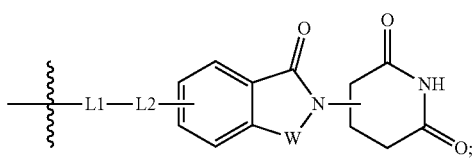

in the 3-8 membered heterocycloalkyl, the heteroatom is selected from one or more of N, O, S, —S(=O)— and —S(=O)$_2$—, the number of the heteroatom is 1, 2 or 3; the C1-C8 alkyl, 3-8 membered cycloalkyl, C1-C8 alkyl substituted by 3-8 membered cycloalkyl and

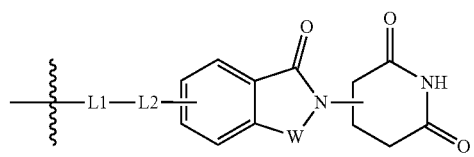

are optionally substituted by one or more substituents, the substituents are independently selected from: halogen, cyano, hydroxyl, =O, C1-C6 alkyl, C1-C6 alkyl-O—, and C1-C6 alkyl-(SO$_2$)—; when there are multiple substituents, they are the same or different;

L1 is a connecting bond, —(C1-C8 alkyl)-, —(C2-C6 alkynyl)-, —(C1-C6 alkyl)-(CH$_2$OCH$_2$)$_{m1}$—(C1-C6 alkyl)-;

m1 is 1, 2, 3 or 4;

L2 is a connecting bond,

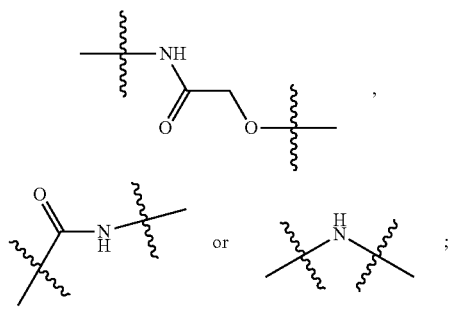

W is —CH$_2$— or —C(O)—;

R2 is H;

or, R1 together with R2 and the N they are attached to form a 3-8 membered heterocycloalkyl or a 3-8 membered heterocycloalkyl substituted by one or more halogens; besides N, the heteroatom in the 3-8 membered heterocycloalkyl and the 3-8 membered heterocycloalkyl substituted by one or more halogens includes 0 to 2 heteroatoms selected from N, O, S, —S(=O)— and —S(=O)$_2$—; when there are multiple substituents, they are the same or different;

R3 and R5 are each independently hydrogen, halogen or C1-C6 alkyl;

R6 is H;

R4 and R7 are independently hydrogen or -L-R10;

L is a connecting bond, —O— or —(SO$_2$)—;

R10 is independently C1-C6 alkyl, 6-10 membered aryl, C1-C6 alkyl substituted by one or more substituents, or 6 to 10-membered aryl substituted by one or more substituents; the substituents in the C1-C6 alkyl substituted by one or more substituents and the 6-10 membered aryl substituted by one or more substituents are independently halogen, hydroxy, cyano or C1-C6 alkyl; when there are multiple substituents, they are the same or different;

or, R6 together with R7 and the carbon atoms they are attached to form: a 6 membered heterocycloalkyl or a 6 membered heterocycloalkyl substituted by one or more substituents, the substituents are independently selected from C1-C6 alkyl or =O.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, X1 is CH; X2 is NH;

R1 is C1-C8 alkyl and 3-8-membered cycloalkyl; the C1-C8 alkyl and 3-8 membered cycloalkyl are optionally substituted by one or more substituents;

R2, R3, R5 and R6 are each independently hydrogen;

R4 and R7 are independently hydrogen or -L-R10;

or, R6 together with R7 and the carbon atoms they are attached to form: a 6 membered heterocycloalkyl or a 6 membered heterocycloalkyl substituted by one or more substituents, the substituents are selected from C1-C6 alkyl or =O.

Preferably,

R4 is C1-C6 alkyl or C1-C6 alkyl substituted by one or more substituents;

R7 is -L-R10; L is —O—; R10 is 6-10 membered aryl, or 6-10 membered aryl substituted by one or more substituents.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, X1 is CH; X2 is NH;

R1 is C1-C8 alkyl or

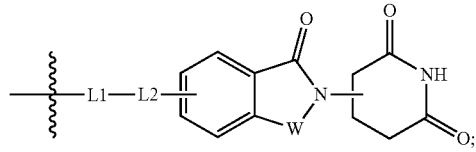

R2, R3, R5 and R6 are each independently hydrogen;

R4 and R7 are independently hydrogen or -L-R10;

or, R6 together with R7 and the carbon atoms they are attached to form: a 6 membered heterocycloalkyl or a 6 membered heterocycloalkyl substituted by one or more substituents, the substituents are selected from C1-C6 alkyl or =O.

Preferably, R1 is

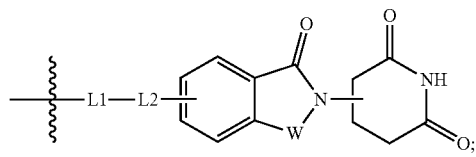

R4 is -L-R10, L is a connecting bond or —(SO$_2$)—; R10 is C1-C6 alkyl, or C1-C6 alkyl substituted by one or more substituents;

R7 is -L-R10; L is —O—; R10 is 6-10 membered aryl, or 6-10 membered aryl substituted by one or more substituents;

or, R6 together with R7 and the carbon atom they are attached to form: a 6 membered heterocycloalkyl or a 6 membered heterocycloalkyl substituted by one or more substituents, the substituents are selected from C1-C6 alkyl or =O;

Preferably, L1 is a connecting bond;

L2 is

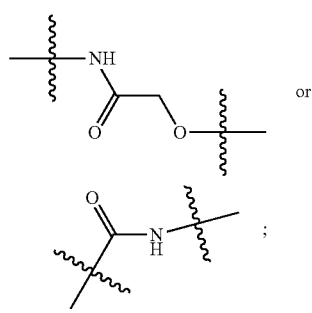

or

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, When R1 is C1-C8 alkyl, C1-C8 alkyl substituted by 3-8-membered cycloalkyl or C1-C8 alkyl substituted by 3-8-membered heterocycloalkyl, the C1-C8 alkyl in the C1-C8 alkyl, C1-C8 alkyl substituted by 3-8-membered cycloalkyl and C1-C8 alkyl substituted by 3-8-membered heterocycloalkyl is independently C1-C4 alkyl, for example methyl, ethyl, n-propyl, isopropyl, n-butyl, isobutyl, sec-butyl or tert-butyl; for another example, methyl, ethyl or isopropyl.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, When R1 is 3-8 membered cycloalkyl or C1-C8 alkyl substituted by 3-8 membered cycloalkyl, the 3-8 membered cycloalkyl in the 3-8 membered cycloalkyl or the C1-C8 alkyl substituted by 3-8 membered cycloalkyl is independently 3-6 membered cycloalkyl, for example cyclopropyl, cyclobutyl, cyclopentyl and cyclohexyl; for another example, cyclopropyl, cyclobutyl or cyclopentyl.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, When R1 is 3-8 membered heterocycloalkyl or C1-C8 alkyl substituted by 3-8 membered heterocycloalkyl, the 3-8 membered heterocycloalkyl in the 3-8 membered heterocycloalkyl or C1-C8 alkyl substituted by 3-8 membered heterocycloalkyl is independently 3-6 membered heterocycloalkyl, wherein the heteroatom is selected from one or more of N, O and S, the number of the heteroatom is 1 or 2; for example

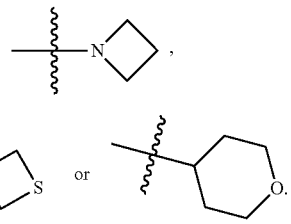

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, When the substituent in R1 is C1-C6 alkyl, C1-C6 alkyl-O— or C1-C6 alkyl-(SO$_2$)—, the C1-C6 alkyl in the C1-C6 alkyl, the C1-C6 alkyl-O— and the C1-C6 alkyl-(SO$_2$)— is independently C1-C4 alkyl, for example, methyl, ethyl, n-propyl, isopropyl, n-butyl, isobutyl, sec-butyl or tert-butyl; for another example, methyl or ethyl.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, When Ra and/or Rb are independently C1-C8 alkyl, the C1-C8 alkyl is independently C1-C6 alkyl, for example methyl, ethyl, n-propyl, isopropyl, n-butyl, isobutyl, sec-butyl, tert-butyl, n-pentyl or n-hexyl; for another example, methyl.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, When L1 is —(C1-C8 alkyl)-, the C1-C8 alkyl is C1-C6 alkyl, for example methyl, ethyl, n-propyl, isopropyl, n-butyl, isobutyl, sec-butyl, tert-butyl, n-pentyl or n-hexyl; for another example, n-butyl, n-pentyl or n-hexyl.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, When L1 is —(C2-C6 alkynyl)-, the C2-C6 alkynyl is ethynyl, prop-1-ynyl

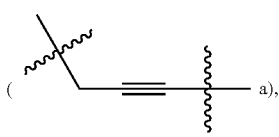

but-1-ynyl

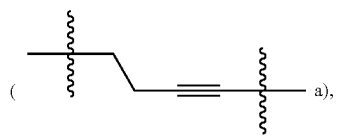

or pent-4-ynyl

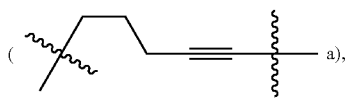

for another example

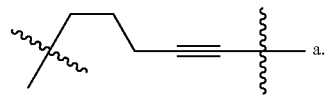

Wherein, the terminal a means that it is connected to L2.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, When L1 is —(C1-C6 alkyl)-(CH$_2$OCH$_2$)$_{m1}$—(C1-C6 alkyl)-, the C1-C6 alkyl is independently C1-C4 alkyl, for example methyl, ethyl, n-propyl, isopropyl, n-butyl, isobutyl, sec-butyl or tert-butyl; for another example, methyl, ethyl or n-propyl.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, m1 is 3 or 3.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, When R2 is C1-C6 alkyl group, the C1-C6 alkyl is C1-C4 alkyl, for example methyl, ethyl, n-propyl, isopropyl, n-butyl, isobutyl, sec-butyl or tert-butyl; for another example, methyl, ethyl or isopropyl.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when R1 together with R2 and the N they are attached to form a 3-8 membered heterocycloalkyl or a 3-8 membered heterocycloalkyl substituted by one or more halogens; the 3-8 membered heterocycloalkyl in the 3-8 membered heterocycloalkyl or the 3-8 membered heterocycloalkyl substituted by one or more halogens is independently 3-6 membered heterocycloalkyl, wherein the heteroatom is the N; for example

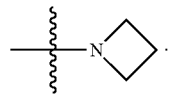 [SMILES: *N1CCC1]

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, When R10 is independently C1-C6 alkyl or C1-C6 alkyl substituted by one or more substituents, the C1-C6 alkyl is independently C1-C4 alkyl, for example methyl, ethyl, n-propyl, isopropyl, n-butyl, isobutyl, sec-butyl or tert-butyl; for another example, methyl or ethyl.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, When R10 is independently 6 to 10 membered aryl or 6 to 10 membered aryl substituted by one or more substituents, the 6 to 10 membered aryl in the 6 to 10 membered aryl or the 6 to 10 membered aryl substituted by one or more substituents is independently phenyl or naphthyl.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, When the substituent in R10 is C1-C6 alkyl, the substituent is independently C1-C4 alkyl, for example methyl, ethyl, n-propyl, isopropyl, n-butyl, isobutyl, sec-butyl or tert-butyl; for another example, methyl or ethyl.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when R6 together with R7 and the carbon atoms they are attached to form a 6 membered heterocycloalkyl or a 6 membered heterocycloalkyl substituted by one or more substituents; the 6 membered heterocycloalkyl in the 6 membered heterocycloalkyl or the 6 membered heterocycloalkyl substituted by one or more substituents is independently

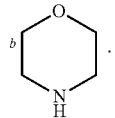

The terminal b means that it is connected to the benzene ring by a fused ring.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, When R6 together with R7 and the carbon atoms they are attached to form: a 6 membered heterocycloalkyl or a 6 membered heterocycloalkyl substituted by one or more substituents, when the substituents are C1-C6 alkyl, the C1-C6 alkyl is C1-C4 alkyl, for example methyl, ethyl, n-propyl, isopropyl, n-butyl, isobutyl, sec-butyl or tert-butyl; for another example, methyl or ethyl.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, L1 is

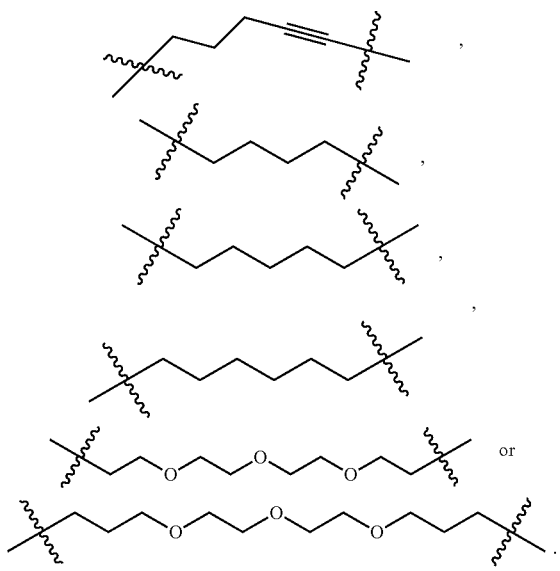

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, -L1-L2- is

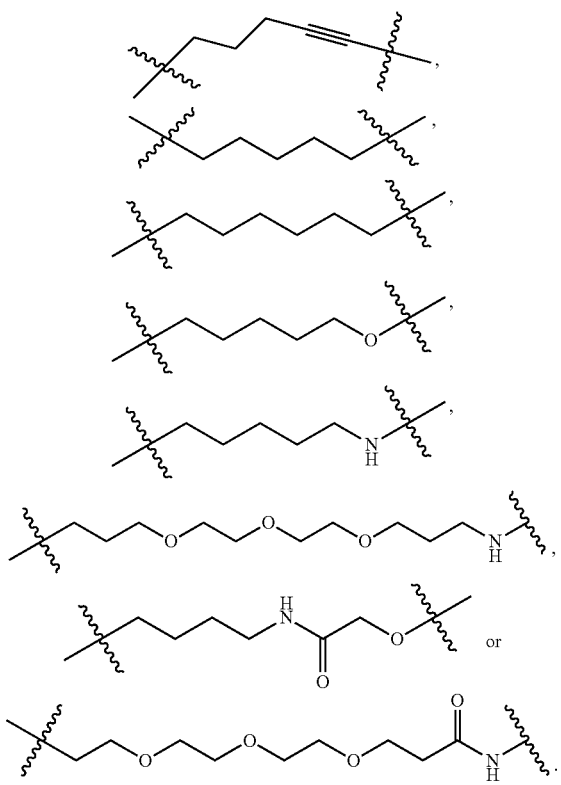

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows,

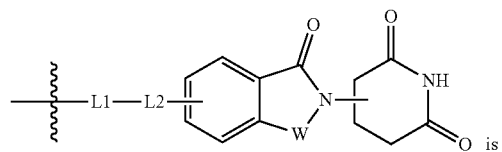

is

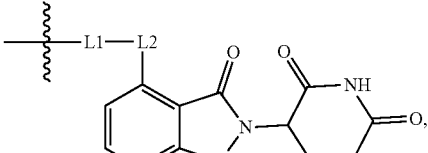

for example

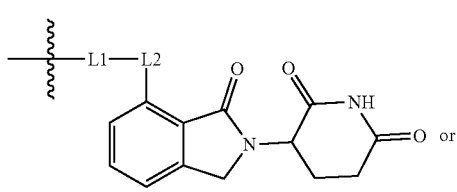

or

-continued

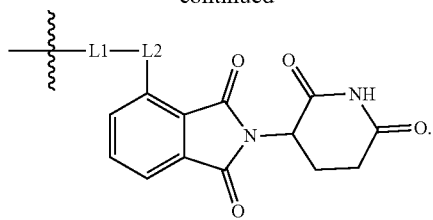

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when R1 is C1-C8 alkyl or C1-C8 alkyl substituted by one or more substituents, for example, ethyl, isopropyl,

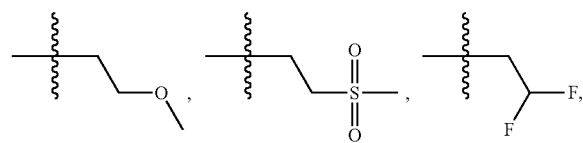

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when R1 is 3-8 membered cycloalkyl, or 3-8 membered cycloalkyl substituted by one or more substituents, for example cyclopropyl, cyclopentyl,

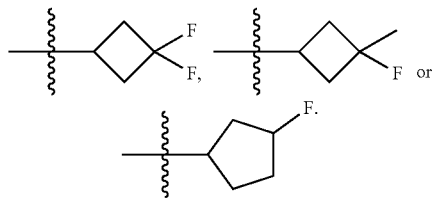

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when R1 is 3-8 membered heterocycloalkyl or 3-8 membered heterocycloalkyl substituted by one or more substituents, for example,

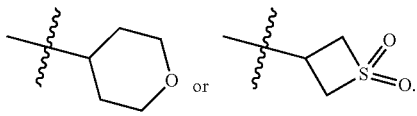 [SMILES: *C1CCOCC1 ; "or" ; *C1CS(=O)(=O)C1]

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when R1 is C1-C8 alkyl substituted by 3-8 membered cycloalkyl, or C1-C8 alkyl substituted by one or more 3-8 membered cycloalkyl, for example

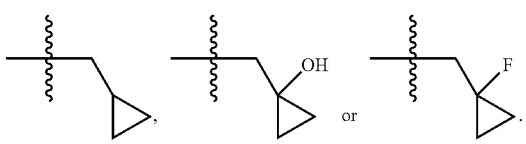 [SMILES: *CC1CC1 ; *CC1(O)CC1 ; *CC1(F)CC1]

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when R1 is

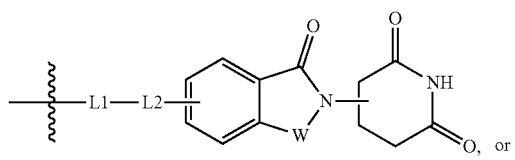

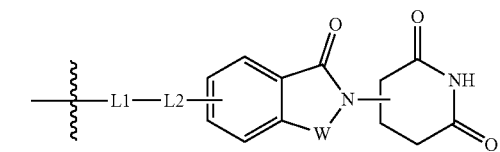

substituted by one or more substituents, for example
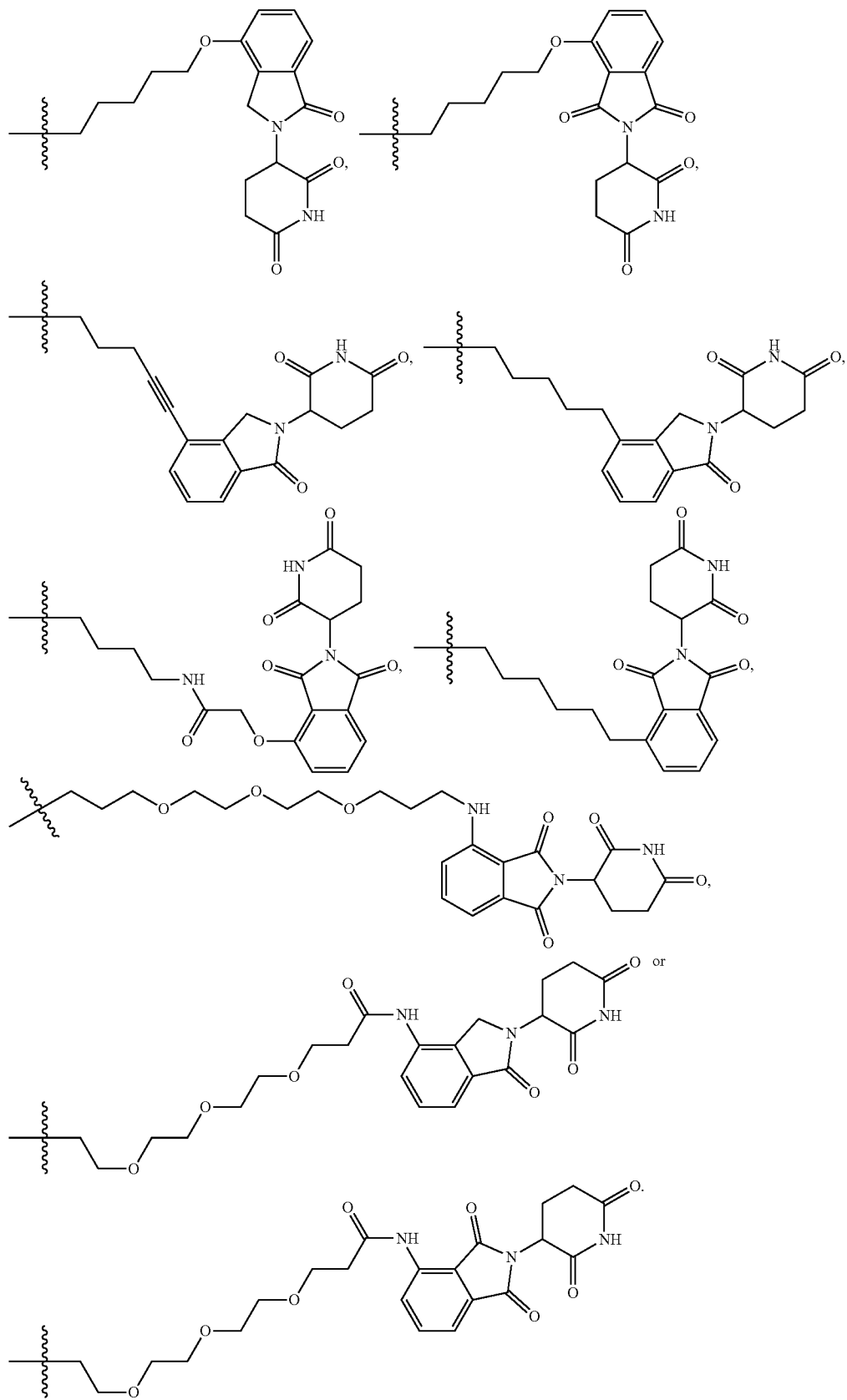

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when R1 together with R2 and the N they are attached to form a 3-8 membered heterocycloalkyl or a 3-8 membered heterocycloalkyl substituted by one or more halogens,

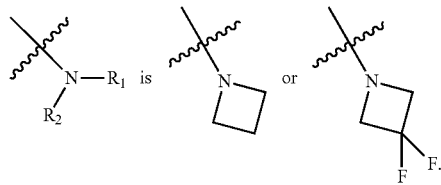

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when R4 is -L-R10, L is independently a connecting bond, and/or, R10 is independently C1-C6 alkyl or C1-C6 alkyl substituted by one or more substituents, for example

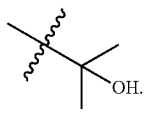 [SMILES: *C(C)(C)O]

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when R4 is -L-R10, L is independently —(SO$_2$)—, and/or R10 is independently C1-C6 alkyl, or C1-C6 alkyl substituted by one or more substituents, for example

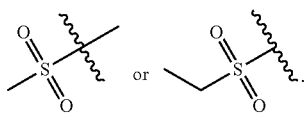

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when R4 is -L-R10, L is independently —(SO$_2$)—NH—, and/or, R10 is independently C1-C6 alkyl or C1-C6 alkyl substituted by one or more substituents, for example

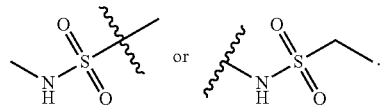

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when R10 is independently 6-10 membered aryl substituted by one or more substituents, for example

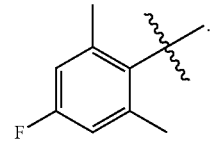

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when R7 is —O—R10, for example

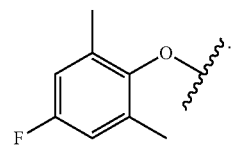

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, the acylaminopyrrolo-pyridone compound represented by formula I is as shown in formula II-1 or II-2:

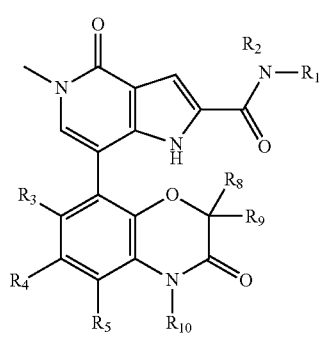

II-1

-continued

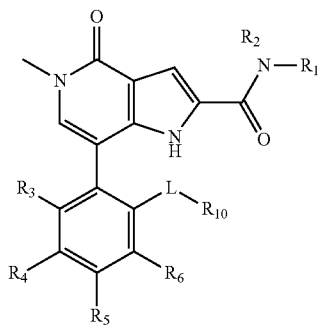

II-2 wherein, R1, R2, R3, R4, R5, R6, L and R10 are as defined above; R8 and R9 are independently C1-C6 alkyl (the definition is the same as R6 together with R7 and the carbon atom they are attached to form: a 6 membered heterocycloalkyl or a 6 membered heterocycloalkyl substituted by one or more substituents, the substituents are selected from C1-C6 alkyl);

preferably, the acylaminopyrrolo-pyridone compound represented by formula I is as shown in formula II-1' or II-2':

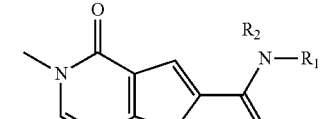

II-1'

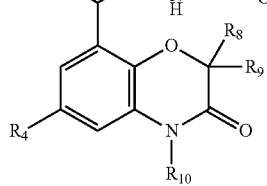

II-2'

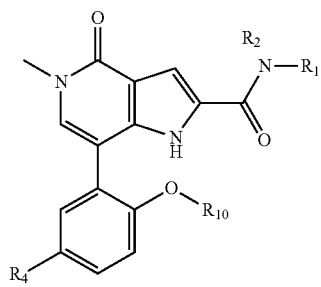

Wherein, R1, R2, R4, R8 and R9 are as defined above;

in formula II-1', R10 is C1-C6 alkyl or C1-C6 alkyl substituted by one or more substituents;

in II-2', R10 is independently 6-10 membered aryl, or 6-10 membered aryl substituted by one or more substituents.

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when R6 together with R7 and the carbon atoms they are attached to form: a 6 membered heterocycloalkyl or a 6 membered heterocycloalkyl substituted by one or more substituents,

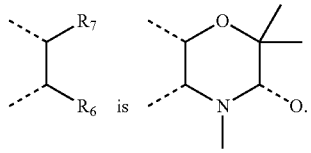 is

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when

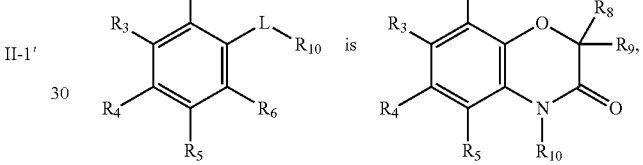

for example

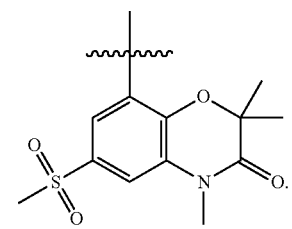

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, when

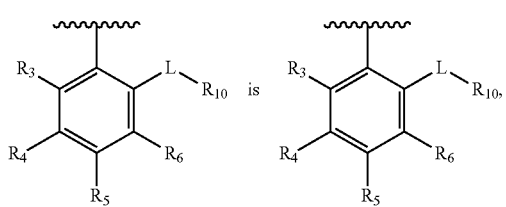

for example

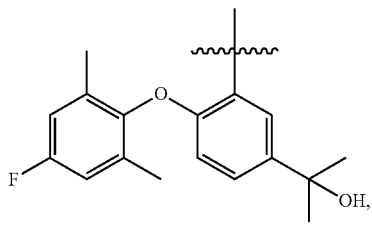

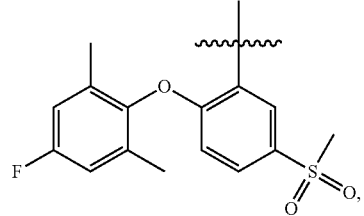

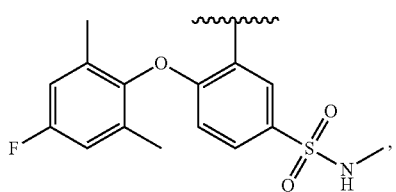

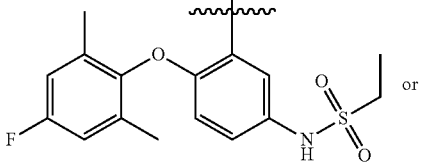

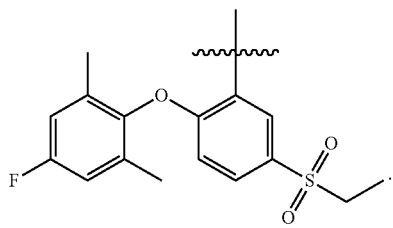

In some preferred embodiments of the present disclosure, some groups (undefined groups are as described in any embodiment of the present disclosure) in the acylaminopyrrolo-pyridone compound represented by general formula I, or the pharmaceutically acceptable salt thereof, or the enantiomer, the diastereomer, the tautomer, the solvate, the polymorph, or the prodrug thereof, are as defined as follows, the acylaminopyrrolo-pyridone compound represented by formula I is selected from any one of the structures as follows:

1

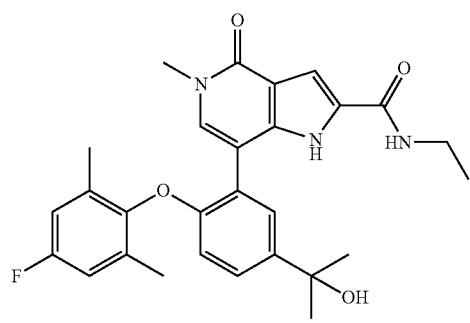

2

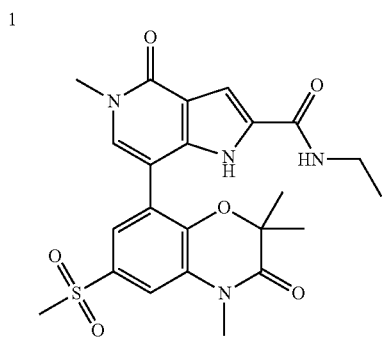

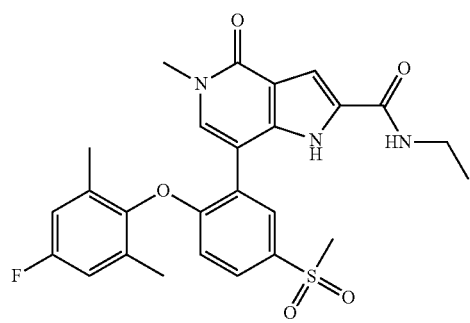

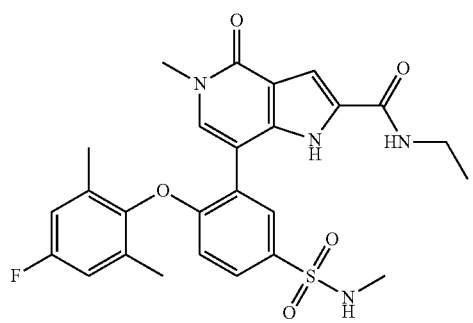

-continued
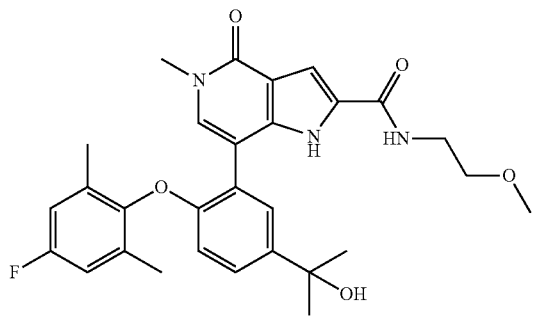
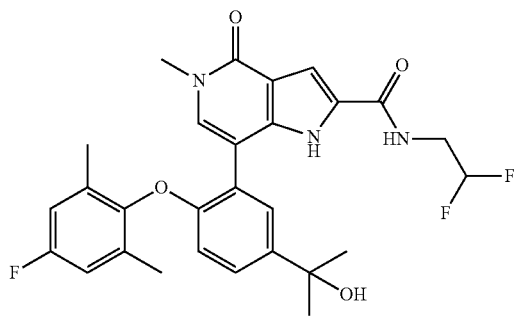
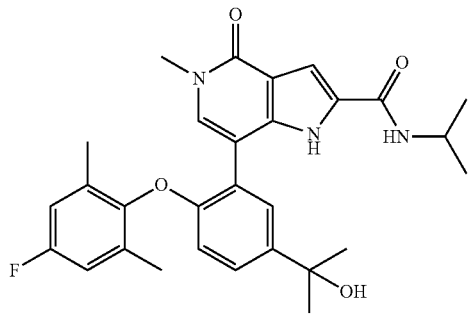
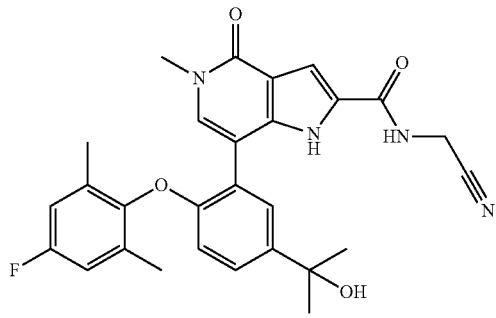
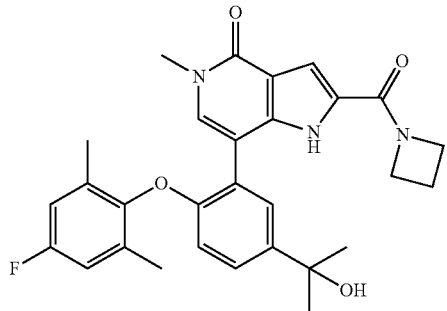

-continued
| 31 | 32 |
|---|---|
| 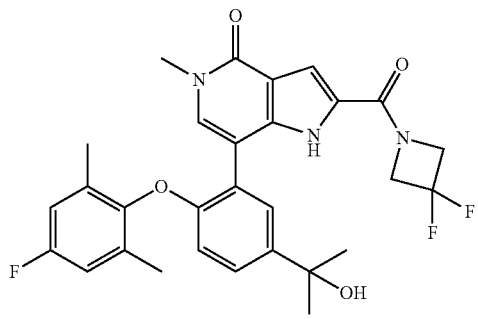 | 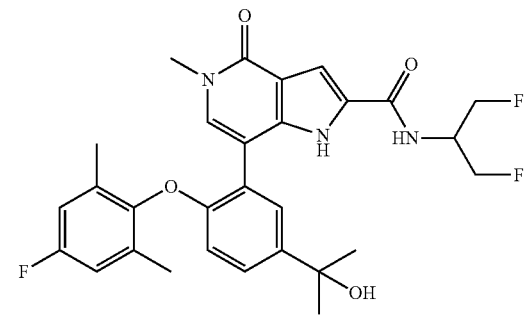 |
| 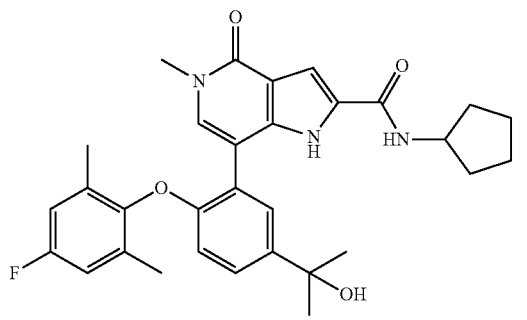 | 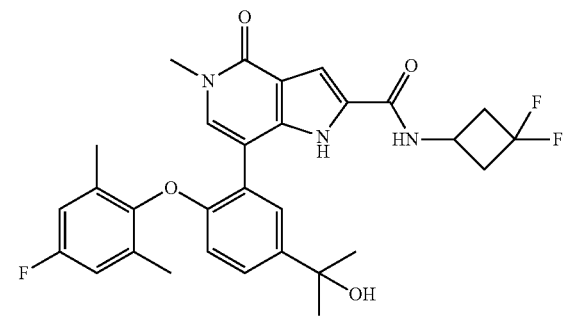 |
| 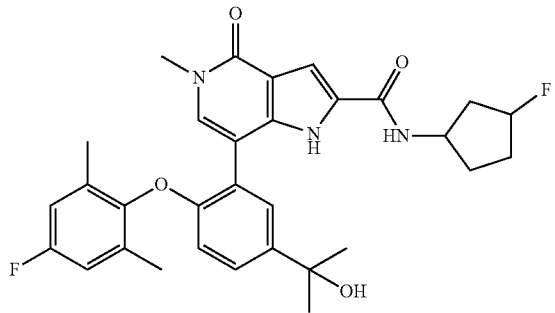 | 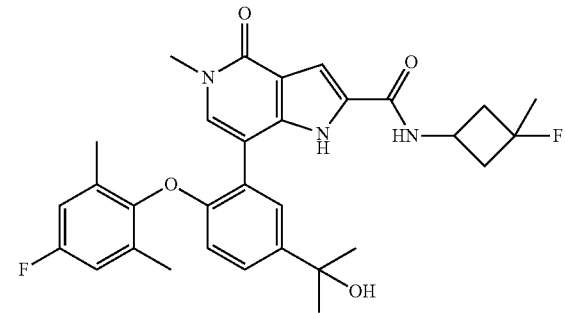 |
| 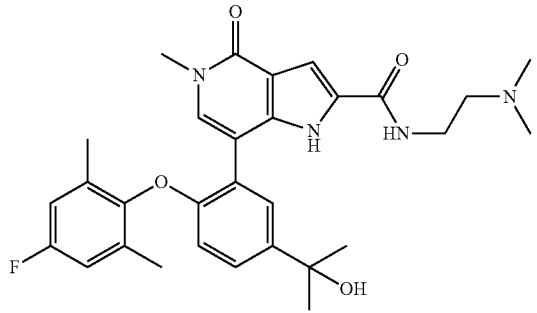 | 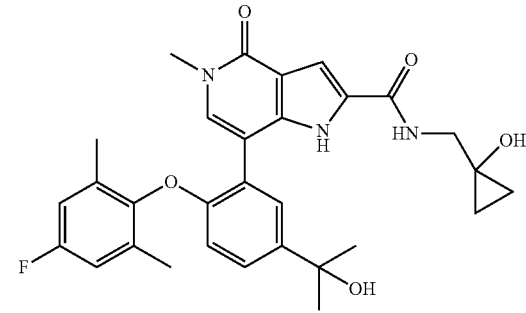 |
| 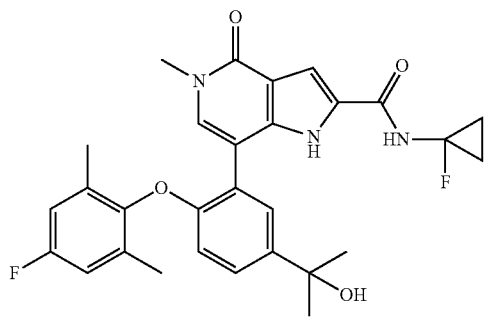 | 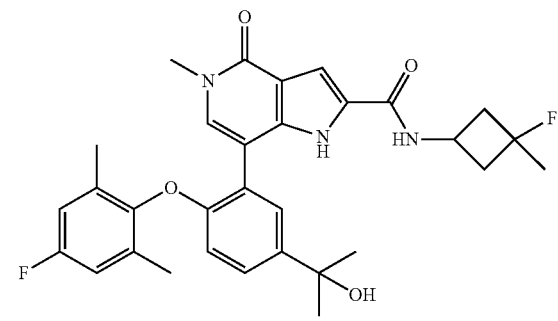 |

33
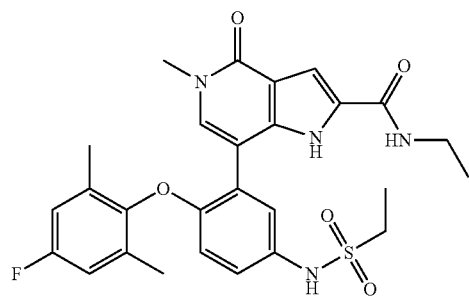
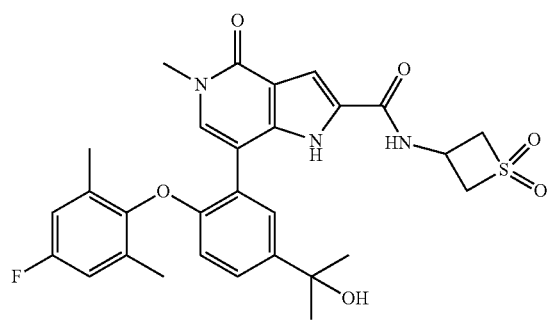
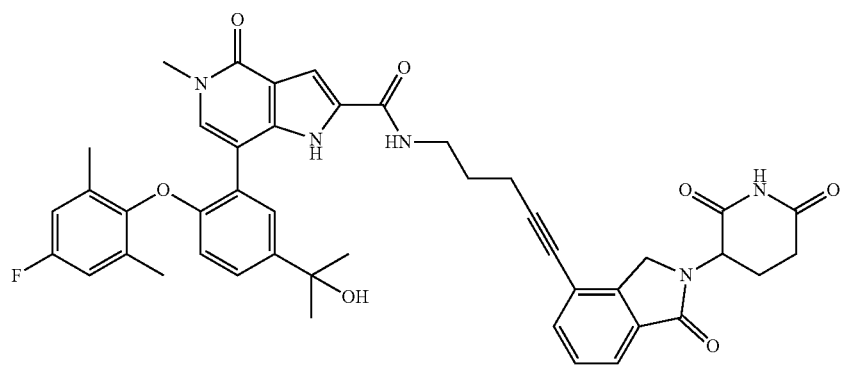
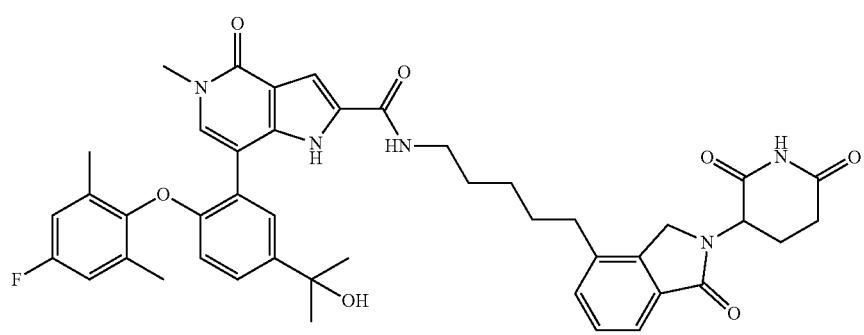
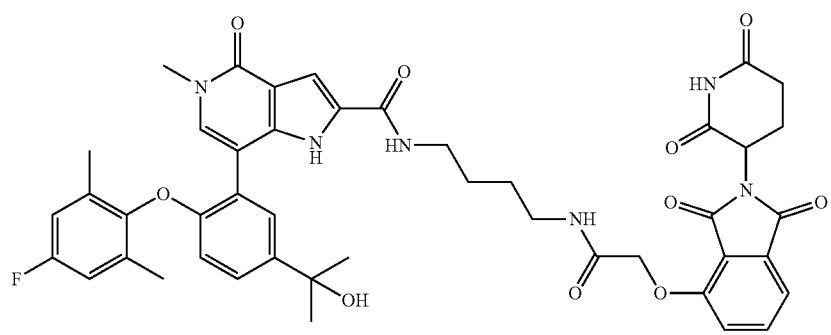
34
-continued
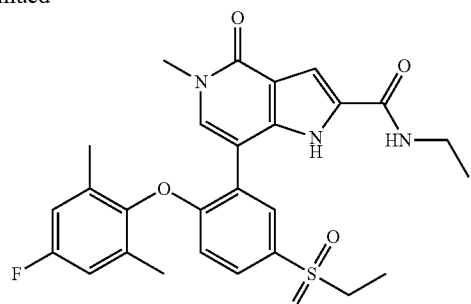
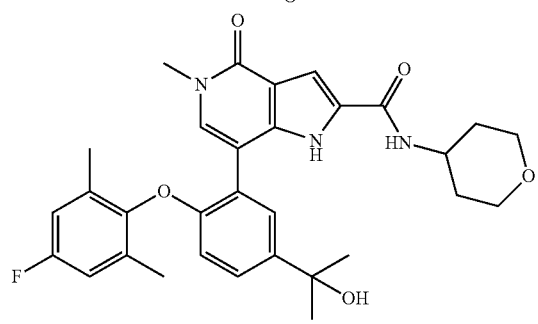

-continued
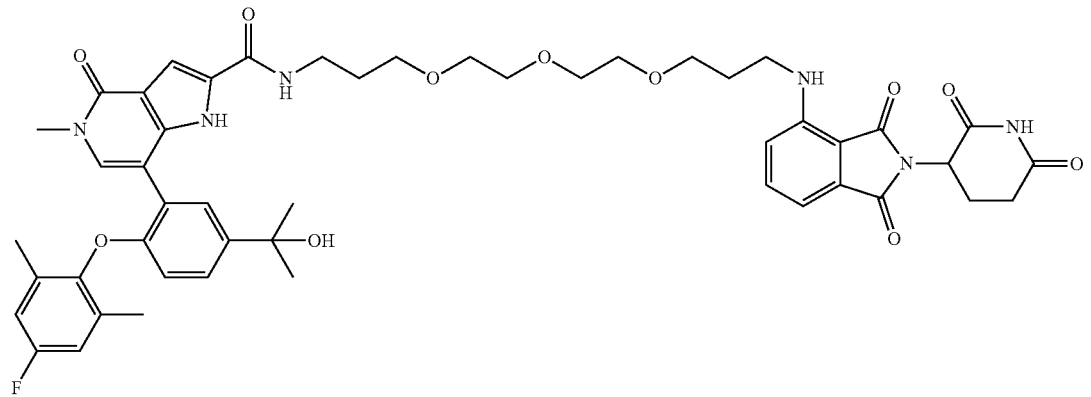
6
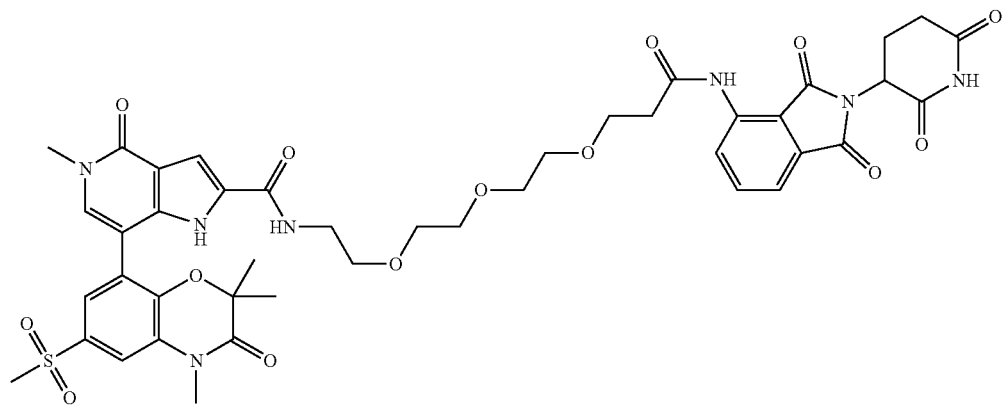
7
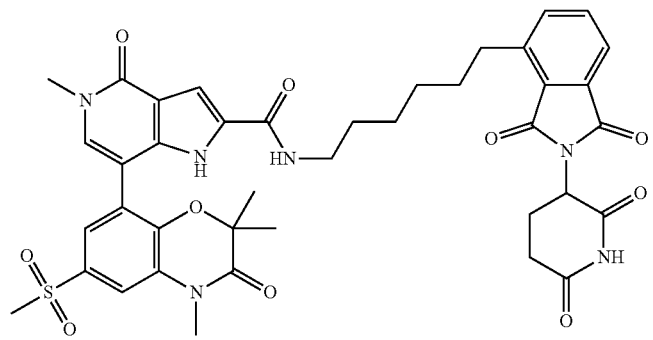
8
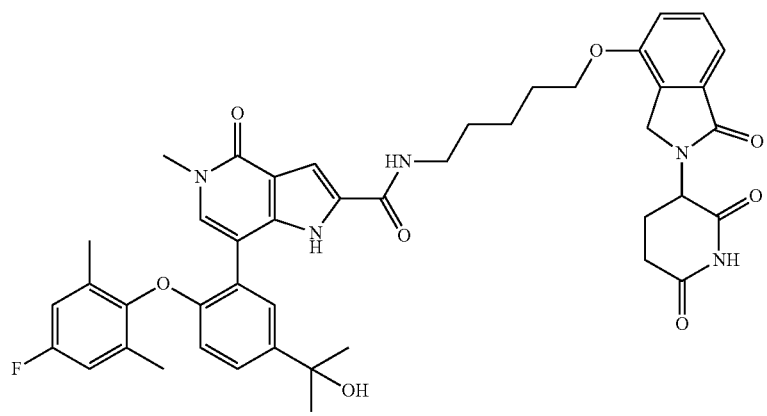

-continued
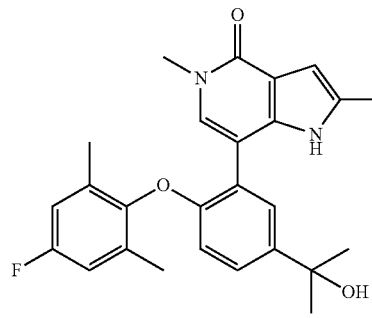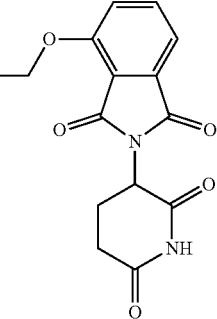
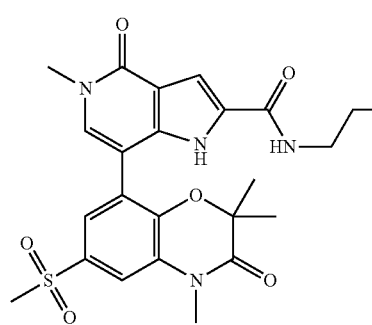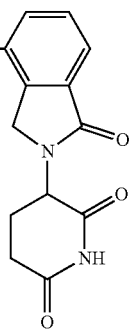
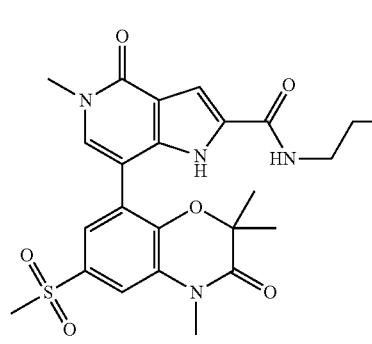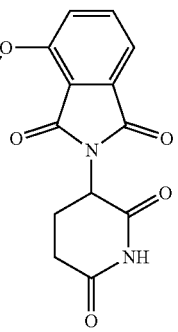
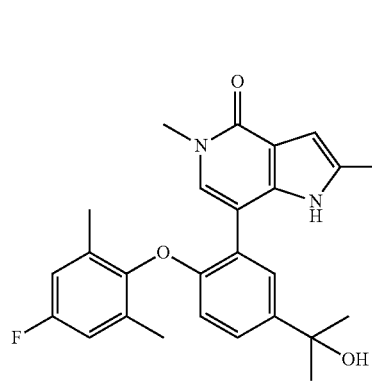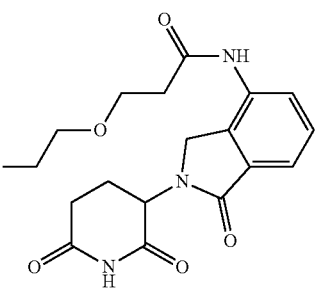

-continued

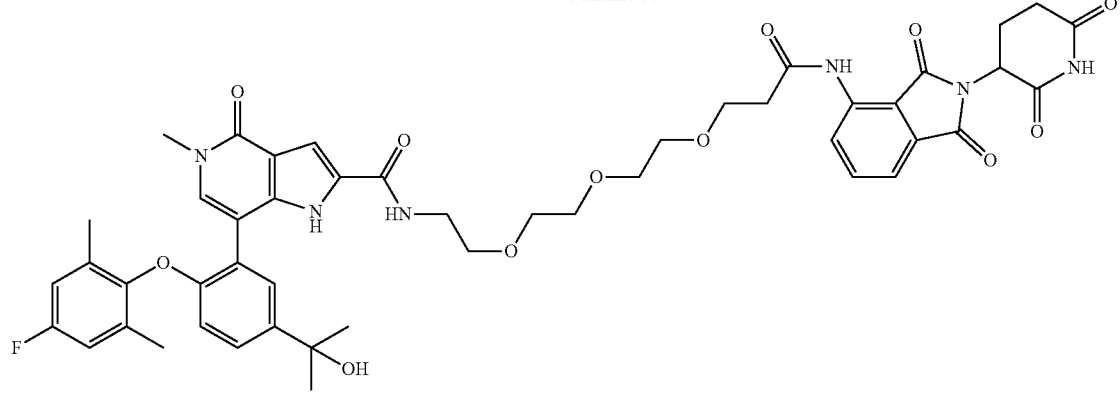

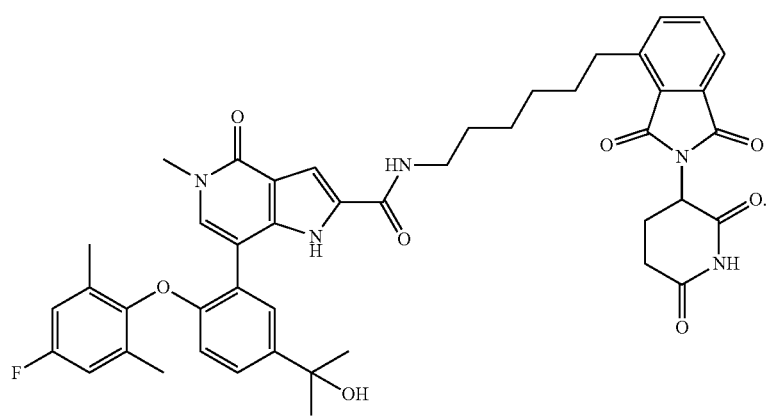

A preparation method of the compound represented by formula I, wherein, the method comprises steps a-c:

a) transforming a compound represented by general formula (A) and a compound represented by general formula (B) into a compound represented by general formula (C) by a metal-catalyzed coupling reaction; and b) hydrolyzing the compound represented by general formula (C) into an intermediate compound represented by general formula (D) under alkaline conditions; and c) condensing the intermediate compound represented by general (D) with R1R2NH under the conditions of a condensation reagent to obtain the compound represented by general formula (I);

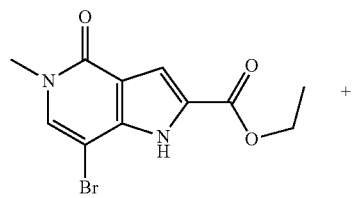

A

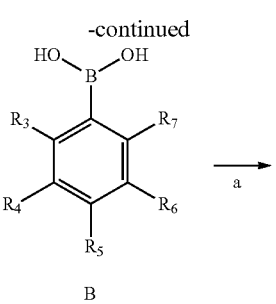

B

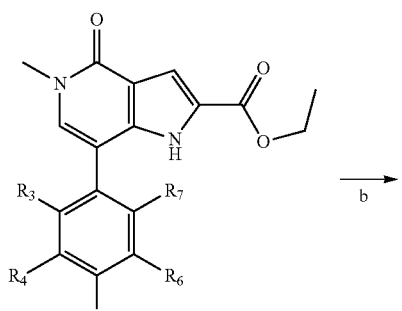

C

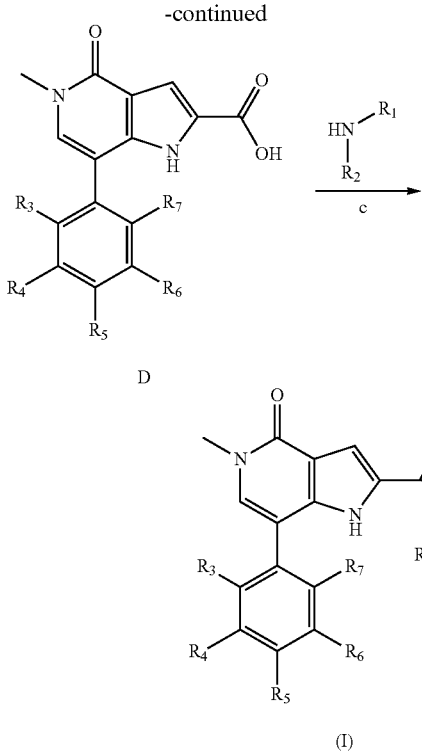

D

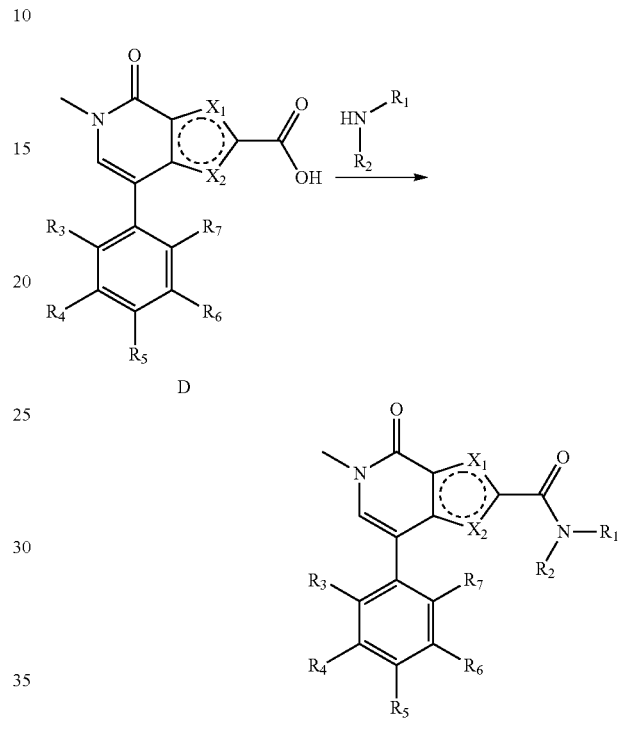

The definition of each group shown is as described above;

Preferably, the steps a), b), and c) are each carried out in a solvent, and the solvent is selected from the following group: water, methanol, ethanol, isopropanol, butanol, ethylene glycol, ethylene glycol methyl ether, N-methylpyrrolidone, dimethyl sulfoxide, tetrahydrofuran, toluene, dichloromethane, 1,2-dichloroethane, acetonitrile, N,N-dimethylformamide, N,N-dimethyl acetamide, dioxane, or a combination thereof.

Preferably, the transition metal catalyst is selected from the following group: tris(dibenzylideneacetone)dipalladium ($Pd_2(dba)_3$), tetrakis(triphenylphosphine)palladium (Pd($PPh_3)_4$), palladium acetate, palladium chloride, bis(triphenylphosphine)palladium(II) chloride, palladium trifluoroacetate, palladium triphenylphosphine acetate, [1,1'-bis(diphenylphosphino)ferrocene]palladium dichloride, bis(tri-o-benzylphosphino) palladium dichloride, [1,2-bis(diphenylphosphino)ethane]dichloropalladium(II), or a combination thereof; the catalyst ligand is selected from the following group: tri-tert-butyl phosphine, tri-tert-butyl phosphine tetrafluoroborate, tri-n-butyl phosphine, triphenyl phosphine, tri-p-benzyl phosphine, tricyclohexyl phosphine, tri-o-benzyl phosphine, or a combination thereof.

Preferably, the inorganic base is selected from the following group: sodium hydride, potassium hydroxide, sodium acetate, potassium acetate, potassium tert-butoxide, sodium tert-butoxide, potassium fluoride, cesium fluoride, potassium phosphate, potassium carbonate, potassium bicarbonate, sodium carbonate, sodium bicarbonate, or a combination thereof; the organic base is selected from the following group: pyridine, triethylamine, N,N-diisopropylethylamine, 1,8-diazabicyclo[5.4.0] undec-7-ene (DBU), lithium hexamethyldisilazide, sodium hexamethyldisilazide, dimethyl pyridine or a combination thereof.

The present disclosure further provides a preparation method of the acylaminopyrrolo-pyridone compound represented by formula I, wherein the preparation method comprises scheme 1 or scheme 2;

scheme 1 comprises the following steps: in the solvent, in the presence of alkali and condensation reagent, the condensation reaction shown as follows between the compound represented by formula D and R1R2NH is carried out to obtain the acylaminopyrrolo-pyridone compound represented by formula I;

scheme 2 comprises the following steps: in the solvent, in the presence of alkali and transition metal catalyst, the metal-catalyzed coupling reaction shown as follows between a compound represented by formula A' and the compound represented by formula B is carried out to obtain the acylaminopyrrolo-pyridone compound represented by formula I;

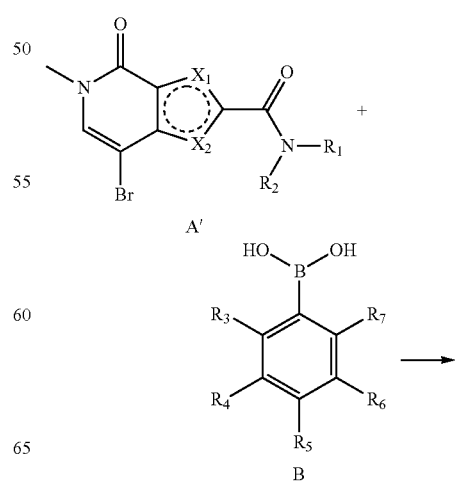

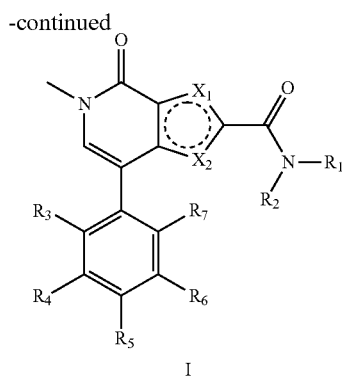

I

Wherein, X1, X2, R1, R2, R3, R4, R5, R6 and R7 are as defined above.

In an embodiment of the present disclosure, the scheme 1 may further comprise the following steps: in the solvent, in the presence of alkali and transition metal catalyst, the metal-catalyzed coupling reaction shown as follows between the compound represented by formula A and the compound represented by formula B is carried out to obtain the compound represented by formula C;

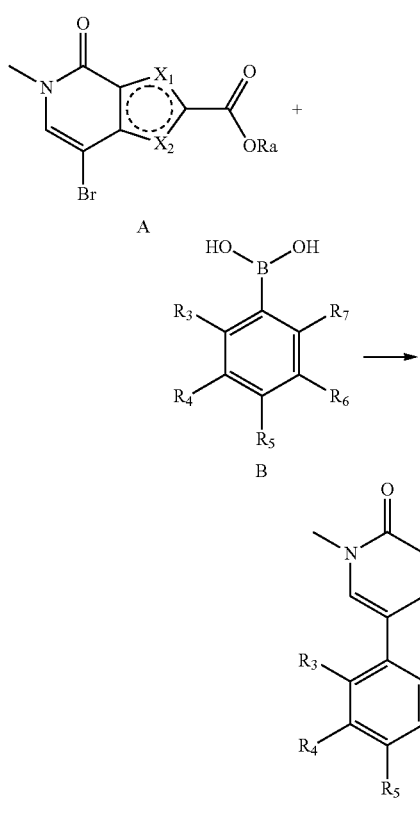

Wherein, X1, X2, R1, R2, R3, R4, R5, R6 and R7 are as defined above;

In the preparation method, the operation and conditions of the condensation reaction may be referred to as the conventional operation and conditions of such reactions in the art.

In an embodiment of the present disclosure, the scheme 1 may further comprise the following steps: in the solvent, in the presence of alkali, the hydrolysis reaction shown as follows between the compound represented by formula C is carried out to obtain the compound represented by formula D;

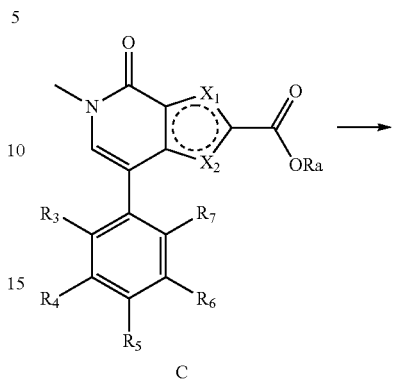

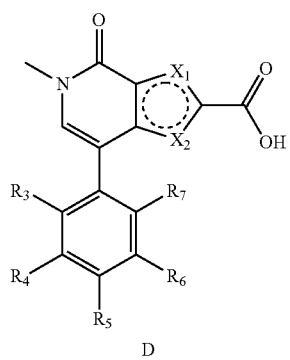

D wherein X1, X2, R1, R2, R3, R4, R5, R6 and R7 are as defined above; Ra is C1-C6 alkyl (preferably C1-C4 alkyl, for example methyl, ethyl, n-propyl, isopropyl, n-butyl, isobutyl, sec-butyl or tert-butyl; for another example, methyl, ethyl or isopropyl).

The operation and conditions of the hydrolysis reaction may be referred to as the conventional operation and conditions of such reactions in the art.

In an embodiment of the present disclosure, the scheme 1 may further comprise the following steps: in the solvent, in the presence of alkali and transition metal catalyst, the metal-catalyzed coupling reaction shown as follows between the compound represented by formula A and the compound represented by formula B is carried out to obtain the compound represented by formula C;

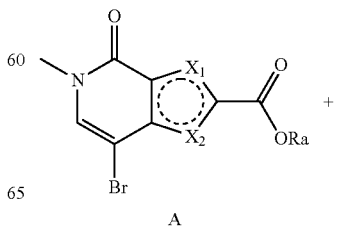

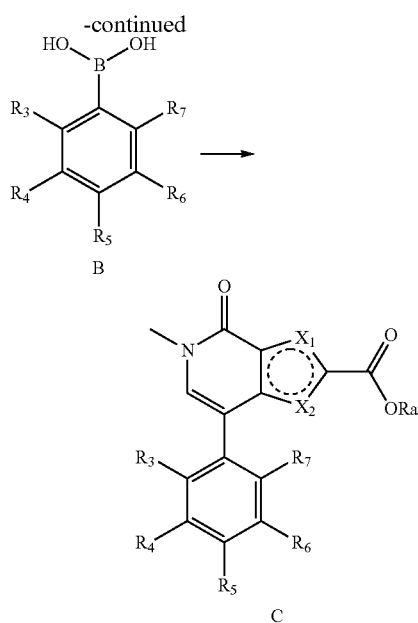

B

C

Wherein, X1, X2, R1, R2, R3, R4, R5, R6, R7 and Ra are as defined above.

The operation and conditions of the metal-catalyzed coupling reaction may be referred to as the conventional operation and conditions of such reactions in the art. In the present disclosure, the following are preferred:

in the metal-catalyzed coupling reaction, the transition metal catalyst is selected from the following group: tris (dibenzylideneacetone)dipalladium ($Pd_2(dba)_3$), tetrakis(triphenylphosphine)palladium ($Pd(PPh_3)_4$), palladium acetate, palladium chloride, bis(triphenylphosphine)palladium(II) chloride, palladium trifluoroacetate, palladium triphenylphosphine acetate, [1,1'-bis(diphenylphosphino)ferrocene]palladium dichloride, bis(tri-o-benzylphosphino) palladium dichloride, [1,2-bis(diphenylphosphino)ethane] dichloropalladium(II), or a combination thereof; the catalyst ligand is selected from the following group: tri-tert-butyl phosphine, tri-tert-butyl phosphine tetrafluoroborate, tri-n-butyl phosphine, triphenyl phosphine, tri-p-benzyl phosphine, tricyclohexyl phosphine, tri-o-benzyl phosphine, or a combination thereof.

In the condensation reaction, the hydrolysis reaction, the metal-catalyzed reaction are each carried out in a solvent, and the solvent is selected from the following group: water, methanol, ethanol, isopropanol, butanol, ethylene glycol, ethylene glycol methyl ether, N-methylpyrrolidone, dimethyl sulfoxide, tetrahydrofuran, toluene, dichloromethane, 1,2-dichloroethane, acetonitrile, N,N-dimethylformamide, N,N-dimethyl acetamide, dioxane, or a combination thereof.

Wherein, in the condensation reaction, the solvent is preferably an amide solvent (for example, N-dimethylformamide, N,N-dimethylacetamide, or a combination thereof).

In the hydrolysis reaction, the solvent is preferably a mixture of water and an alcohol solvent (for example, one or more of methanol, ethanol, isopropanol, butanol, and ethylene glycol).

In the metal-catalyzed coupling reaction, the solvent is preferably an alcohol solvent (for example, one or more of methanol, ethanol, isopropanol, butanol, and ethylene glycol), an amide solvent (for example, N-dimethylformamide, N,N-dimethylacetamide, or a combination thereof)

In the condensation reaction, hydrolysis reaction, and metal-catalyzed coupling reaction, the base may be an inorganic base and/or an organic base, the inorganic base is selected from the following group: sodium hydride, potassium hydroxide, sodium acetate, potassium acetate, potassium tert-butoxide, sodium tert-butoxide, potassium fluoride, cesium fluoride, potassium phosphate, potassium carbonate, potassium bicarbonate, sodium carbonate, sodium bicarbonate, or a combination thereof; the organic base is selected from the following group: pyridine, triethylamine, N,N-diisopropylethylamine, 1,8-diazabicyclo [5.4.0] undec-7-ene (DBU), lithium hexamethyldisilazide, sodium hexamethyldisilazide, dimethyl pyridine or a combination thereof.

The present disclosure provides a compound represented by formula D, formula C, formula A, formula A',

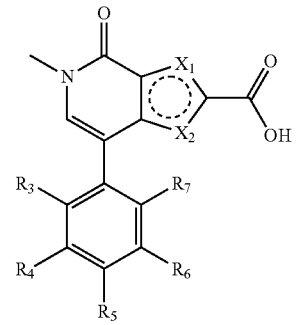

D

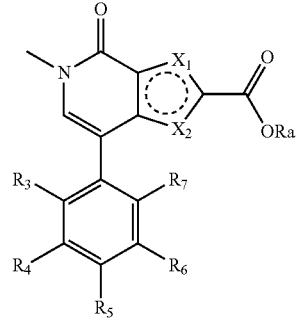

C

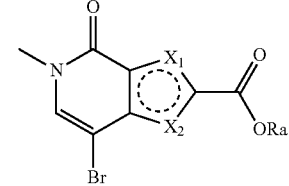

A

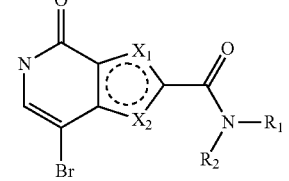

A'

Wherein, X1, X2, R1, R2, R3, R4, R5, R6, R7 and Ra are as defined above.

In an embodiment of the present disclosure, the compound represented by formula D is selected from any of the following structures:

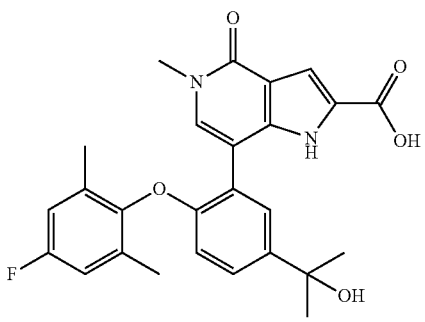

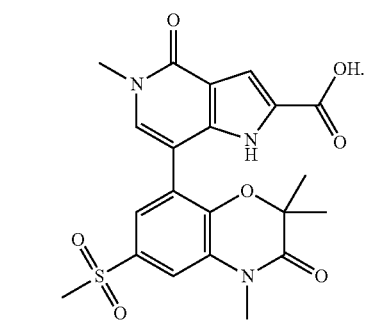

In an embodiment of the present disclosure, the compound represented by formula C is selected from any of the following structures:

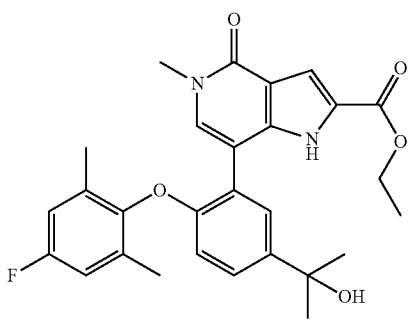

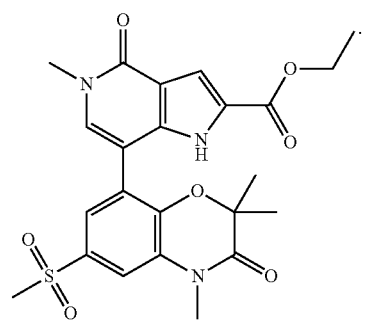

In an embodiment of the present disclosure, the compound represented by formula A is

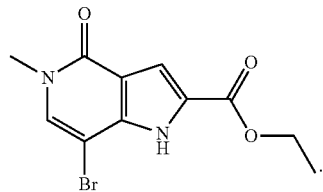 [SMILES: CCOC(=O)c1cc2c(=O)n(C)cc(Br)c2[nH]1]

In an embodiment of the present disclosure, the compound represented by formula A' is

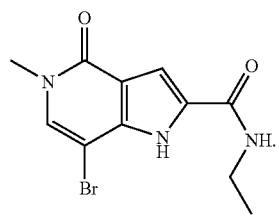 [SMILES: CCNC(=O)c1cc2c(=O)n(C)cc(Br)c2[nH]1]

Another object of the present disclosure is to provide a medicament and composition thereof for the treatment or prevention of tumors or inflammatory diseases. The technical solutions to achieve the above objective are as follows:

A pharmaceutical composition for the treatment of tumors or inflammatory diseases, consisting of the acylaminopyrrolo-pyridone compound represented by general formula I, or the pharmaceutically acceptable salt thereof, or the enantiomer, the diastereomer, the tautomer, the solvate, the polymorph, or the prodrug thereof, and a pharmaceutically acceptable carrier.

Another object of the present invention is to provide a use of the compound. The technical solutions to achieve the above objective are as follows:

a use of the acylaminopyrrolo-pyridone compound represented by general formula I, or the pharmaceutically acceptable salt thereof, or the enantiomer, the diastereomer, the tautomer, the solvate, the polymorph, or the prodrug thereof in the preparation of a medicament for the treatment of diseases related to the activity or expression of BRD, c-Myc and other proteins, especially for the treatment of tumors, immune diseases and inflammatory diseases. The tumor is independently selected from non-small cell lung cancer, small cell lung cancer, lung adenocarcinoma, lung squamous carcinoma, breast cancer, prostate cancer, liver cancer, skin cancer, gastric cancer, intestinal cancer, cholangiocarcinoma, brain cancer, leukemia, lymph cancer, fibroma, sarcoma, basal cell carcinoma, glioma, kidney cancer, melanoma, bone cancer, thyroid cancer, nasopharyngeal cancer, pancreatic cancer, etc. The immune diseases and inflammatory diseases are independently selected from the rejection of transplanted organs, gout, rhinitis, alopecia, Alzheimer's disease, appendicitis, atherosclerosis, asthma, arthritis, allergic dermatitis, Behcet's disease, bullous dermatosis, cholecystitis, chronic idiopathic thrombocytopenic purpura, chronic obstructive pulmonary disease, liver cirrhosis, degenerative joint disease, dermatitis, dermatomyositis, eczema, enteritis, encephalitis, gastritis, nephritis, Hashimoto's thyroiditis, hepatitis, hypophysitis, inflammatory bowel disease, irritable bowel syndrome, Kawasaki disease, cerebrospinal meningitis, multiple sclerosis, myocarditis, myasthenia gravis, mycosis fungoides, myositis, nephritis, osteomyelitis, pancreatitis, Parkinson's disease, pericarditis, pernicious anemia, pneumonia, primary biliary sclerosing cholangitis, polyarteritis nodosa, psoriasis, fibrosis, lupus erythematosus, tissue graft rejection, thyroiditis, type I diabetes, urethritis, uveitis, vasculitis, vitiligo, Waldenstrom's macroglobulinemia, etc.

The present invention relates to the acylaminopyrrolo-pyridone compounds with the structural characteristics of general formula (I), which can inhibit a variety of tumor cells, in particular, can effectively kill tumors related to abnormal signaling pathways such as BRD/c-Myc, etc., such as leukemia, prostate cancer, etc., are a class of therapeutic medicaments with the new mechanism of action.

The present disclosure also provides the pharmaceutical composition comprising of the acylaminopyrrolo-pyridone compound represented by general formula I, or the pharmaceutically acceptable salt thereof, or the enantiomer, the diastereomer, the tautomer, the solvate, the polymorph, or the prodrug thereof, and the pharmaceutically acceptable carrier. The acylaminopyrrolo-pyridone compound represented by general formula I, or the pharmaceutically acceptable salt thereof, or the enantiomer, the diastereomer, the tautomer, the solvate, the polymorph, or the prodrug thereof may be in therapeutically effective amounts.

The present disclosure also provides a use of the acylaminopyrrolo-pyridone compound represented by general formula I, or the pharmaceutically acceptable salt thereof, or the enantiomer, the diastereomer, the tautomer, the solvate, the polymorph, or the prodrug thereof, or the pharmaceutical composition in the preparation of BRD and/or c-Myc inhibitors.

The present disclosure also provides a use of the acylaminopyrrolo-pyridone compound represented by general formula I, or the pharmaceutically acceptable salt thereof, or the enantiomer, the diastereomer, the tautomer, the solvate, the polymorph, or the prodrug thereof, or the pharmaceutical composition in the preparation of a medicament for the treatment or prevention of diseases related to BRD and/or c-Myc protein activity or expression.

The acylaminopyrrolo-pyridone compound represented by general formula I, or the pharmaceutically acceptable salt thereof, or the enantiomer, the diastereomer, the tautomer, the solvate, the polymorph, or the prodrug thereof, or the pharmaceutical composition can inhibit a variety of tumor cells, especially can effectively kill the tumors related to abnormal BRD/c-Myc and other signaling pathways, such as leukemia, prostate cancer, etc.

The present disclosure also provides a use of the acylaminopyrrolo-pyridone compound represented by general formula I, or the pharmaceutically acceptable salt thereof, or the enantiomer, the diastereomer, the tautomer, the solvate, the polymorph, or the prodrug thereof, or the pharmaceutical composition in the preparation a medicament. The medicament may be a medicament for the treatment or prevention of tumors and/or inflammatory diseases.

The present disclosure also provides a method for the treatment of tumors and/or inflammatory diseases, comprising administering an effective amount of the acylaminopyrrolo-pyridone compound represented by general formula I, or the pharmaceutically acceptable salt thereof, or the enantiomer, the diastereomer, the tautomer, the solvate, the polymorph, or the prodrug thereof, or the pharmaceutical composition to a subject.

The tumor is independently selected from non-small cell lung cancer, small cell lung cancer, lung adenocarcinoma, lung squamous carcinoma, breast cancer, prostate cancer, liver cancer, skin cancer, gastric cancer, intestinal cancer, cholangiocarcinoma, brain cancer, leukemia, lymph cancer, fibroma, sarcoma, basal cell carcinoma, glioma, kidney cancer, melanoma, bone cancer, thyroid cancer, nasopharyngeal cancer, pancreatic cancer, etc. The immune diseases and inflammatory diseases are independently selected from the rejection of transplanted organs, gout, rhinitis, alopecia, Alzheimer's disease, appendicitis, atherosclerosis, asthma, arthritis, allergic dermatitis, Behcet's disease, bullous dermatosis, cholecystitis, chronic idiopathic thrombocytopenic purpura, chronic obstructive pulmonary disease, liver cirrhosis, degenerative joint disease, dermatitis, dermatomyositis, eczema, enteritis, encephalitis, gastritis, nephritis, Hashimoto's thyroiditis, hepatitis, hypophysitis, inflammatory bowel disease, irritable bowel syndrome, Kawasaki disease, cerebrospinal meningitis, multiple sclerosis, myocarditis, myasthenia gravis, mycosis fungoides, myositis, nephritis, osteomyelitis, pancreatitis, Parkinson's disease, pericarditis, pernicious anemia, pneumonia, primary biliary sclerosing cholangitis, polyarteritis nodosa, psoriasis, fibrosis, lupus erythematosus, tissue graft rejection, thyroiditis, type I diabetes, urethritis, uveitis, vasculitis, vitiligo and Waldenstrom's macroglobulinemia, etc.

It should be understood that, within the scope of the present disclosure, the above technical features of the present disclosure and the technical features specifically described in the following (such as the embodiments) can be combined with each other to form a new or preferred technical solution. Due to space limitations, it will not be listed herein.

On the basis of not violating common knowledge in the field, the above-mentioned preferred conditions can be combined arbitrarily to obtain preferred embodiments of the present disclosure.

The reagents and raw materials used in the present disclosure are all commercially available.

The positive progressive effect of the present disclosure is: the acylaminopyrrolo-pyridone compounds with the structural characteristics of general formula (I), which can inhibit a variety of tumor cells, in particular, can effectively kill tumors related to abnormal signaling pathways such as BRD/c-Myc, etc., such as leukemia, prostate cancer, etc., are a class of therapeutic medicaments with the new mechanism of action.

DETAILED DESCRIPTION OF THE EMBODIMENTS

After long-term and in-depth research, the inventor prepared a class of compounds with a novel structure represented by formula I, and found that it has good BRD enzyme inhibitory or degradation activity, and the compounds have specific inhibition or degradation effect on BRD enzyme at very low concentration (which can be as low as ≤10 nmol/L), and have excellent inhibition activity on BRD/c-MYc related cell proliferation, therefore, it can be used to treat diseases related to BRD/c-MYc mutation or abnormal expression, such as tumors. Based on the above findings, the inventor completed the present disclosure.

Terms

Unless otherwise defined, all technical terms herein have the same meaning as generally understood by those skilled in the art to which the subject of the claims are concerned. Unless otherwise indicated, all patents, patent applications, and publications cited herein are incorporated herein by reference in their entirety. Unless otherwise indicated, all patents, patent applications, and publications cited herein are incorporated herein by reference in their entirety.

It should be understood that the foregoing brief description and the following detailed description are exemplary and only for explanation, but do not impose any limitation on the subject of the present invention. The singular forms used in the application include the meaning of the plural forms unless otherwise specified. It must be noted that the singular forms used in the specification and claims include the plural forms of the things indicated, unless otherwise clearly indicated herein. It should also be noted that "or", "alternatively" is used to represent "and/or" unless otherwise indicated. In addition, the terms "include" and other forms thereof, such as "including", "containing" and "comprising" used are not restrictive.

Definitions of standard chemical terms are available in references (including Carey and Sundberg "ADVANCED ORGANIC CHEMISTRY 4TH ED." Vols. A (2000) and B (2001), Plenum Press, New York). Unless otherwise indicated, conventional methods within the technical scope of the art, such as mass spectrometry, NMR, IR and UV/VIS spectroscopy, and pharmacological methods are used. Unless specifically defined, the terms used herein in the descriptions of analytical chemistry, synthetic organic chemistry, and pharmaceutical and medicinal chemistry are known in the art. Standard techniques can be used in chemical synthesis, chemical analysis, drug preparation, formulation and delivery, and treatment of patients. For example, reaction and purification may be performed according to the manufacturer's instructions for use of the kit, or in a manner known in the art or in accordance with the Specification of the present disclosure. The techniques and methods described above may generally be implemented according to conventional methods well known in the art based on the descriptions in the multiple schematic and more specific references cited and discussed in the Specification. In the Specification, groups and substituents thereof can be selected by those skilled in the art to provide stable structural moieties and compounds.

When a substituent is described by a conventional chemical formula written from left to right, the substituent also includes a chemically equivalent substituent obtained when the structural formula is written from right to left. For example, —CH$_2$O— is equivalent to —OCH$_2$—.

The section headings used herein are only for the purpose of arranging the article and should not be construed as limiting the subject described above. References, in whole or in part, cited herein including but not limited to patents, patent applications, articles, books, operating manuals, and papers, are hereby incorporated by reference in their entirety.

Some chemical groups defined herein are preceded by simplified symbols to represent the total number of carbon atoms present in the groups. For example, $C_{1-6}$ alkyl refers to the alkyl with a total of 1 to 6 carbon atoms as defined below. The total number of the carbon atoms in the simplified symbol does not include carbon that may be present in a substituent of the group.

In addition to those as described above, when used in the Specification and claims of the application, the following terms have the meanings as described below unless otherwise specified.

In the application, the term "halogen" refers to fluorine, chlorine, bromine, or iodine; "hydroxy" refers to a —OH group; "hydroxyalkyl" refers to the alkyl substituted with the hydroxy (—OH) as defined below; "carbonyl" refers to a —C(=O)— group; "nitro" refers to —NO$_2$; "cyano" refers to —CN; "amino" refers to —NH$_2$; "substituted amino" refers to the amino substituted with one or two of the alkyl, alkylcarbonyl, arylalkyl and heteroarylalkyl as defined below, for example, monoalkylamino, dialkylamino, alkylamido, arylalkylamino, and heteroarylalkylamino; "carboxyl" refers to —COOH.

In the application, as a group or a part of other group (e.g., used in groups such as a halogen substituted alkyl, etc.), the term "alkyl" refers to a straight or branched hydrocarbon chain group which only consists of carbon atoms and hydrogen atoms, contains no unsaturated bonds, has, for example, 1-12 (preferably 1-8, more preferably 1-6) carbon atoms, and is linked to the rest of a molecule by a single bond. Examples of alkyl include, but are not limited to, methyl, ethyl, n-propyl, isopropyl, n-butyl, isobutyl, sec-butyl, tert-butyl, n-pentyl, 2-methylbutyl, 2,2-dimethylpropyl, n-hexyl, heptyl, 2-methylhexyl, 3-methylhexyl, octyl, nonyl, decyl, etc.

In the application, as a group or a part of other group, the term "alkenyl" refers to a straight or branched hydrocarbon chain group which only consists of carbon atoms and hydrogen atoms, contains at least one double bond, has, for example, 2-14 (preferably 2-10, more preferably 2-6) carbon atoms, and is linked to the rest of a molecule by a single bond, e.g. but not limited to, vinyl, propenyl, allyl, but-1-alkenyl, but-2-alkenyl, pent-1-enyl, pent-1,4-dienyl, etc.

In the application, as a group or a part of other group, the term "alkynyl" refers to a straight or branched hydrocarbon chain group which only consists of carbon atoms and hydrogen atoms, contains at least one triple bond and optionally one or more double bonds, has, for example, 2-14 (preferably 2-10, more preferably 2-6) carbon atoms, and is linked to the rest of a molecule by a single bond, e.g. but not limited to, ethynyl, prop-1-alkynyl, but-1-alkynyl, pent-1-en-4-ynyl, etc.

In the application, as a group or a part of other group, the term "cycloalkyl" refers to a stable non-aromatic monocyclic or polycyclic alkyl only consisting of carbon atoms and hydrogen atoms, wherein the cycloalkyl may include a fused ring system, a bridged ring system, or a spiro system with 3-15 carbon atoms, preferably 3-10 carbon atoms, more preferably 3-8 carbon atoms, and the cycloalkyl is saturated or unsaturated and may be linked to the rest of a molecule by a single bond via any suitable carbon atom. Unless otherwise specified in the Specification, the carbon atoms in the cycloalkyl may optionally be oxidized. Examples of cycloalkyl include, but are not limited to, cyclopropyl, cyclobutyl, cyclopentyl, cyclopentenyl, cyclohexyl, cyclohexenyl, cyclohexadienyl, cycloheptyl, cyclooctyl, 1H-indenyl, 2,3-dihydroindenyl, 1,2,3,4-tetrahydro-naphthyl, 5,6,7,8-tetrahydro-naphthyl, 8,9-dihydro-7H-benzocyclohepten-6-yl, 6,7,8,9-tetrahydro-5H-benzocycloheptenyl, 5,6,7,8,9,10-hexahydro-benzocyclooctenyl, fluorenyl, bicyclo[2.2.1] heptyl, 7,7-dimethyl-bicyclo[2.2.1] heptyl, bicyclo[2.2.1] heptenyl, bicyclo[2.2.2] octyl, bicyclo[3.1.1] heptyl, bicyclo[3.2.1] octyl, bicyclo[2.2.2] octenyl, bicyclo[3.2.1] octenyl, adamantyl, octahydro-4,7-methylene-1H-indenyl and octahydro-2,5-methylene-cyclopentadienyl, etc.

In the application, as a group or a part of other group, the term "heterocyclyl" refers to a stable 3-20 membered non-aromatic cyclic group consisting of 2-14 carbon atoms and 1-6 heteroatoms selected from nitrogen, phosphorus, oxygen, and sulfur. Unless otherwise specified in the Specification, the heterocyclyl may be a monocyclic, bicyclic, tricyclic or more-ring system, wherein the heterocyclyl may include a fused ring system, a bridged ring system, or a spiro system; nitrogen, carbon or sulfur atom in the heterocyclyl thereof may optionally be oxidized; the nitrogen atom may optionally be quaternized; and the heterocyclyl may be partially or completely saturated. The heterocyclyl may be linked to the rest of a molecule by a single bond via carbon atoms or heteroatoms. In the heterocyclyl containing a fused ring, one or more rings may be aryl or heteroaryl as defined below, provided that a junction to the rest of a molecule is a non-aromatic ring atom. For the objects of the present disclosure, the heterocyclyl is preferably a stable 4-11 membered non-aromatic monocyclic, bicyclic, bridged ring or spiro group containing 1-3 heteroatoms selected from nitrogen, oxygen and sulfur, and more preferably a stable 4-8 membered non-aromatic monocyclic, bicyclic, bridged ring or spiro group containing 1-3 heteroatoms selected from nitrogen, oxygen and sulfur. Examples of the heterocyclyl include, but are not limited to, pyrrolidinyl, morpholinyl, piperazinyl, homopiperazinyl, piperidinyl, thiomorpholinyl, 2,7-diaza-spiro[3.5] nonane-7-yl, 2-oxa-6-aza-spiro [3.3] heptan-6-yl, 2,5-diaza-bicyclo[2.2.1] heptan-2-yl, azetidinyl, pyranyl, tetrahydropyranyl, thienyl, tetrahydrofuranyl, oxazinyl, dioxolane, tetrahydroisoquinolinyl, decahydroisoquinolinyl, imidazolidinyl, imidazolidinyl, quinazinyl, thiazolidinyl, isothiazolidinyl, isoxazolidinyl, dihydroindolyl, octahydroindolyl, octahydroisoindolyl, pyrrolidinyl, pyrazolidinyl, phthalimide, etc.

In the application, as a group or a part of other group, the term "aryl" refers to a conjugated hydrocarbon ring system group with 6-18 carbon atoms (preferably 6-10 carbon atoms). For the object of the present disclosure, the aryl may be a monocyclic, bicyclic, tricyclic or more-ring system, or may be fused to the cycloalkyl or heterocyclyl as defined above, provided that the aryl is linked to the rest part of a molecule by a single bond via atoms on the aromatic ring. Examples of the aryl include, but are not limited to, phenyl, naphthyl, anthryl, phenanthryl, fluorenyl, 2,3-dihydro-1H-isoindolyl, 2-benzoxazolinone, 2H-1,4-benzoxazin-3(4H)-keto-7-yl, etc.

In the application, the term "arylalkyl" refers to the alkyl as defined above which is substituted with the aryl as defined above.

In the application, as a group or a part of other group, the term "heteroaryl" refers to a 5-16 membered conjugated ring group with 1-15 carbon atoms (preferably 1-10 carbon atoms) and 1-6 heteroatoms selected from nitrogen, oxygen and sulfur in the ring. Unless otherwise specified in the Specification, the heteroaryl may be a monocyclic, bicyclic, tricyclic or more-ring system, or may be fused to the cycloalkyl or heterocyclyl as defined above, provided that the aryl is linked to the rest part of a molecule by a single bond via atoms on the aromatic ring. Nitrogen, carbon or sulfur atoms in the heteroaryl may optionally be oxidized; the nitrogen atoms may optionally be quaternized. For the objects of the present disclosure, the heteroaryl is preferably a stable 5-12 membered aromatic group containing 1-5 heteroatoms selected from nitrogen, oxygen and sulfur, and more preferably a stable 5-10 membered aromatic group containing 1-4 heteroatoms selected from nitrogen, oxygen and sulfur or a 5-6 membered aromatic group containing 1-3 heteroatoms selected from nitrogen, oxygen and sulfur. Examples of the heteroaryl include, but are not limited to, thienyl, imidazolyl, pyrazolyl, thiazolyl, oxazolyl, oxadiazolyl, isoxazolyl, pyridyl, pyrimidinyl, pyrazinyl, pyridazinyl, benzimidazolyl, benzopyrazolyl, indolyl, furyl, pyrrolyl, triazolyl, tetrazolyl, triazinyl, indazinyl, isoazinylindolyl, indazolyl, isoindazolyl, purinyl, quinolinyl, isoquinolinyl, diazonaphthyl, naphthyridyl, quinoxolinyl, pteridinyl, carbazolyl, carbazolyl, phenanthridyl, phenanthrolinyl, acridyl, phenazinyl, isothiazolyl, benzothiazolyl, benzothiophenyl, oxotriazolyl, cinnolinyl, quinazolyl, thiophenyl, phenylthio, indolizinyl, o-phenanthroline, isoxazolyl, phenoxazinyl, phenothiazinyl, 4,5,6,7-tetrahydrobenzo[b] thienyl, naphthopyridyl, [1,2,4] triazolo [4,3-b] pyridazine, [1,2,4] triazolo[4,3-a] pyrazine, [1,2,4] triazolo[4,3-c] pyrimidine, [1,2,4] triazolo[4,3-a] pyridine, imidazo[1,2-a] pyridine, imidazo[1,2-b]pyridazine, imidazo [1,2-a] pyrazine, etc.

In the application, the term "heteroarylalkyl" refers to the alkyl as defined above which is substituted with the heteroaryl as defined above.

In the application, "optional" or "optionally" indicates that an event or condition described herein below may or may not occur, and the description includes both the presence and absence of the event or condition at the same time. For example, "optionally substituted aryl" indicates that the aryl is substituted or unsubstituted, and the description includes both the substituted aryl and the unsubstituted aryl at the same time.

The terms "moiety", "structural moiety", "chemical moiety", "group" and "chemical group" used herein refer to specific fragments or functional groups in a molecule. The chemical moiety is generally considered to be a chemical entity embedded or linked to the molecule.

"Stereoisomer" refers to a compound which consists of the same atoms bonded by the same bonds, but with different three-dimensional structures. The present disclosure covers various stereoisomers and mixtures thereof.

When a compound of the present disclosure contains an ene double bond, the compound of the present disclosure is intended to contain E- and Z-geometric isomers, unless otherwise indicated.

"Tautomer" refers to an isomer formed by transferring a proton from an atom of a molecule to another atom of the same molecule. All tautomeric forms of the compound of the present disclosure are included within the scope of the present disclosure.

The compound of the present disclosure or a pharmaceutically acceptable salt thereof may contain one or more chiral carbon atoms and thus may yield an enantiomer, a diastereoisomer, and other stereoisomeric forms. Each chiral carbon atom may be defined as (R)- or (S)-based on stereo chemistry. The present disclosure is intended to include all possible isomers, as well as racemic and optically pure forms thereof. A racemate, a diastereomer or an enantiomer may be selected as raw materials or intermediates for the preparation of the compound of the present disclosure. Optically active isomers can be prepared using chiral synthons or chiral reagents, or resolved using conventional techniques such as crystallization and chiral chromatography.

Conventional techniques for preparing/separating individual isomers include chiral synthesis from suitable optically pure precursors, or resolution of racemates (or racemates of salts or derivatives) using, for example, chiral high performance liquid chromatography, for example, see Gerald Gübitz and Martin G. Schmid (Eds.), Chiral Separations, Methods and Protocols, Methods in Molecular Biology, Vol. 243, 2004; A. M. Stalcup, Chiral Separations, Annu. Rev. Anal. Chem. 3:341-63,2010; Fumiss et al. (eds.), VOGEL'S ENCYCLOPEDIA OF PRACTICAL ORGANIC CHEMISTRY 5.sup.TH ED., Longman Scientific and Technical Ltd., Essex, 1991, 809-816; Heller, Acc. Chem. Res. 1990, 23, 128.

In the application, the term "Pharmaceutically Acceptable Salt" includes a pharmaceutically acceptable acid addition salt and a pharmaceutically acceptable base addition salt.

The "Pharmaceutically Acceptable Acid Addition Salt" refers to a salt which is formed with an inorganic acid or an organic acid and can retain the biological effectiveness of a free base without other side effects, wherein the inorganic acid salt includes, but is not limited to, hydrochloride, hydrobromide, sulfate, nitrate, phosphate, etc.; the organic acid salt includes, but is not limited to, formate, acetate, 2,2-dichloroacetate, trifluoroacetate, propionate, hexanoate, caprylate, decanoate, undecylenate, glycolate, gluconate, lactate, sebacate, adipate, glutarate, malonate, oxalate, maleate, succinate, fumarate, tartrate, citrate, palmitate, stearate, oleate, cinnamate, laurate, malate, glutamate, pyroglutamate, aspartate, benzoate, methanesulfonate, benzene sulfonate, p-tosylate, alginate, ascorbate, salicylate, 4-aminosalicylate, naphthalene disulfonate, etc. The salts can be prepared by methods known in the art.

The "Pharmaceutically Acceptable Base Addition Salt" refers to a salt which is formed with an inorganic base or an organic base and can retain the biological effectiveness of a free acid without other side effects. Salts derived from the inorganic base include, but are not limited to, sodium salts, potassium salts, lithium salts, ammonium salts, calcium salts, magnesium salts, iron salts, zinc salts, copper salts, manganese salts, aluminum salts, etc. Preferred inorganic salts are the ammonium salts, the sodium salts, the potassium salts, the calcium salts and the magnesium salts. Salts derived from the organic base include, but are not limited to, the following salts of primary, secondary and tertiary amines, substituted amines including naturally substituted amines, cyclic amines, and basic ion exchange resins, such as ammonia, isopropylamine, trimethylamine, diethylamine, triethylamine, tripropylamine, ethanolamine, diethanolamine, triethanolamine, dimethylethanolamine, 2-dimethylaminoethanol, 2-diethylaminoethanol, dicyclohexylamine, lysine, arginine, histidine, caffeine, procaine, choline, betaine, ethylenediamine, glucosamine, methylglucosamine, theobromine, purine, piperazine, piperidine, N-ethylpiperidine, polyamine resin, etc. Preferred organic bases include isopropylamine, diethylamine, ethanolamine, trimethylamine, dicyclohexylamine, choline, and caffeine. The salts can be prepared by methods known in the art.

"Polymorph" refers to different solid crystalline phases of some compounds of the present disclosure in the solid state due to the presence of two or more different molecular arrangements. The some compounds of the present disclosure may be present in more than one crystalline form, and the present disclosure is intended to include various crystal forms and mixtures thereof.

Typically, crystallization may produce a solvate of the compound of the present disclosure. The term "solvate" used in the present disclosure refers to an aggregate containing one or more molecules of the compound of the present disclosure and one or more molecules of a solvent, wherein the solvent may be water, in which case the solvate is a hydrate. Alternatively, the solvent may be an organic solvent. Thus, the compound of the present disclosure may be present in hydrates, including monohydrates, dihydrates, hemihydrates, sesquihydrates, trihydrates, tetrahydrates, etc., and corresponding solvated forms. The compound of the present invention can form a true solvate, but in some cases, the compound can also retain only indeterminate water or a mixture of water and a part of indeterminate solvent. The compound of the present disclosure may be reacted in the solvent or precipitated or crystallized from the solvent. The solvate of the compound of the present disclosure is also included within the scope of the present disclosure.

The present disclosure further comprises a prodrug of the compound described above. In the present disclosure, the term "prodrug" indicates a compound of the bioactive compound of the present disclosure that can be converted to cost under physiological conditions or by solvolysis. Therefore, the term "prodrug" refers to a pharmaceutically acceptable metabolic precursor of the compound of the present disclosure. When the prodrug is administered to an individual in need, the prodrug may be inactive but is converted into the active compound of the present disclosure in vivo. The prodrug is usually converted rapidly in vivo to produce the parent compound of the present disclosure, for example, by hydrolysis in the blood. The prodrug compound generally provides the advantages of solubility, histocompatibility, or sustained release in mammalian organisms. The prodrug includes known amino protective groups and carboxy protective groups. For specific preparation method for the prodrug, refer to Saulnier, M. G., et al., Bioorg. Med. Chem. Lett. 1994, 4, 1985-1990; Greenwald, R. B., et al., J. Med. Chem. 2000, 43, 475.

In the present disclosure, the "Pharmaceutical Composition" refers to the compound of the present disclosure and a formulation of a medium generally accepted in the art for delivering a bioactive compound to a mammal (e.g., human). The medium includes a pharmaceutically acceptable carrier. The object of the pharmaceutical composition is to promote the administration of an organism, and facilitate the absorption of active ingredients, thereby exerting the bioactivity.

The term "Pharmaceutically Acceptable" used herein refers to a substance (e.g., a carrier or a diluent) that does not affect the bioactivity or nature of the compound of the present disclosure and is relatively nontoxic, i.e. the substance can be administered to an individual without causing any adverse biological reactions or interacting adversely with any component contained in the composition.

In the application, the "Pharmaceutically Acceptable Carrier" includes, but is not limited to, any adjuvants, carriers, excipients, fluidizers, sweeteners, diluents, preservatives, dyes/colouring agents, flavoring agents, surfactants, wetting agents, dispersants, suspensions, stabilizers, isotonic agents, solvents, or emulsifiers which are licensed by the relevant government authorities to be acceptable for use in humans or livestocks.

The terms such as "Tumor", "Diseases Associated with Abnormal Cell Proliferation", etc. of the present disclosure include, but are not limited to, leukemia, gastrointestinal stromal tumors, histiocytic lymphoma, non-small cell lung cancer, small cell lung cancer, pancreatic cancer, lung squamous cell carcinoma, lung adenocarcinoma, breast cancer, prostate cancer, liver cancer, skin cancer, epithelial cell cancer, cervical cancer, ovarian cancer, intestinal cancer, nasopharyngeal cancer, brain cancer, bone cancer, esophageal cancer, melanoma, renal cancer, buccal cavity cancer, etc.

The terms "Prevented," "Prevent", and "Preventing" used herein include reduction of the possibility of occurrence or exacerbation of diseases or conditions to patients.

The term "Treatment" and other similar synonyms used herein include the following meanings.

(i) Preventing the occurrence of diseases or conditions in the mammals, especially when such mammals are susceptible to such diseases or conditions but have not been diagnosed with the diseases or conditions;

(ii) Inhibiting the diseases or conditions, i.e., restraining the development of the diseases or conditions;

(iii) Alleviating the diseases or conditions, i.e., resolving the diseases or conditions; or (iv) Relieving symptoms caused by the diseases or conditions.

The terms "Effective Amount", "Therapeutically Effective Amount" or "Pharmaceutically Effective Amount" used herein refer to an amount of at least one agent or compound sufficient to alleviate one or more symptoms of the disease or condition being treated to a certain extent after administration. The outcome may be a resolution and/or remission of signs, symptoms or etiology, or any other desired change in a biological system. For example, the "effective amount" for treatment refers to an amount of the composition containing the compound disclosed herein that is required to provide a clinically significant remission effect. The effective amount suitable for any individual case may be determined using techniques such as dose escalation trials.

The terms "Taking", "Administering", "Administration", etc. used herein refer to methods capable of delivering the compound or the composition to a desired site for a biological action. The methods include, but are not limited to, oral route, transduodenal route, parenteral injection (including intravenous, subcutaneous, intraperitoneal, intramuscular, intraarterial injection or infusion), topical administration, and transrectal administration. Those skilled in the art are familiar with administration techniques that can be used for the compound and methods described herein, for example, techniques discussed in Goodman and Gilman, The Pharmacological Basis of Therapeutics, current ed.; Pergamon; and Remington's, Pharmaceutical Sciences (current edition), Mack Publishing Co., Easton, Pa. In preferred embodiments, the compound and the composition discussed herein are administered orally.

The terms "Pharmaceutical Combination", "in Combination with A Drug", "Co-Administration", "Administer Other Therapy", "Administer Other Therapeutic Agent", etc. used herein refer to a drug therapy obtained by mixing or combining more than one active ingredient, wherein the drug therapy includes fixed and unfixed combinations of active ingredients. The term "Fixed Combination" refers to the simultaneous administration of at least one compound described herein and at least one synergistic agent to a patient in the form of a single entity or a single dosage form. The term "Unfixed Combination" refers to the simultaneous administration, co-administration, or sequential administration in turn of at least one compound and at least one synergistic formulation described herein to a patient in the form of a separate entity. The terms are also applied in the cocktail therapy, for example by administering three or more active ingredients.

Those skilled in the art should also understand that in the methods described below, a functional group of the intermediate compound may need to be protected by an appropriate protective group. Such functional group includes hydroxyl, amino, mercapto and carboxylic acid. Appropriate hydroxy protective groups include trialkylsilyl or diarylalkylsilyl (e.g., tert-butyldimethylsilyl, tert-butyldiphenylsilyl or trimethylsilyl), tetrahydropyranyl, benzyl, etc. Appropriate amino, amidino and guanidino protective groups include tert-butoxycarbonyl, benzyloxycarbonyl, etc. Appropriate mercapto protective groups include —C(O)—R″ (wherein R″ is alkyl, aryl or arylalkyl), p-methoxybenzyl, triphenylmethyl, etc. Appropriate carboxyl protective groups include alkyl, aryl or arylalkyl esters.

The protective groups may be introduced and removed in accordance with standard techniques known to those skilled in the art and described herein. The use of the protective groups is detailed in Greene, T. W. and P. G. M. Wuts, Protective Groups in Organic Synthesis, (1999), 4th Ed., Wiley. The protective group may also be a polymer resin.

Those skilled in the art can understand that, according to the conventions used in the art, the "⫪" used in the structural formula of the group described in the present disclosure means that the corresponding group is connected to other fragments and groups in the compound through this site.

The following embodiments further illustrate the present disclosure, but the present disclosure is not limited thereto. In the following embodiments, experimental methods without specific conditions are selected according to conventional methods and conditions, or according to the product specification.

Preparation of Intermediate A

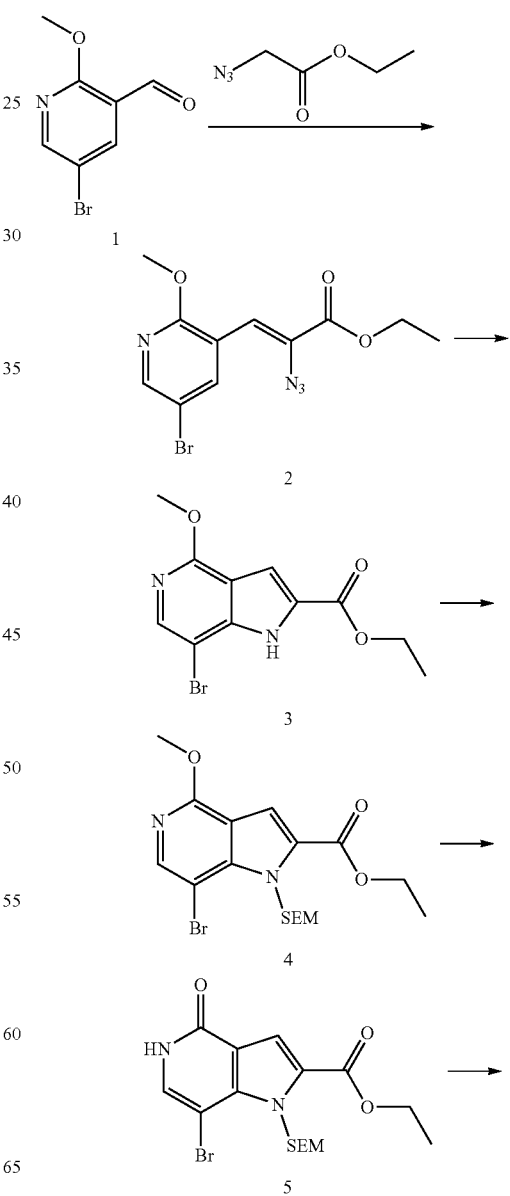

-continued

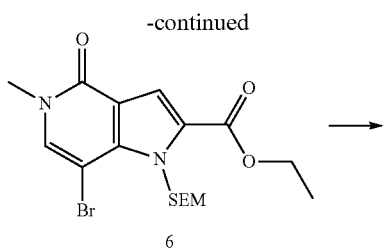

6

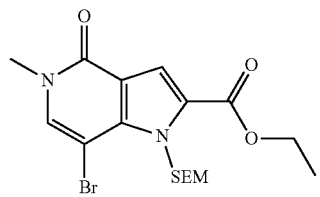

Intermediate A

Step 1: Compound 1 (4 g, 18.6 mmol) and ethyl azidoacetate (5.97 g, 46.3 mmol) were dissolved in anhydrous ethanol (200 mL), then sodium ethanol (3.14 g, 46.2 mmol) was added thereto, and the reaction was carried out overnight at room temperature. Cold water was added to the reaction mixture, then the mixture was extracted with ethyl acetate, the organic phase was dried over anhydrous sodium sulfate, filtered and concentrated, and the residue was purified by silica gel column chromatography to obtain compound 2 (1.8 g, white solid). $^1$H NMR (400 MHz, CDCl$_3$): δ8.60 (d, J=2.0 Hz, 1H), 8.13 (d, J=2.4 Hz, 1H), 7.10 (s, 1H), 4.39 (q, J=7.2 Hz, 2H), 3.97 (s, 3H), 1.41 (t, J=7.2 Hz, 3H).

Step 2: Compound 2 (1.8 g, 5.5 mmol) was dissolved in toluene (100 mL) and heated to 135° C. and the reaction was carried out overnight. The reaction mixture was concentrated and evaporated to dryness to obtain crude product 3 (1.5 g, yellow solid), which was directly used in the next reaction step. LC-MS: m/z 297.0 [M−H]$^+$.

Step 3: Compound 3 (1.0 g, crude product) was dissolved in N,N-dimethylformamide DMF (15 mL) and potassium carbonate (922 mg, 6.68 mmol) and 2-(trimethylsilyl)ethoxymethyl chloride SEMCl (665 mg, 4.0 mmol) were added sequentially and the reaction was carried out at room temperature overnight. Saturated ammonium chloride solution was added to the mixture, then the mixture was extracted with ethyl acetate, concentrated, and the residue was purified by silica gel column chromatography to obtain compound 4 (0.6 g, colorless oil). $^1$H NMR (400 MHz, CDCl$_3$): δ8.11 (s, 1H), 7.51 (s, 1H), 6.45 (s, 2H), 4.45 (q, J=7.2 Hz, 2H), 4.14 (s, 3H), 3.60 (t, J=8.0 Hz, 2H), 1.48 (t, J=7.2 Hz, 3H), 0.95 (t, J=8.0 Hz, 2H), 0.01 (s, 9H).

Step 4: Compound 4 (0.6 g, 1.4 mmol) was dissolved in acetonitrile (30 mL), sodium iodide (315 mg, 2.1 mmol) and trimethylchlorosilane TMSCl (227 mg, 2.1 mmol) were added thereto, and the reaction was carried out at room temperature for 1 h and then heated to 65° C. for 3 h. The reaction solution was concentrated, sodium thiosulfate solution was added thereto, then the mixture was extracted with dichloromethane and the organic phase was concentrated to obtain compound 5 (0.5 g, white solid). LC-MS: m/z 415.1 [M+H]$^+$.

Step 5: Compound 5 (0.5 g, 1.2 mmol) was dissolved in DMF (20 mL) and cesium carbonate (782 mg, 2.4 mmol) and methyl iodide (256 mg, 1.8 mmol) were added sequentially and the reaction was carried out at room temperature overnight. Saturated ammonium chloride solution was added to the mixture, then the mixture was extracted with dichloromethane, the organic phase was concentrated, and the residue was purified by silica gel column chromatography to obtain compound 6 (320 mg, white solid). $^1$H NMR (400 MHz, CDCl$_3$): δ7.70 (s, 1H), 7.39 (s, 1H), 6.37 (s, 2H), 4.40 (q, J=7.2 Hz, 2H), 3.64 (s, 3H), 3.60 (t, J=8.0 Hz, 2H), 1.44 (t, J=7.2 Hz, 3H), 0.94 (t, J=8.0 Hz, 2H), 0.01 (s, 9H).

Step 6: Compound 6 (320 mg, 0.75 mmol) was dissolved in dichloromethane (10 mL) and trifluoroacetic acid (2 mL) was added thereto, then the reaction was carried out for 5 h at room temperature. The reaction solution was concentrated, sodium bicarbonate solution was added thereto, then the mixture was extracted with dichloromethane, the organic phase was concentrated to obtain intermediate A (200 mg, white solid). LC-MS: m/z 299.0/301.0 [M+H]$^+$/[M+H+2]$^+$.

Preparation of Intermediate B

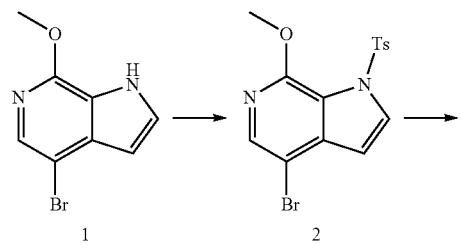

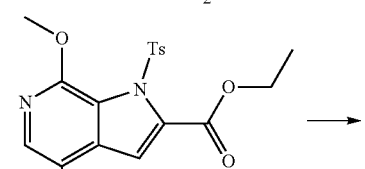

3

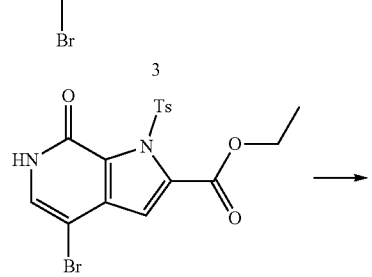

4

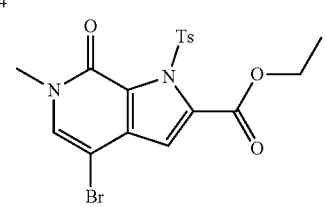

Intermediate B

Step 1: Compound 1 (3.8 g, 16.8 mmol) was dissolved in N,N-dimethylformamide (DMF) (50 mL), the mixture was cooled to 0° C., then sodium hydrogen (60% in mineral oil, 1.0 g, 24 mmol) was added in batches. After the addition, stirring was continued for 30 minutes, then p-toluenesulfonyl chloride (4.8 g, 25 mmol) was added, and the mixture was stirred at room temperature overnight. The reaction was quenched by adding ice water (200 mL) and the precipitated solid was filtered to obtain compound 2 (5.0 g, yellow solid). $^1$H NMR (DMSO-d6, 400 MHz): δ8.18 (d, J=3.6 Hz, 1H), 8.00 (s, 1H), 7.86 (d, J=8.4 Hz, 2H), 7.46 (d, J=8.4 Hz, 2H), 6.81 (d, J=3.6 Hz, 1H). 3.82 (s, 3H), 2.39 (s, 3H). LC-MS: m/z 380.9 [M+H]⁺.

Step 2: Compound 2 (380 mg, 1.0 mmol) was dissolved in tetrahydrofuran (10 mL) and the mixture was cooled to −70° C. by dry ice acetone bath. Lithium diisopropylamide LDA (2M, 1 mL, 2.0 mmol) was added dropwise and stirring was continued for 30 min, then ethyl chloroformate (162 mg, 1.5 mmol) was added dropwise at −50° C., the reaction was kept at −50° C. for 2 h. The reaction was quenched with saturated ammonium chloride solution, extracted with ethyl acetate, and the organic phase was concentrated to obtain the crude product. The crude product was slurried with methanol to obtain compound 3 (400 mg, yellow solid). $^1$H NMR (CDCl$_3$, 400 MHz): δ8.26 (d, J=8.4 Hz, 2H), 7.99 (s, 1H), 7.38 (d, J=8.4 Hz, 2H), 7.08 (s, 1H), 4.48 (q, J=6.8 Hz, 2H), 3.91 (s, 3H), 2.47 (s, 3H), 1.45 (t, J=6.8 Hz, 3H). LC-MS: m/z 453.0 [M+H]⁺.

Step 3: Compound 3 (1.3 g, 2.9 mmol), sodium iodide (645 mg, 4.3 mmol) were dissolved in acetonitrile (50 mL), trimethylchlorosilane (465 mg, 4.3 mmol) was added at room temperature, the mixture was stirred for 1 h and then 0.2 mL of water was added thereto, then the temperature was raised to 70° C., the reaction was carried out for 2 h. The mixture was cooled to room temperature and filtered, the filtrate was concentrated to obtain compound 4 (1.3 g, crude product, yellow solid). $^1$H NMR (CDCl$_3$, 400 MHz): δ8.32 (d, J=8.4 Hz, 2H), 7.42 (s, 1H), 7.38 (d, J=8.0 Hz, 2H), 6.99 (s, 1H), 4.48 (q, J=7.2 Hz, 2H), 2.45 (s, 3H), 1.45 (t, J=7.2 Hz, 3H). LC-MS: m/z 438.9 [M+H]⁺.

Step 4: Compound 4 (1.3 g, crude product) was dissolved in DMF (5 mL) and cesium carbonate (1.3 g, 3.9 mmol) and methyl iodide (550 mg, 3.9 mmol) were added thereto. The mixture was stirred overnight at room temperature, then water was added thereto, the mixture was extracted by ethyl acetate. The organic phase was dried and concentrated, and the residue was purified by silica gel column chromatography to obtain Intermediate B (1.2 g, white solid). $^1$H NMR (CDCl$_3$, 400 MHz): δ8.48 (d, J=8.0 Hz, 2H), 7.39 (d, J=8.4 Hz, 2H), 7.26 (s, 1H), 6.88 (s, 1H), 4.46 (q, J=7.2 Hz, 2H), 3.56 (s, 3H). 2.45 (s, 3H), 1.44 (t, J=7.2 Hz, 3H). LC-MS: m/z 453.0 [M+H]⁺.

Preparation of the Embodiments

Embodiment 1: N-ethyl-7-(2-(4-fluoro-2,6-dimethylphenoxy)-5-(2-hydroxyprop-2-yl)phenyl)-5-methyl-4-oxo-4,5-dihydro-1H-pyrrolo[3,2-c]pyridine-2-amide

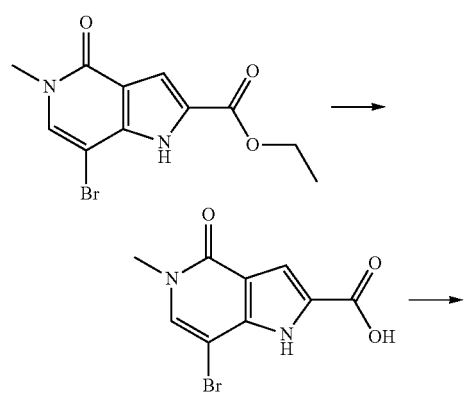

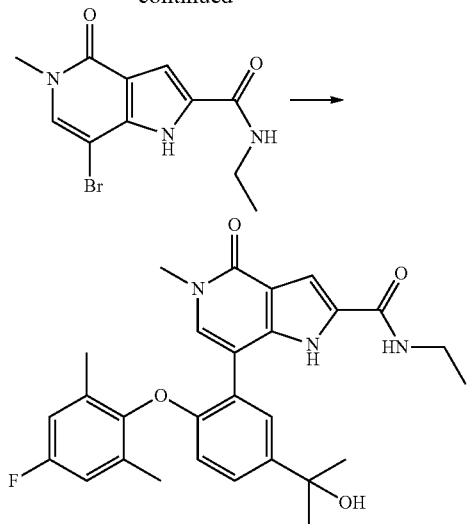

Step 1: Intermediate A (100 mg, 0.34 mmol) was dissolved in ethanol (10 mL), water (5 mL) and sodium hydroxide (53 mg, 1.32 mmol) were added thereto, and the reaction was carried out at 80° C. for 4 h. The reaction solution was concentrated to remove most of the ethanol, a small amount of water was added, and the pH value was adjusted to 3-4 with dilute hydrochloric acid, and then the mixture was freeze-dried to obtain 7-bromo-5-methyl-4-oxo-4,5-dihydro-1H-pyrrolo[3,2-c]pyridine-2-carboxylic acid (90 mg, white solid). $^1$H NMR (400 MHz, DMSO_d6): δ 13.13 (brs, 1H), 12.39 (s, 1H), 7.87 (s, 1H), 7.20 (s, 1H), 3.46 (s, 3H).

Step 2: 7-bromo-5-methyl-4-oxo-4,5-dihydro-1H-pyrrolo[3,2-c] pyridine-2-carboxylic acid (90 mg, 0.33 mmol) was dissolved in DMF (5 mL), and ethylamine hydrochloride (54 mg, 0.67 mmol) and N,N-diisopropylethylamine DIEA (213 mg, 1.65 mmol) were added sequentially, then 2-(7-azabenzotriazole)-N,N,N',N'-tetramethyluronium hexafluorophosphate HATU (250 mg, 0.66 mmol) was added and the reaction was carried out at room temperature overnight. Saturated ammonium chloride solution was added to the mixture, then the mixture was extracted with dichloromethane, the organic phase was concentrated, and the residue was purified by gel column chromatography to obtain 7-bromo-N-ethyl-5-methyl-4-oxo-4,5-dihydro-1H-pyrrolo[3,2-c] pyridine-2-amide (50 mg, white solid). LC-MS: m/z 298.0 [M+H]⁺.

Step 3: 7-bromo-N-ethyl-5-methyl-4-oxo-4,5-dihydro-1H-pyrrolo[3,2-c] pyridine-2-amide (40 mg, 0.13 mmol) and (2-(4-fluoro-2,6-dimethylphenoxy)-5-(2-hydroxyprop-2-yl)phenyl)boronic acid (51 mg, 0.16 mmol) were dissolved in DMF (10 mL), cesium carbonate (131 mg, 0.40 mmol) and 1,1'-bis(diphenylphosphino)ferrocene palladium dichloride Pd(dppf)Cl$_2$ (20 mg, 0.027 mmol) were added sequentially thereto, the reaction was carried out overnight under nitrogen protection at 100° C. After cooling to room temperature, saturated ammonium chloride solution was added to the mixture, then the mixture was extracted with dichloromethane, the organic phase was concentrated, and the residue was purified by preparative chromatography to obtain the compound N-ethyl-7-(2-(4-fluoro-2,6-dimethylphenoxy)-5-(2-hydroxypropan-2-yl)phenyl)-5-methyl-4-oxo-4,5-dihydro-1H-pyrrolo[3,2-c]pyridine-2-amide (15 mg, white solid). LC-MS (M+H) 492.2. $^1$H-NMR (DMSO-d6, 400 MHz): δ10.85 (s, 1H), 8.36 (t, J=5.6 Hz, 1H), 7.50 (d, J=2.4 Hz, 1H), 7.46 (s, 1H), 7.37 (dd, J=2.4, 8.8 Hz, 1H), 7.27 (s, 1H), 6.97 (d, J=9.2 Hz, 2H), 6.32 (d, J=8.8 Hz, 1H), 4.98 (s, 1H), 3.54 (s, 3H), 3.22-3.27 (m, 2H), 2.03 (s, 6H), 1.45 (s, 6H), 1.10 (t, J=7.2 Hz, 3H).

Embodiment 2: N-ethyl-5-methyl-4-oxo-7-(2,2,4-trimethyl-6-(methylsulfonyl)-3-oxo-3,4-dihydro-2H-benzo[b][1,4] oxazin-8-yl)-4,5-dihydro-1H-pyrrolo[3,2-c]pyridine-2-amide

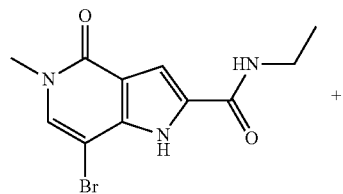

+

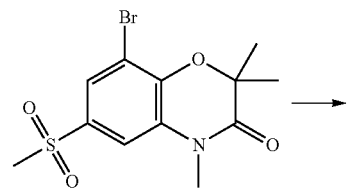

→

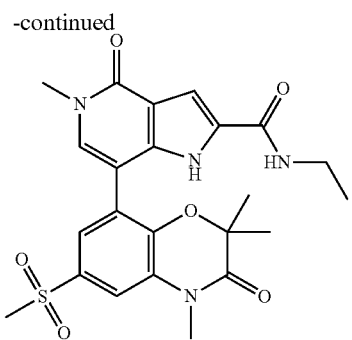

Under nitrogen protection, 8-bromo-2,2,4-trimethyl-6-(methylsulfonyl)-2H-benzo[b][1,4]oxazin-3(4H)-one (35 mg, 0.1 mmol) was dissolved in DMF (3 mL), bis(pinacolato)diboron (51 mg, 0.2 mmol), cesium carbonate (98 mg, 0.3 mmol) and Pd(dppf)Cl2 (7 mg, 0.01 mmol) were added thereto, the mixture was stirred at 110° C. for 2 h, then 7-bromo-N-ethyl-5-methyl-4-oxo-4,5-dihydro-1H-pyrrolo [3,2-c] pyridine-2-amide (30 mg, 0.1 mmol) was added thereto and stirring was continued overnight. After cooling to room temperature, water was added to the mixture, then the mixture was extracted with dichloromethane DCM, the organic phase was dried over anhydrous sodium sulfate, concentrated and purified by preparative chromatography to obtain N-ethyl-5-methyl-4-oxo-7-(2,2,4-trimethyl-6-(methylsulfonyl)-3-oxo-3,4-dihydro-2H-benzo[b] [1,4] oxazin-8-yl)5-dihydro-1H-pyrrolo[2,3-c] pyridine-2-amide (3.6, white solid). LC-MS (M+H) 487.1. ¹H-NMR (CDCl₃, 400 MHz): δ11.29 (br, 1H), 7.74 (d, J=2.0 Hz, 1H), 7.53 (d, J=2.0 Hz, 1H), 7.09-7.12 (m, 2H), 6.72 (s, 1H), 3.75 (s, 3H), 3.53 (q, J=7.2 Hz, 2H), 3.48 (s, 3H), 3.14 (s, 3H), 1.47 (s, 6H), 1.26 (t, J=7.2 Hz, 3H).

Embodiment 3: N-(5-(2-(2,6-dioxopiperidin-3-yl)-1-oxoisoindolin-4-yl)pent-4-yn-1-yl)-7-(2-(4-fluoro-2,6-dimethylphenoxy)-5-(2-hydroxyprop-2-yl)phenyl)-5-methyl-4-oxo-4,5-dihydro-1H-pyrrolo[3,2-c]pyridine-2-amide

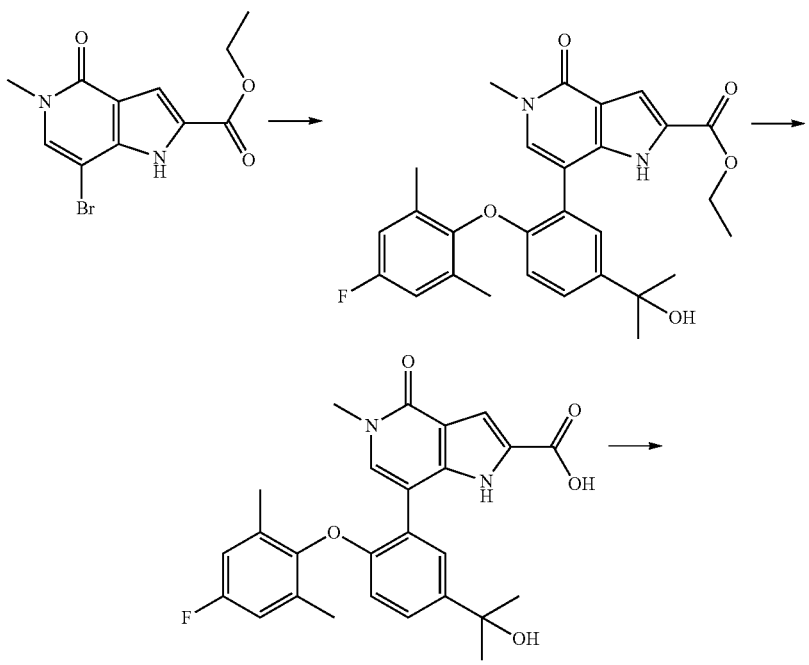

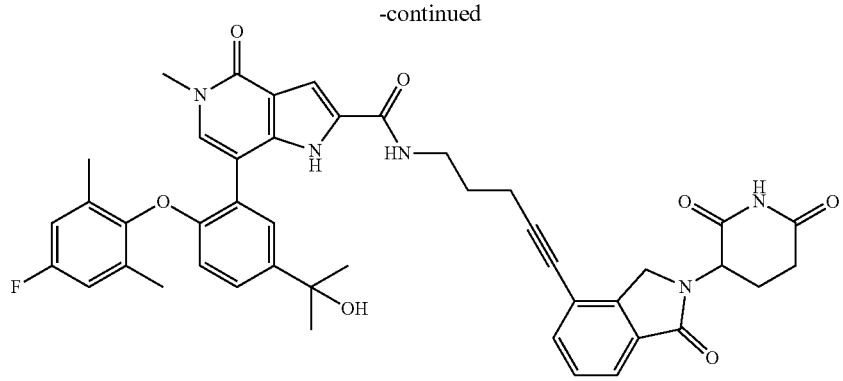

Step 1: Intermediate A (500 mg, 1.68 mmol) and 2-(4-(4-fluoro-2,6-dimethylphenoxy)-3-(4,4,5,5-tetramethyl-1,3,2-dioxaborolan-2-yl)phenyl)propan-2-ol were dissolved in DMF (10 mL), and cesium carbonate Cs₂CO₃ (1.6 g, 4.91 mmol) and Pd(dppf)Cl₂ (245 mg, 0.33 mmol) were added, and the reaction was carried out overnight under nitrogen protection at 100° C. The mixture was directly concentrated, the residue was purified by column chromatography to obtain ethyl 7-(2-(4-fluoro-2,6-dimethylphenoxy)-5-(2-hydroxyprop-2-yl)phenyl)-5-methyl-4-oxo-4,5-dihydro-1H-pyrrolo[3,2-c]pyridine-2-carboxylate (420 mg, white solid). LC-MS: m/z 493.5 [M+H]⁺.

Step 2: Sodium hydroxide NaOH (136 mg, 1.68 mmol) was added to ethyl 7-(2-(4-fluoro-2,6-dimethylphenoxy)-5-(2-hydroxypropan-2-yl)phenyl)-5-methyl-4-oxo-4,5-dihydro-1H-pyrrolo[3,2-c]pyridine-2-carboxylate (420 mg, 0.85 mmol) in ethanol/water solution (10 mL, volume ratio 1:1). The reaction was carried out overnight at room temperature. Most of the ethanol was evaporated, the mixture was diluted by adding water, and the pH value was adjusted to acidic, the mixture was then extracted with ethyl acetate, the organic phase was dried and concentrated to obtain 7-(2-(4-fluoro-2,6-dimethylphenoxy)-5-(2-hydroxyprop-2-yl)phenyl)-5-methyl-4-oxo-4,5-dihydro-1H-pyrrolo[3,2-c]pyridine-2-carboxylic acid (230 mg, white solid). LC-MS: m/z 465.3 [M+H]⁺.

Step 3: 7-(2-(4-fluoro-2,6-dimethylphenoxy)-5-(2-hydroxyprop-2-yl)phenyl)-5-methyl-4-oxo-4,5-dihydro-1H-pyrrolo[3,2-c]pyridine-2-carboxylic acid (28 mg, 0.060 mmol) and 3-(4-(5-aminopentyl-1-yn-1-yl)-1-oxoisoindolin-2-yl) piperidine-2,6-dione hydrochloride (18 mg, 0.050 mmol) were dissolved in DCM (2 mL), and DIEA (36 mg, 0.28 mmol) and 1-propylphosphonic anhydride T3P (88 mg, 0.28 mmol) were added thereto and the reaction was stirred for 2 h at room temperature. The mixture was directly concentrated, the residue was purified by neutral preparative chromatography to obtain N-(5-(2-(2,6-dioxopiperidin-3-yl)-1-oxoisoindolin-4-yl)pent-4-yn-1-yl)-7-(2-(4-fluoro-2,6-dimethylphenoxy)-5-(2-hydroxyprop-2-yl)phenyl)-5-methyl-4-oxo-4,5-dihydro-1H-pyrrolo[3,2-c]pyridine-2-amide (3 mg, white solid). LC-MS (M+H) 772.6. ¹H-NMR (CDCl₃, 400 MHz): δ9.57 (s, 1H), 8.63 (s, 1H), 7.71 (d, J=6.4 Hz, 1H), 7.63 (s, 1H), 7.23-7.52 (m, 4H), 6.76 (d, J=8.8 Hz, 2H), 6.41 (d, J=8.8 Hz, 1H), 5.17 (br s, 1H), 4.25-4.60 (m, 2H), 3.55-3.72 (m, 5H), 2.79 (br s, 2H), 2.57 (br s, 2H), 1.96-2.17 (m, 10H), 1.61 (s, 6H).

Embodiment 4: N-(5-(2-(2,6-dioxopiperidin-3-yl)-1-oxoisoindolin-4-yl)pentyl)-7-(2-(4-fluoro-2,6-dimethylphenoxy)-5-(2-hydroxyprop-2-yl)phenyl)-5-methyl-4-oxo-4,5-dihydro-1H-pyrrolo[3,2-c]pyridine-2-amide

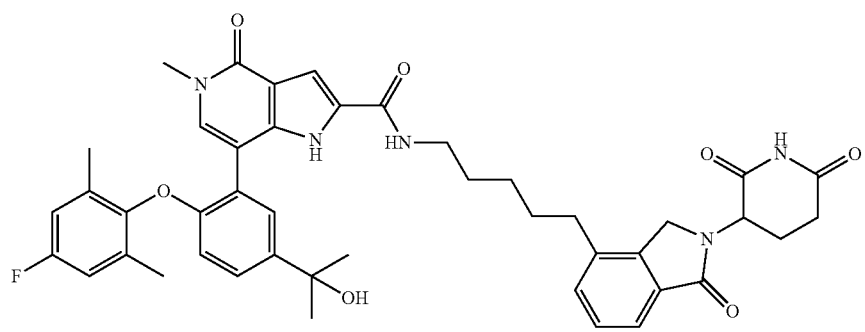 [SMILES: Cc1cc(F)cc(C)c1Oc1ccc(C(C)(C)O)cc1-c1cn(C)c(=O)c2cc(C(=O)NCCCCCc3cccc4c3CN(C3CCC(=O)NC3=O)C4=O)[nH]c12]

3-(4-(5-aminopentyl)-1-oxoisoindolin-2-yl)piperidine-2,6-dione was used as the raw material, and the operation was the same as in embodiment 3. LC-MS (M+H) 776.6. ¹H-NMR (CDCl₃, 400 MHz): δ9.67 (s, 1H), 9.49 (s, 1H), 7.72 (d, J=7.2 Hz, 1H), 7.58 (d, J=2.0 Hz, 1H), 7.51 (s, 1H), 7.26-7.45 (m, 4H), 6.78 (d, J=8.8 Hz, 2H), 6.57 (t, J=5.6 Hz, 1H), 6.44 (d, J=8.4 Hz, 1H), 5.27-5.35 (m, 1H), 4.50 (d, J=15.6 Hz, 1H), 4.28 (d, J=16.0 Hz, 1H), 3.60-3.72 (m, 5H), 3.10-3.15 (m, 1H), 2.83-2.87 (m, 2H), 2.71-2.76 (m, 1H), 2.53-2.58 (m, 1H), 2.04-2.35 (m, 11H), 1.48-1.60 (m, 8H).

Embodiment 5: N-(4-(2-((2-(2,6-dioxopiperidin-3-yl)-1,3-dioxoisoindolin-4-yl)oxo)acetamido)butyl)-7-(2-(4-fluoro-2,6-dimethylphenoxy)-5-(2-hydroxyprop-2-yl)phenyl)-5-methyl-4-oxo-4,5-dihydro-1H-pyrrolo[3,2-c]pyridine-2-amide

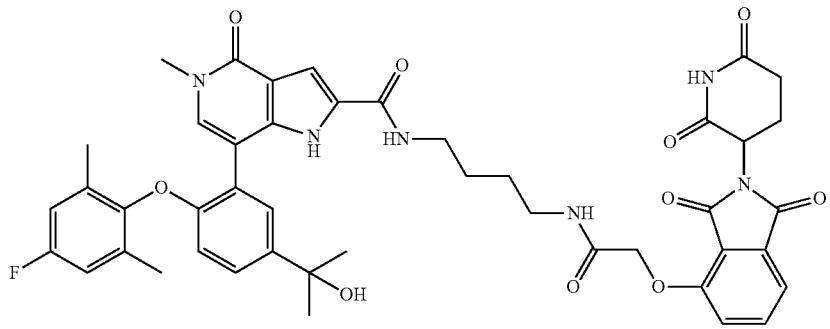 [SMILES: Cc1cc(F)cc(C)c1Oc1ccc(C(C)(C)O)cc1-c1cn(C)c(=O)c2cc(C(=O)NCCCCNC(=O)COc3cccc4c3C(=O)N(C3CCC(=O)NC3=O)C4=O)[nH]c12]

N-(4-aminobutyl)-2-((2-(2,6-dioxopiperidin-3-yl)-1,3-dioxoisoindolin-4-yl)oxo)acetamide was used as the raw material, and the operation was the same as in embodiment 3. LC-MS (M+H) 849.5. $^1$H-NMR (CDCl$_3$, 400 MHz): δ9.87 (br s, 1H), 9.53 (s, 1H), 7.53-7.75 (m, 4H), 7.20-7.33 (m, 3H), 6.85 (br s, 1H), 6.77 (d, J=8.8 Hz, 2H), 6.42 (d, J=8.4 Hz, 1H), 4.93-4.98 (m, 1H), 4.61-4.66 (m, 2H), 3.68 (s, 3H), 3.34-3.57 (m, 4H), 2.68-2.86 (m, 3H), 2.30-2.34 (m, 1H), 1.90-2.15 (m, 8H), 1.49-1.60 (m, 8H).

Embodiment 6: N-(3-(2-(2-(3-((2-(2,6-dioxopiperidin-3-yl)-1,3-dioxoisoindolin-4-yl)amino)propoxy)ethoxy)ethoxy)propyl)-7-(2-(4-fluoro-2,6-dimethylphenoxy)-5-(2-hydroxyprop-2-yl)phenyl)-5-methyl-4-oxo-4,5-dihydro-1H-pyrrole[3,2-c]pyridine-2-amide

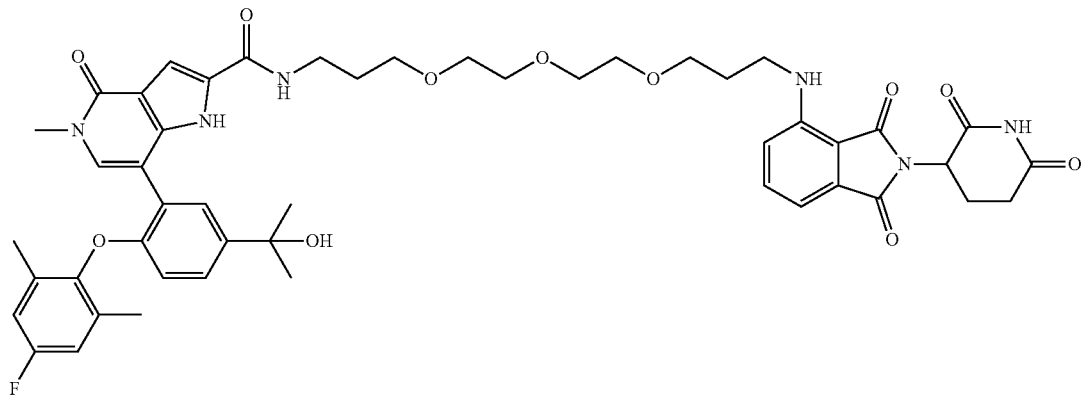 [SMILES: Cc1cc(F)cc(C)c1Oc1ccc(C(C)(C)O)cc1-c1cn(C)c(=O)c2cc(C(=O)NCCCOCCOCCOCCCNc3cccc4c3C(=O)N(C3CCC(=O)NC3=O)C4=O)[nH]c12]

4-((3-(2-(2-(3-aminopropoxy)ethoxy)ethoxy)propyl)amino)-2-(2,6-dioxopiperidin-3-yl)isoindoline-1,3-dione hydrochloride was used as the raw material and the operation was the same as in embodiment 3. LC-MS (M+H) 923.7. $^1$H-NMR (CDCl$_3$, 400 MHz): δ9.47 (br s, 1H), 8.72 (s, 1H), 7.56 (d, J=2.0 Hz, 1H), 7.43 (t, J=8.0 Hz, 1H), 7.23-7.34 (m, 2H), 7.04 (d, J=7.2 Hz, 1H), 6.87 (d, J=8.4 Hz, 1H), 6.77 (d, J=8.8 Hz, 2H), 6.41-6.45 (m, 2H), 4.87-4.91 (m, 1H), 3.48-3.79 (m, 17H), 3.34-3.36 (m, 2H), 2.70-2.88 (m, 3H), 2.26 (br s, 1H), 2.10 (s, 6H), 1.81-1.89 (m, 4H), 1.59 (s, 6H).

Embodiment 7: N-(2-(2-(2-(3-((2-(2,6-dioxopiperidin-3-yl)-1,3-dioxoisoindolin-4-yl)amino)-3-oxo-n-propoxy)ethoxy)ethoxy)ethyl)-5-methyl-4-oxo-7-(2,2,4-trimethyl-6-(methyl sulfonyl)-3-oxo-3,4-dihydro-2H-benzo[b] [1,4] oxazin-8-yl)-4,5-dihydro-1H-pyrrolo[3,2-c]pyridine-2-amide

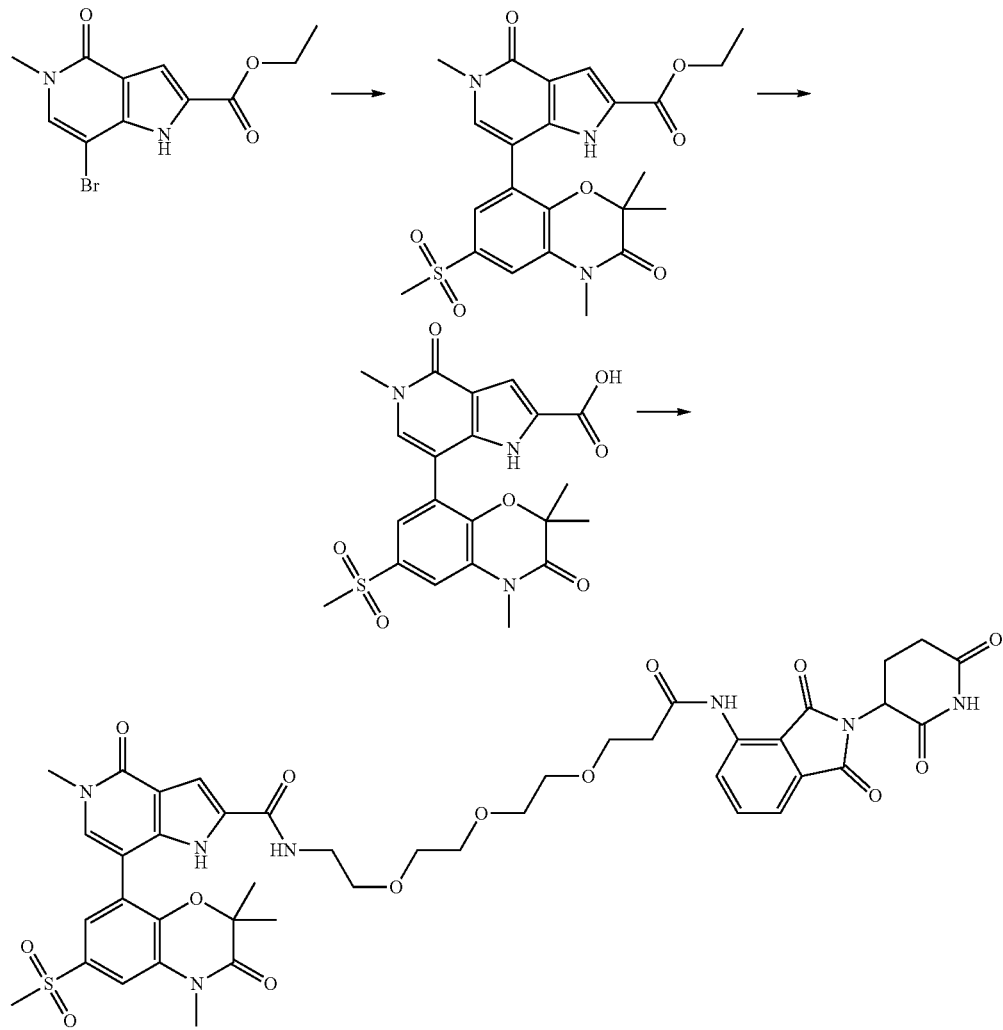

Step 1: under nitrogen protection, 8-bromo-2,2,4-trimethyl-6-(methylsulfonyl)-2H-benzo[b][1,4]oxazin-3(4H)-one (0.77 g, 2.2 mmol) was dissolved in DMF (20 mL), bis(pinacolato)diboron (1.1 g, 4.4 mmol), cesium carbonate (2.1 g, 6.4 mmol) and Pd(dppf)Cl₂ (160 mg, 0.22 mmol) were added thereto, the mixture was stirred at 110° C. for 2 h, then intermediate A (1.0 g, 2.2 mmol) was added thereto and stirring was continued overnight. After cooling to room temperature, water was added to the mixture, the mixture was extracted with DCM, then the organic phase was dried over anhydrous sodium sulfate, concentrated and purified by silica gel chromatography to obtain ethyl 5-methyl-4-oxo-7-(2,2,4-trimethyl-6-(methylsulfonyl)-3-oxo-3,4-dihydro-2H-benzo[b] [1,4] oxazin-8-yl)4,5-dihydro-1H-pyrrolo[3,2-c]pyridine-2-carboxylate (212 mg, white solid). LC-MS: m/z 642.2 [M−H]⁺.

Step 2: Sodium hydroxide (27 mg, 0.67 mmol) was added to the product (212 mg, 0.33 mmol) obtained in step 1 in ethanol/water solution (10 mL, volume ratio 1:1). The reaction was carried out overnight at room temperature. Most of the ethanol was evaporated, the mixture was diluted by adding water, and the pH value was adjusted to acidic, the mixture was then extracted with ethyl acetate, the organic phase was dried and concentrated to obtain 5-methyl-4-oxo-7-(2,2,4-trimethyl-6-(methylsulfonyl)-3-oxo-3,4-dihydro-2H-benzo[b][1,4]oxazin-8-yl)-4,5-dihydro-1H-pyrrolo[3,2-c]pyridine-2-carboxylic acid (130 mg, white solid). LC-MS: m/z 460.2 [M+H]⁺.

Step 3: The product obtained in step 2 (46 mg, 0.10 mmol) and 3-(2-(2-(2-aminoethoxy)ethoxy)ethoxy)-N-(2-(2,6-dioxopiperidin-3-yl)-1,3-dioxoisoindolin-4-yl)propanamide (48 mg, 0.10 mmol) were dissolved in DCM (2 mL), and DIEA (26 mg, 0.20 mmol) and T3P (63 mg, 0.20 mmol) were added, and the reaction was stirred for 2 h at room temperature. The mixture was directly concentrated, the residue was purified by neutral preparative chromatography to obtain N-(2-(2-(2-(3-((2-(2,6-dioxopiperidin-3-yl)-1,3-dioxoisoindolin-4-yl)amino)-3-oxo-n-propoxy)ethoxy)ethoxy)ethyl)-5-methyl-4-oxo-7-(2,2,4-trimethyl-6-(methylsulfonyl)-3-oxo-3,4-dihydro-2H-benzo[b] [1,4] oxazin-8-yl)-4,5-dihydro-1H-pyrrolo[3,2-c]pyridine-2-amide (5 mg, white solid). LC-MS (M+H) 918.3.

Embodiment 8: N-(6-(2-(2,6-dioxopiperidin-3-yl)-1,3-dioxoisoindolin-4-yl)-n-hexyl)-6-methyl-7-oxo-4-(2,2,4-trimethyl-6-(methylsulfonyl)-3-oxo-3,4-dihydro-2H-benzo[b][1,4]oxazin-8-yl)-6,7-dihydro-1H-pyrrolo[2,3-c]pyridine-2-amide

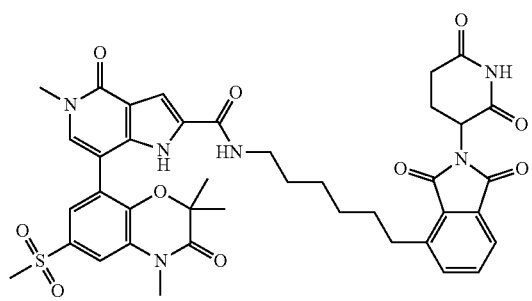 [SMILES: CN1C(=O)C(C)(C)Oc2c(-c3cn(C)c(=O)c4cc(C(=O)NCCCCCCc5cccc6c5C(=O)N(C5CCC(=O)NC5=O)C6=O)[nH]c34)cc(S(C)(=O)=O)cc21]

4-(6-Aminohexyl)-2-(2,6-dioxopiperidin-3-yl) isoindoline-1,3-dione was used as the raw material and the operation was the same as in embodiment 7. LC-MS (M+H) 799.3.

Embodiment 9: 7-(2-(4-fluoro-2,6-dimethylphenoxy)-5-(2-hydroxyprop-2-yl)phenyl)-N-(2-methoxyethyl)-5-methyl-4-oxo-4,5-dihydro-1H-pyrrolo[3,2-c]pyridine-2-amide

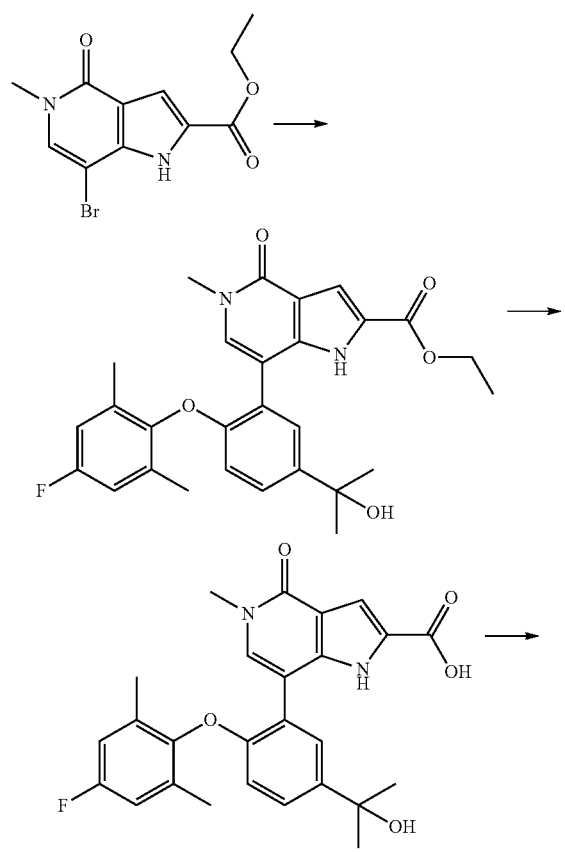

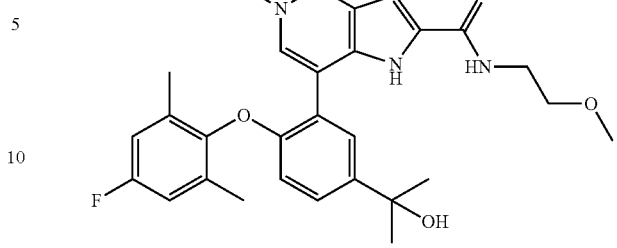

Step 1: Intermediate A (700 mg, 2.35 mmol), 2-(4-(4-fluoro-2,6-dimethylphenoxy)-3-(4,4,5,5-tetramethyl-1,3,2-dioxaborolan-2-yl)phenyl)propan-2-ol (1.1 g, 2.75 mmol), cesium carbonate (2.3 g, 7.06 mmol) and Pd(dppf)Cl$_2$ (400 mg, 0.55 mmol) were dissolved in DMF (15 mL), the mixture was ventilated with nitrogen for 10 min, and the reaction was carried out overnight under nitrogen protection at 100° C. The mixture was cooled to room temperature, filtered and the filtrate was concentrated, the residue was purified by column chromatography to obtain ethyl 7-(2-(4-fluoro-2,6-dimethylphenoxy)-5-(2-hydroxyprop-2-yl)phenyl)-5-methyl-4-oxo-4,5-dihydro-1H-pyrrolo[3,2-c]pyridine-2-carboxylate (753 mg, white solid). LC-MS: m/z 493.4 [M−H]$^+$.

Step 2: Ethyl 7-(2-(4-fluoro-2,6-dimethylphenoxy)-5-(2-hydroxyprop-2-yl)phenyl)-5-methyl-4-oxo-4,5-dihydro-1H-pyrrolo[3,2-c] pyridine-2-carboxylate (753 mg, 1.53 mmol) was dissolved in ethanol (30 mL), and NaOH (183 mg, 4.59 mmol) in aqueous solution (6 mL) was added thereto, the reaction was carried out at room temperature overnight. The mixture was concentrated, then dichloromethane and water were added thereto for dissolution, the pH value was adjusted to 7 with 1M hydrochloric acid, the mixture was shaken, the organic phase was separated, then concentrated to obtain 7-(2-(4-fluoro-2,6-dimethylphenoxy)-5-(2-hydroxyprop-2-yl)phenyl)-5-methyl-4-oxo-4,5-dihydro-1H-pyrrolo[3,2-c] pyridine-2-carboxylic acid (590 mg, pale yellow solid). LC-MS: m/z 465.4 [M+H]$^+$.

Step 3: 7-(2-(4-fluoro-2,6-dimethylphenoxy)-5-(2-hydroxyprop-2-yl)phenyl)-5-methyl-4-oxo-4,5-dihydro-1H-pyrrolo[3,2-c]pyridine-2-carboxylic acid (80 mg, 0.17 mmol) was dissolved in DMF (3 mL), HATU (99 mg, 0.26 mmol) and DIEA (66 mg, 0.51 mmol) were added thereto and the mixture was stirred for 5 min at room temperature, 2-methoxyethylamine (20 mg, 0.26 mmol) was added and the reaction was carried out for 2 h at room temperature. The mixture was filtered and the filtrate was purified by preparative chromatography to obtain 7-(2-(4-fluoro-2,6-dimethylphenoxy)-5-(2-hydroxyprop-2-yl)phenyl)-N-(2-methoxyethyl)-5-methyl-4-oxo-4,5-dihydro-1H-pyrrolo[3,2-c] pyridine-2-amide (26.9, white solid). LC-MS (M+H) 522.0. $^1$H-NMR (DMSO-d6, 400 MHz): δ10.95 (s, 1H), 8.47 (t, J=5.2 Hz, 1H), 7.51 (d, J=2.4 Hz, 1H), 7.46 (s, 1H), 7.38 (dd, J=2.4, 8.4 Hz, 1H), 7.29 (d, J=2.0 Hz, 1H), 6.97 (d, J=8.8 Hz, 2H), 6.33 (d, J=8.8 Hz, 1H), 4.98 (s, 1H), 3.55 (s, 3H), 3.38-3.44 (m, 4H), 3.27 (s, 3H), 2.04 (s, 6H), 1.46 (s, 6H).

Embodiment 10: 7-(2-(4-fluoro-2,6-dimethylphenoxy)-5-(2-hydroxyprop-2-yl)phenyl)-N-(2-methylsulfonyl)-4-oxo-4,5-dihydro-1H-pyrrolo pyridine-2-amide

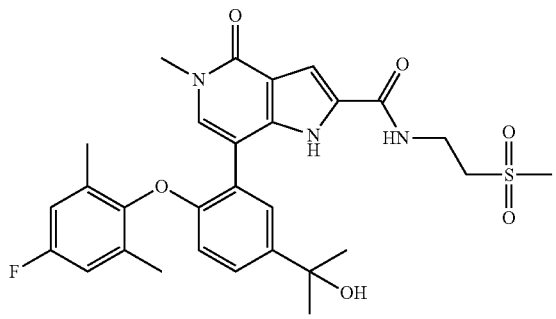 [SMILES: Cc1cc(F)cc(C)c1Oc1ccc(C(C)(C)O)cc1-c1cn(C)c(=O)c2cc(C(=O)NCCS(C)(=O)=O)[nH]c12]

2-methylsulfonyl ethylamine was used as raw material, the operation was the same as embodiment 9. LC-MS (M+H) 570.0. $^1$H-NMR (DMSO-d6, 400 MHz): δ11.01 (d, J=1.6 Hz, 1H), 8.66 (t, J=5.6 Hz, 1H), 7.48 (d, J=2.4 Hz, 1H), 7.46 (s, 1H), 7.36 (dd, J=2.4, 8.4 Hz, 1H), 7.29 (d, J=2.0 Hz, 1H), 6.97 (d, J=9.2 Hz, 2H), 6.31 (d, J=8.4 Hz, 1H), 4.97 (s, 1H), 3.62-3.67 (m, 2H), 3.54 (s, 3H), 3.33-3.37 (m, 2H), 3.02 (s, 3H), 2.04 (s, 6H), 1.45 (s, 6H).

Embodiment 11: N-(2,2-difluoroethyl)-7-(2-(4-fluoro-2,6-dimethylphenoxy)-5-(2-hydroxyprop-2-yl)phenyl)-5-methyl-4-oxo-4,5-dihydro-1H-pyrrolo[3,2-c] pyridine-2-amide

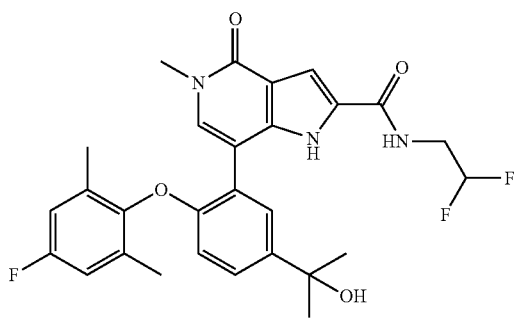 [SMILES: Cc1cc(F)cc(C)c1Oc1ccc(C(C)(C)O)cc1-c1cn(C)c(=O)c2cc(C(=O)NCC(F)F)[nH]c12]

2.2-dilfluoroethylamine was used as raw material, the operation was the same as embodiment 9. LC-MS (M+H) 528.0. $^1$H-NMR (DMSO-d6, 400 MHz): δ11.09 (s, 1H), 8.73 (t, J=5.6 Hz, 1H), 7.50 (d, J=2.0 Hz, 1H), 7.47 (s, 1H), 7.35-7.38 (m, 2H), 6.96 (d, J=9.2 Hz, 2H), 6.32 (d, J=8.4 Hz, 1H), 5.95-6.23 (m, 1H), 4.98 (s, 1H), 3.61-3.71 (m, 2H), 3.55 (s, 3H), 2.03 (s, 6H), 1.45 (s, 6H).

Embodiment 12: N-(cyclopropylmethyl)-7-(2-(4-fluoro-2,6-dimethylphenoxy)-5-(2-hydroxyprop-2-yl)phenyl)-5-methyl-4-oxo-4,5-dihydro-1H-pyrrolo[3,2-c]pyridine-2-amide

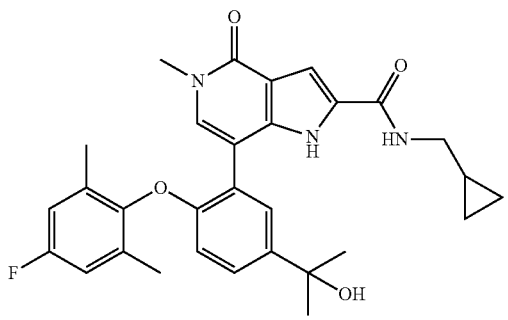 [SMILES: Cc1cc(F)cc(C)c1Oc1ccc(C(C)(C)O)cc1-c1cn(C)c(=O)c2cc(C(=O)NCC3CC3)[nH]c12]

Cyclopropylmethylamine was used as raw material, the operation was the same as embodiment 9. LC-MS (M+H) 518.0. $^1$H-NMR (DMSO-d6, 400 MHz): δ10.93 (s, 1H), 8.47 (t, J=5.6 Hz, 1H), 7.50 (d, J=2.0 Hz, 1H), 7.46 (s, 1H), 7.37 (dd, J=2.4, 8.8 Hz, 1H), 7.29 (d, J=1.6 Hz, 1H), 6.97 (d, J=9.2 Hz, 2H), 6.33 (d, J=8.8 Hz, 1H), 5.00 (s, 1H), 3.55 (s, 3H), 3.12 (d, J=6.0 Hz, 2H), 2.04 (s, 6H), 1.45 (s, 6H), 0.81-0.86 (m, 1H), 0.40-0.45 (m, 2H), 0.18-0.22 (m, 2H).

Embodiment 13: 7-(2-(4-fluoro-2,6-dimethylphenoxy)-5-(2-hydroxyprop-2-yl)phenyl)-N-isopropyl-5-methyl-4-oxo-4,5-dihydro-1H-pyrrolo[3,2-c]pyridine-2-amide

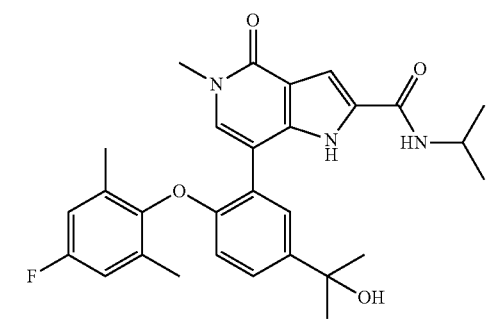 [SMILES: Cc1cc(F)cc(C)c1Oc1ccc(C(C)(C)O)cc1-c1cn(C)c(=O)c2cc(C(=O)NC(C)C)[nH]c12]

Isopropylamine was used as raw material, the operation was the same as embodiment 9. LC-MS (M+H) 506.0. $^1$H-NMR (DMSO-d6, 400 MHz): δ10.90 (s, 1H), 8.17 (d, J=7.6 Hz, 1H), 7.51 (d, J=2.0 Hz, 1H), 7.47 (s, 1H), 7.38 (dd, J=2.0, 8.4 Hz, 1H), 7.28 (d, J=2.0 Hz, 1H), 6.98 (d, J=9.2 Hz, 2H), 6.33 (d, J=8.8 Hz, 1H), 5.02 (s, 1H), 4.01-4.07 (m, 1H), 3.51 (s, 3H), 2.03 (s, 6H), 1.45 (s, 6H), 1.14 (d, J=6.8 Hz, 6H).

Embodiment 14: 7-(2-(4-fluoro-2,6-dimethylphenoxy)-5-(2-hydroxyprop-2-yl)phenyl)-5-methyl-4-oxo-N-(2,2,2-trifluoroethyl)-4,5-dihydro-1H-pyrrolo[3,2-c]pyridine-2-amide

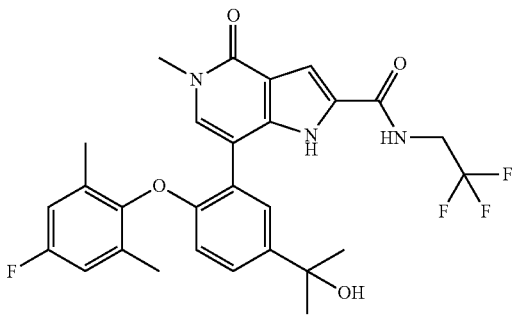 [SMILES: Cc1cc(F)cc(C)c1Oc1ccc(C(C)(C)O)cc1-c1cn(C)c(=O)c2cc(C(=O)NCC(F)(F)F)[nH]c12]

2,2,2-trifluoroethylamine was used as raw material, the operation was the same as embodiment 9. LC-MS (M+H) 546.0. $^1$H-NMR (DMSO-d6/D$_2$O, 400 MHz): δ7.50 (d, J=2.4 Hz, 2H), 7.36-7.41 (m, 2H), 6.97 (d, J=9.2 Hz, 2H), 6.33 (d, J=8.4 Hz, 1H), 4.07-4.11 (m, 2H), 3.56 (s, 3H), 2.02 (s, 6H), 1.46 (s, 6H).

Embodiment 15: N-(cyanomethyl)-7-(2-(4-fluoro-2,6-dimethylphenoxy)-5-(2-hydroxyprop-2-yl)phenyl)-5-methyl-4-oxo-4,5-dihydro-1H-pyrrolo[3,2-c]pyridine-2-amide

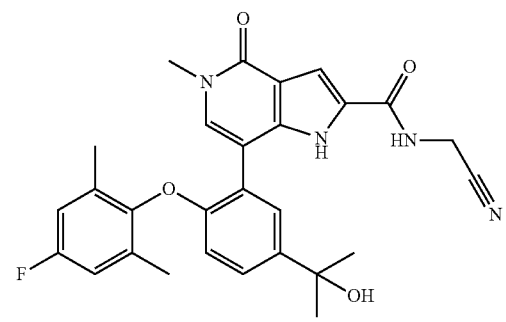 [SMILES: Cc1cc(F)cc(C)c1Oc1ccc(C(C)(C)O)cc1-c1cn(C)c(=O)c2cc(C(=O)NCC#N)[nH]c12]

2-Aminoacetonitrile was used as raw material, the operation was the same as embodiment 9. LC-MS (M+H) 503.0. $^1$H-NMR (CD$_3$OD, 400 MHz): δ7.60 (d, J=2.4 Hz, 1H), 7.50 (s, 1H), 7.40-7.42 (m, 2H), 6.82 (d, J=8.8 Hz, 2H), 6.43 (d, J=8.4 Hz, 1H), 4.32 (s, 2H), 3.70 (s, 3H), 2.07 (s, 6H), 1.56 (s, 6H).

Embodiment 16: N-cyclopropyl-7-(2-(4-fluoro-2,6-dimethylphenoxy)-5-(2-hydroxyprop-2-yl)phenyl)-5-methyl-4-oxo-4,5-dihydro-1H-pyrrolo[3,2-c]pyridine-2-amide

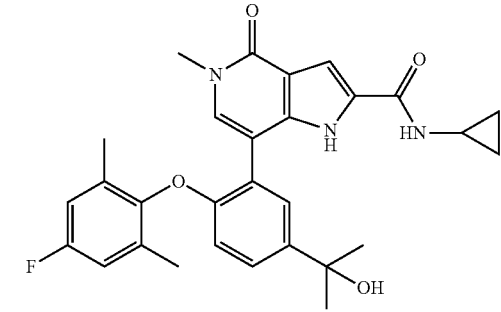 [SMILES: Cc1cc(F)cc(C)c1Oc1ccc(C(C)(C)O)cc1-c1cn(C)c(=O)c2cc(C(=O)NC3CC3)[nH]c12]

Cyclopropylamine was used as raw material, the operation was the same as embodiment 9. LC-MS (M+H) 504.0. $^1$H-NMR (CD$_3$OD, 400 MHz): δ7.60 (d, J=2.4 Hz, 1H), 7.48 (s, 1H), 7.41 (dd, J=2.4, 8.8 Hz, 1H), 7.35 (s, 1H), 6.83 (d, J=8.8 Hz, 2H), 6.44 (d, J=8.8 Hz, 1H), 3.69 (s, 3H), 2.79-2.82 (m, 1H), 2.08 (s, 6H), 1.56 (s, 6H), 0.77-0.80 (m, 2H), 0.60-0.64 (m, 2H).

Embodiment 17: 2-(azetidine-1-carbonyl)-7-(2-(4-fluoro-2,6-dimethylphenoxy)-5-(2-hydroxyprop-2-yl)phenyl)-5-methyl-1,5-dihydro-4H-pyrrolo[3,2-c]pyridin-4-one

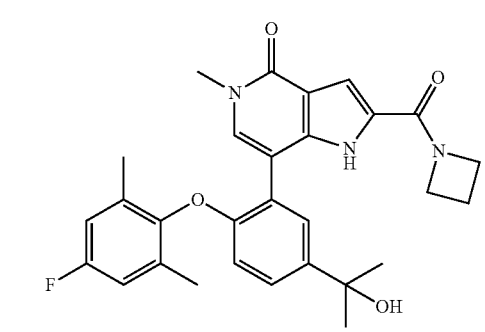 [SMILES: Cc1cc(F)cc(C)c1Oc1ccc(C(C)(C)O)cc1-c1cn(C)c(=O)c2cc(C(=O)N3CCC3)[nH]c12]

Azetidine was used as raw material, the operation was the same as embodiment 9. LC-MS (M+H) 504.0. $^1$H-NMR (CD$_3$OD, 400 MHz): δ7.60 (d, J=2.4 Hz, 1H), 7.51 (s, 1H), 7.41 (dd, J=2.4, 8.4 Hz, 1H), 7.14 (s, 1H), 6.83 (d, J=8.8 Hz, 2H), 6.43 (d, J=8.8 Hz, 1H), 4.61 (t, J=7.6 Hz, 2H), 4.20 (t, J=7.6 Hz, 2H), 3.70 (s, 3H), 2.41-2.47 (m, 2H), 2.08 (s, 6H), 1.56 (s, 6H).

Embodiment 18: N-(3,3-difluorocyclobutyl)-7-(2-(4-fluoro-2,6-dimethylphenoxy)-5-(2-hydroxyprop-2-yl)phenyl)-5-methyl-4-oxo-4,5-dihydro-1H-pyrrolo[3,2-c] pyridine-2-amide

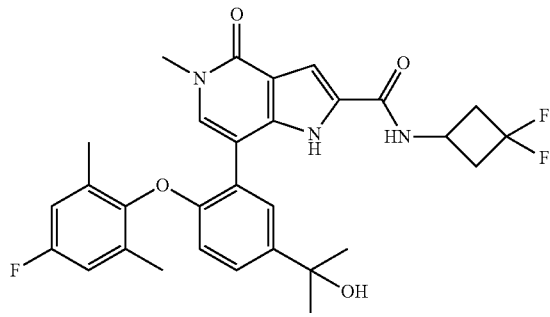

3,3-dilfluorocyclobutylamine was used as raw material, the operation was the same as embodiment 9. LC-MS (M+H) 554.0. ¹H-NMR (CD₃OD, 400 MHz): δ7.60 (d, J=2.0 Hz, 1H), 7.49 (s, 1H), 7.39-7.43 (m, 2H), 6.83 (d, J=9.2 Hz, 2H), 6.44 (d, J=8.8 Hz, 1H), 4.30-4.35 (m, 1H), 3.70 (s, 3H), 2.92-3.01 (m, 2H), 2.66-2.74 (m, 2H), 2.07 (s, 6H), 1.56 (s, 6H).

Embodiment 19: 2-(3,3-difluoroazetidine-1-carbonyl)-7-(2-(4-fluoro-2,6-dimethylphenoxy)-5-(2-hydroxyprop-2-yl)phenyl)-5-methyl-1,5-dihydro-4H-pyrrolo[3,2-c]pyridin-4-one

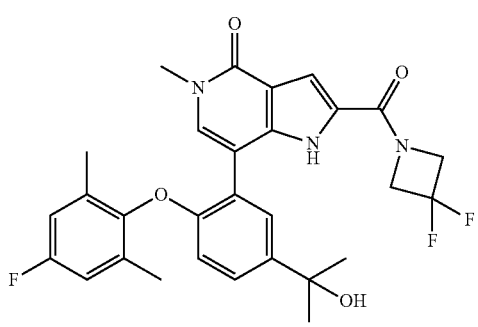 [SMILES: Cc1cc(F)cc(C)c1Oc1ccc(C(C)(C)O)cc1-c1cn(C)c(=O)c2cc(C(=O)N3CC(F)(F)C3)[nH]c12]

3,3-dilfluoroazetidine was used as raw material, the operation was the same as embodiment 9. LC-MS (M+H) 540.0. ¹H-NMR (CD₃OD, 400 MHz): δ7.60 (d, J=2.0 Hz, 1H), 7.52 (s, 1H), 7.41 (dd, J=2.4, 8.8 Hz, 1H), 7.16 (s, 1H), 6.83 (d, J=8.8 Hz, 2H), 6.43 (d, J=8.8 Hz, 1H), 4.40-5.00 (m, 4H), 3.70 (s, 3H), 2.08 (s, 6H), 1.56 (s, 6H).

Embodiment 20: N-(1,3-difluoropropyl-2-yl)-7-(2-(4-fluoro-2,6-dimethylphenoxy)-5-(2-hydroxyprop-2-yl)phenyl)-5-methyl-4-oxo-4,5-dihydro-1H-pyrrolo[3,2-c]pyridine-2-amide

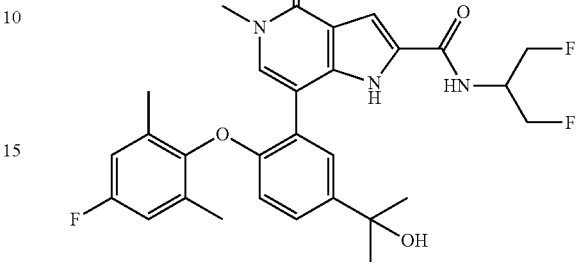

1,3-difluoropropyl-2-amine hydrochloride was used as raw material, the operation was the same as embodiment 9. LC-MS (M+H) 542.0.

Comparative compound 1: N-ethyl-4-(2-(4-fluoro-2,6-dimethylphenoxy)-5-(2-hydroxyprop-2-yl)phenyl)-6-methyl-7-oxo-6,7-dihydro-1H-pyrrolo[2,3-c]pyridine-2-amide

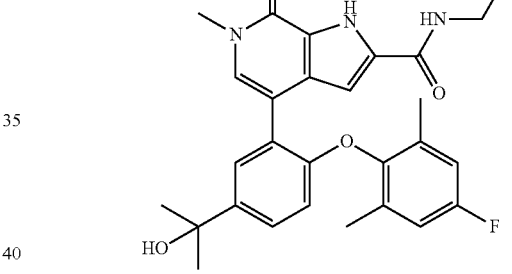

Intermediate B was used as raw material, the comparative compound 1 was prepared according to the synthesis method of the embodiment in patent WO2017177955A1. LC-MS (M+H) 492.1. ¹H-NMR (CDCl₃, 400 MHz): δ10.89 (s, 1H), 7.59 (s, 1H), 7.17 (s, 1H), 6.76-6.78 (m, 4H), 6.40 (d, J=8.8 Hz, 1H), 5.46 (bs, 1H), 3.73 (s, 3H), 3.48-3.51 (m, 2H), 2.07 (s, 6H), 1.61 (s, 6H), 1.25 (t, J=7.8 Hz, 3H).

Test Embodiment 1: BRD4 AlphaScreen Determination (1) 1× Assay buffer was prepared according to the kit requirements of ReactionBiologyCorp. (RBC). (2) Compound concentration gradient preparation: the test compounds were tested at final concentrations starting at 10 μM, with 10 concentrations at 3-fold dilution and single well test was set for each concentration. The positive control compound(+)-JQ-1 was tested at final concentrations starting at 1 μM, with 10 concentrations at 3-fold dilution, and duplicated well test was set for each concentration. The solution was gradient diluted to the corresponding 1000-fold final concentration in a 384-well Source plate, and then 20 nL of the solution was transferred to the 384-well reaction plate with Echo550 to be measured. 20 nL of 100% DMSO was transferred to the Max well, and the highest concentration of the positive compounds were transferred to the Min wells. (3) 4× protein solution with 1× reaction solution was prepared. (4) 5 μL of 4× protein solution was added to each well, centrifuged at 1000 rpm for 1 min, and incubated at room temperature for 15 min. (5) 4× peptide solution with 1× reaction solution was prepared. (6) 5 μL of 4× peptide solution was added to each well of the reaction plate, centrifuged at 1000 rpm for 1 min. (7) 10 μL of the assay solution was added, centrifuged at 1000 rpm for 60 seconds, the solution was mixed with gentle shaking, and incubated at room temperature for 60 minutes. (8) Reading with EnVision. (9) The IC50 values of the compounds for protein binding inhibition was obtained by fitting the dose-effect curve with the analytical software GraphPad Prism 5. (See Table 1 for specific values)

TABLE 1

$IC_{50}$ values of the compounds inhibiting BRD4-BD1/BD2

| Number | BRD4-BD1 $IC_{50}$/nM | BRD4-BD2 $IC_{50}$/nM |
| --- | --- | --- |
| 1 | 40 | 0.65 |
| 2 | 36 | 1.2 |
| 9 | 37 | 0.51 |
| 10 | 58 | 0.69 |
| 11 | 109 | 0.57 |
| 12 | 50 | <0.50 |
| 13 | 79 | <0.50 |
| 14 | 219 | <0.50 |
| 15 | 81 | <0.50 |
| 16 | 93 | <0.50 |
| 17 | 233 | 7.4 |
| 18 | 117 | <0.50 |
| 19 | 292 | 2.8 |
| 20 | 98 | <0.51 |
| Comparative Compound 1: | 177 | 1.4 |

Result: all of the embodiments 1 to 20 provided by the present disclosure have IC50 values of the inhibitory activity on BRD4-BD 2 less than 10 nM, and the IC50 values of the inhibitory activity of most of the embodiments were less than 1 nM, showing stronger inhibitory activity than the comparative compound 1; while some of the embodiments also showed stronger inhibitory activity on BRD4-BD 1 than the comparative compound; at the same time, the compound of the embodiments of the present disclosure maintained the relative selectivity of BRD4-BD 2, and the selectivity fold ranging from 10 times to more than 400 times.

Test Embodiment 2: Test of the Inhibitory Activity of the Compounds of the Embodiments on the Proliferation of MV4-11 Cells Specific experimental steps: 1) Day 0: 96 inoculated cells were digested with trypsin and suspended in cell culture medium, the cell density was detected by an automatic cell counter and the cells were diluted with the culture medium to a suitable density, 100 μL of cell suspension was added to the 96-well plate, and the cell-free medium was used as a control well, and the wells were incubated in a 37° C., 5% $CO_2$ cell incubator overnight; 2) Day 1: A total of 8 concentrations of the compound to be tested in the drug-treated cells were tested at 3-fold dilution, 10 μM was the starting assay concentration of the compound to be tested. Specific steps: 200× compound mother liquor was prepared, the compound was diluted with culture medium to a final concentration of 3×, that is, 3 μL of 200× compound was added to 197 μL of culture medium, 50 μL diluted compound was added to each well of the 96-well plate, and placed at 37° C., 5% $CO_2$ cell culture incubator for 72 h; 3) Day 4: Cell viability detection: 96-well cell plate was first equilibrated to room temperature, 40 μL of CellTiter-Glo® reagent was added to each well, mixed on a shaker for 2 minutes to fully lyse the cells, incubated at room temperature for 10 minutes to stabilize the luminescence signal, and the luminescence value was read by the Envision microplate reader; 4) data processing was performed by GraphPad Prism 5.0 software to analyze the data, and nonlinear S-curve regression was used to fit the data to obtain a dose-effect curve, and from which the IC50 value was calculated. Inhibition rate %=(DMSO treated cell wells–compound treated cell wells)/(DMSO treated cell wells–cell free medium wells)×100. The IC50 value was obtained by the four-parameter regression method using the random software in the microplate reader. (See Table 2 for specific values)

TABLE 2

$IC_{50}$ value of the inhibitory activity of the compounds of the embodiments on the proliferation of MV 4-11 cells

| Number | MV4-11 $IC_{50}$/nM |
| --- | --- |
| 1 | 2.3 |
| 2 | 64.0 |
| 3 | <1.5 |
| 4 | <1.5 |
| 5 | <1.5 |
| 6 | 10.2 |
| 7 | <1.5 |
| 8 | <1.5 |
| 9 | 19.8 |
| 10 | 19.8 |
| 11 | 20.4 |
| 12 | 12.7 |
| 13 | 6.6 |
| 14 | 31.3 |
| 15 | 33.3 |
| 16 | 7.95 |
| 17 | 248.5 |
| 18 | 10.6 |
| 19 | 146.7 |
| 20 | 4.8 |
| Comparative Compound 1: | 32.0 |

Results: The IC50 values of some embodiments 1-20 provided by the present disclosure for inhibiting the proliferation of MV 4-11 cells were less than 500 nM, and the IC50 values of some embodiments were even less than 10 nM, showing stronger cell proliferation inhibitory activity than the comparative compound.

Test Embodiment 3: Test of the Inhibitory Activity of the Compounds of the Embodiments on Different Enzymes With the BRD AlfaScreening method similar to test embodiment 1 and the conventional test method of kinase inhibitor, the compounds of some embodiments of the present disclosure were applied to different BRDs such as BRD2 BD1/2, BRD3 BD1/2 and BRD-T BD1/2 enzymes, HDAC, EZH2, LSD1, G9a, etc., and different protein kinases such as EGFR, VEGFR, PDGFR, FGFR, RET, MET, Src, Lyn, Syk, MEK, CDK, RAF, etc., the inhibitory activities were also tested, some of the embodiment compounds, such as embodiments 1, 11, 18, etc., showed good BRD-BD2 selectivity and kinase target selectivity, and the selectivity was more than 100 times.

Test Embodiment 4: Test of the Inhibitory Activity of the Compounds of the Embodiments on the Proliferation of Different Cell Lines The proliferation inhibitory activity of some of the embodiment compounds against different cell lines such as LNCAP (+R1881), SKM-1, 22RV1, DU145, MOLM13, MDA-PCA-2b, KASUMI 1, THP-1, KG-1, IEC6, H1299, etc., was tested using similar methods in test embodiment 2 and in the literature. Some embodiments such as embodiment 1, embodiment 11, embodiment 18, etc., showed better proliferation inhibitory activity against most AML cell lines and prostate cancer cell lines, with the inhibitory activity ICso less than 1000 nM, and for some cell lines were even less than 100 nM, such as LNCAP, SKM-1, MOLM13, KASUMI 1, THP-1, KG-1, etc.; while the $IC_{50}$ of the proliferation inhibitory activity against IEC6 and H1299 cell lines was greater than 1000 nM, showing a high selectivity of cell proliferation inhibition.

Test Embodiment 5: ADME Test of Part of the Embodiment Compounds (1) Metabolic stability test: 150 µL of liver microsomes (final concentration was 0.5 mg/mL) were subjected to metabolic stability incubation, the system containing NADPH (final concentration was 1 mM), 1 µM of the test compound and the positive control midazolam or the negative control atenolol, the reaction was terminated with acetonitrile containing tinidazole at 0 min, 5 min, 10 min, and 30 min, respectively, then the mixture was vortexed for 10 min, and centrifuged at 15000 rmp for 10 min, 50 µL of the supernatant was injected into 96 well. The metabolic stability of the compound was calculated by measuring the relative reduction of the original drug. (See Table 3 for specific values)

(2) Direct inhibition test (DI test): 1004 of human liver microsomes (final concentration was 0.2 mg/mL) system was subjected to inhibition incubation directly, the system contains NADPH (final concentration was 1 mM), 10 µM compound, positive inhibitor cocktail (ketoconazole 10 µM, quinidine 10 µM, sulfapyrazole 100 µM, a-naphthoflavone 10 µM, tranylcypromine 100004), negative control (0.1% DMSO BPS) and mixed probe substrate (midazolam 1004, testosterone 10004, dextromethorphan 10 µM, diclofenac 20 µM, phenacetin 100 µM, mephenytoin 100 µM), the reaction was terminated after incubation for 20 min. The relative enzyme activity was calculated by measuring the relative production of metabolites.

TABLE 3

Stability values of embodiment compounds on rat, mouse and dog liver microsomes

| Number | Mouse microsomal $T_{1/2}$ (min) | Rat microsomal $T_{1/2}$ (min) | Dog microsomal $T_{1/2}$ (min) |
| --- | --- | --- | --- |
| Embodiment 1 | 170 | 168 | 195 |
| Embodiment 11 | 39 | 77 | 403 |
| Embodiment 18 | 76 | 83 | 400 |
| Comparative Compound 1: | 19 | 62 | 68 |

Comparing the metabolic stability on rat, mouse and dog liver microsomes of the embodiment compounds 1, 11, and 18 with the comparative compound 1, the stability of the microsomes of various genera was significantly improved, especially the microsomes of mice and dogs, and the inhibitory $IC_{50}$ of embodiments 1 and 18 on the main metabolic enzymes CYP1A2, 2C8, 2C19, 3A4, etc., were all greater than 15 µM, showing high druggability.

Test Embodiment 6: In Vivo Pharmacokinetic Parameter Test of the Embodiment Compounds in Rats and Mice Six male SPF-grade SD rats or Balb c mice (Shanghai B&K laboratory animals) were divided into two groups and the test compounds were configured into suitable solutions or suspensions; one group was administered intravenously and one group was administered orally. Blood was collected by jugular vein puncture, and each sample was collected about 0.2 mL/time point, heparin sodium was used for anticoagulation, the blood collection time points were as follows: before administration and 5, 15 and 30 minutes, 1, 2, 4, 6, 8 and 24 h after administration, the blood sample was collected and placed on ice, centrifuged to separate the plasma (centrifugation conditions: 8000 rpm, 6 minutes, 2-8° C.), and the collected plasma was stored at −80° C. before analysis. The plasma samples were analyzed by LC-MS/MS.

According to the blood drug concentration data of the drug, the pharmacokinetic calculation software WinNonlin5.2 non-compartmental model was used to calculate the pharmacokinetic parameters $AUC_{0-t}$, $AUC_{0-\infty}$, $MRT_{0-\infty}$, $C_{max}$, $T_{max}$, $T_{1/2}$ and $V_d$ and other parameters and their mean and standard deviation. In addition, the bioavailability (F) was calculated by the following formula.

$$F = \frac{AUC_{(0-t)(PO)} \times Dose_{IV}}{AUC_{(0-t)(IV)} \times Dose_{(PO)}} \times 100\%$$

For samples with a concentration lower than the lower limit of quantification, when calculating the pharmacokinetic parameters, the samples sampled before reaching $C_{max}$ should be calculated as zero, and samples sampled after reaching $C_{max}$ should be calculated as unquantifiable (BLQ).

Results: Some of the embodiment compounds of the present disclosure have good pharmacokinetic properties in animals, such as in embodiment 1, and 18, the mice administrated by gavage at a dose of 5 mg/kg had excellent PK parameters, with $C_{max}$ greater than 1.5 µM, $T_{1/2}$ greater than 3 hours, and AUC (hr*nM) greater than 5000. The bioavailability of embodiment compounds 1 and 18 to mice were both greater than 40%, which is better than that of comparative compound 1 (the bioavailability of comparative compound 1 in mice was 25%). The beagle dogs administered by gavage at the dose of 10 mg/kg of embodiment 1 and embodiment 18 had excellent PK parameters, with $C_{max}$ of 2.0 $T_{1/2}$ longer than 2 h, and AUC(hr*nM) greater than 15000.

Test Embodiment 7: Test of the Embodiment Compound on the Growth Inhibition of MV 4-11 Transplanted Tumor in Nude Mice The tumor tissue in vigorous growth stage was cut into about 1.5 mm³ and inoculated subcutaneously in the right armpit of nude mice under sterile conditions. The diameter of subcutaneous transplanted tumor in nude mice was measured with vernier caliper, and the animals were randomly divided into groups when the average tumor volume was about 130 mm³. Embodiment compound or comparative compound 1 (prepared with water for injection containing 1% Tween80 to the required concentration for use) was orally administered at a given dose every day for three consecutive weeks, and the solvent control group was given the same amount of solvent. During the whole experiment, the diameter of the transplanted tumor was measured twice a week, and the weight of mice was weighed at the same time. The calculation formula of tumor volume (TV) was: TV=½×a×b², wherein a and b represent the length and width respectively. The relative tumor volume (RTV) was calculated according to the measurement results, and the calculation formula was: RTV=VT/v0. Wherein V0 is the tumor volume measured during the administration in cage (i.e., d0), and Vt is the tumor volume at each measurement. The evaluation index of anti-tumor activity was 1) relative tumor proliferation rate T/C (%), the calculation formula was as follows: T/C (%)=(TRTV/CRTV)×100%, TRTV: treatment group RTV; CRTV: negative control croup RTV; 2) tumor volume growth inhibition rate GI %, the calculation formula was as follows: GI %=[1−(TVt−TV0)/(CVt−CT0)]×100%, TVt is the tumor volume measured each time in the treatment group; TV0 is the tumor volume measured when the treatment group was administered in cages; CVt is the tumor volume measured each time in the control group; CV0 is the tumor volume measured when the control group was administered in cages; 3) the tumor weight inhibition rate was calculated as follows: tumor weight inhibition rate %=(W$_C$−W$_T$)/W$_C$×100%, Wc: tumor weight in the control group, WT: tumor weight in the treatment group.

Results: some of the embodiment compounds of the present disclosure showed excellent anti-tumor effects in animals in vivo, such as embodiment 1, embodiment 18 at a lower dose such as 10 mg/kg-30 mg/kg, once a day, and administered by gavage for 21 days continuously, the embodiment compounds showed a good effect of inhibiting tumor growth, and their T/C ratio was less than 40%; at higher doses, such as 50 mg/kg-100 mg/kg, the tumor inhibitory effect was obvious, and the experimental animals can tolerate it well. At the same dose, the embodiment compounds 1 and 18 had obvious inhibitory effect on the growth of transplanted tumor in nude mice, and the inhibitory effect was better than that of the comparative compound 1 (at a dose of 15 mpk, the inhibitory rate of embodiments 1 and 18 was 82%, while that of the comparative compound 1 was about 60%).

All documents mentioned in the present disclosure are incorporated by reference in this application as if each document is individually incorporated by reference. It should also be understood that after reading the above teaching content of the present disclosure, a person skilled in the art may make various changes or modifications to the present disclosure, which in equivalent form likewise fall within the scope of the claims appended to this disclosure.

The invention claimed is:

1. An acylaminopyrrolo-pyridone compound represented by general formula I, or a pharmaceutically acceptable salt thereof, or an enantiomer, a diastereomer, or a tautomer thereof,

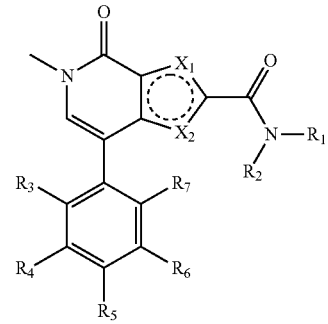

wherein:
R$_1$ is C1-C8 alkyl, 3-8 membered cycloalkyl, C1-C8 alkyl substituted by 3-8 membered cycloalkyl, or

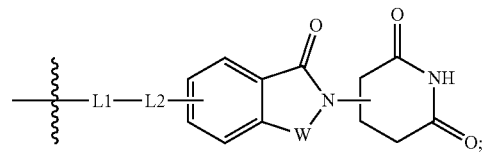

the C1-C8 alkyl, 3-8 membered cycloalkyl, C1-C8 alkyl substituted by 3-8 membered cycloalkyl, and

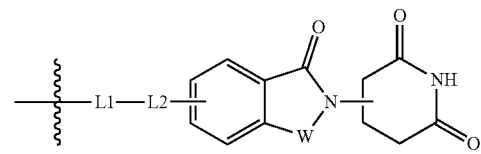

are optionally substituted by one or more substituents, the substituents are independently selected from halogen, cyano, hydroxyl, =O, C1-C6 alkyl, C1-C6 alkyl-O—, and C1-C6 alkyl-(SO$_2$)—; when there are multiple substituents, they are the same or different;
L1 is —(C1-C8 alkyl)-, —(C2-C6 alkynyl)-, or —(C1-C6 alkyl)-(CH$_2$OCH$_2$)$_{m1}$—(C1-C6 alkyl)-;
m1 is 1, 2, 3 or 4;
L2 is a connecting bond,

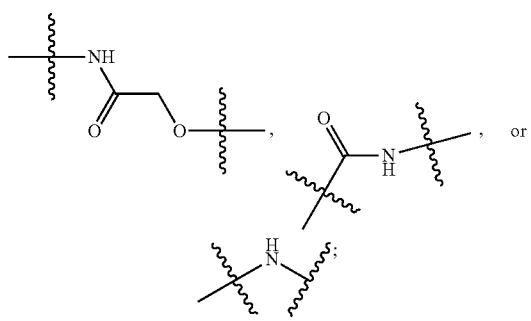

W is —CH$_2$— or —C(O)—;
R$_2$ is hydrogen;
X$_1$ is CH; X$_2$ is NH;
R$_3$ and R$_5$ are hydrogen;

$R_4$ is

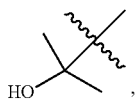

$R_6$ and $R_7$ are independently selected from hydrogen or -L-$R_{10}$;

L is —O—;

$R_{10}$ is independently selected from C1-C6 alkyl, 6-10 membered aryl, or 6-10 membered aryl substituted by one or more substituents; the substituents in the 6-10 membered aryl substituted by one or more substituents are independently halogen or C1-C6 alkyl; when there are multiple substituents, they are the same or different;

or, $R_4$ is C1-C6 alkylsulfone or C1-C6 alkylsulfoxide, $R_6$ and $R_7$ form a 6-membered heterocycloalkyl or a 6-membered heterocycloalkyl substituted by one or more substituents, the heteroatoms in the 6-membered heterocycloalkyl are selected from N and O, and the number of the heteroatoms is 2; the substituent is independently C1-C6 alkyl or =O; when the substituents are multiple, they are the same or different.

2. The acylaminopyrrolo-pyridone compound represented by general formula I as defined in claim 1, or the pharmaceutically acceptable salt thereof, or the enantiomer, the diastereomer, or the tautomer thereof, wherein the compound is as shown in general formula II-1or II-2, or a pharmaceutically acceptable salt thereof, or an enantiomer, a diastereomer, or a tautomer thereof:

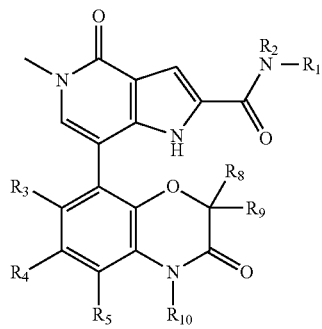

II-1

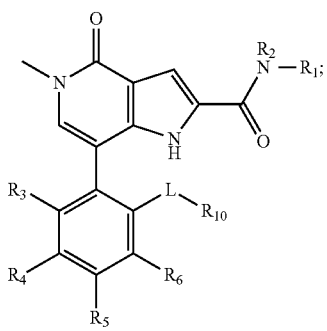

II-2 wherein, $R_8$ and $R_9$ are independently selected from hydrogen or C1-C6 alkyl; in general formula II-1, $R_{10}$ is C1-C6 alkyl; in general formula II-2, $R_{10}$ is 6-10 membered aryl; L is O; and $R_1$, $R_2$, $R_3$, $R_4$, $R_5$ and $R_6$ are as defined in claim 1.

3. The acylaminopyrrolo-pyridone compound represented by general formula I as defined in claim 2, or the pharmaceutically acceptable salt thereof, or the enantiomer, the diastereomer, or the tautomer thereof, wherein $R_1$ is C2-C8 alkyl or 3-8 membered cycloalkyl;

$R_2$ is hydrogen;

$R_3$, $R_5$ and $R_6$ are hydrogen;

$R_8$ and $R_9$ are each independently hydrogen or C1-C3 alkyl.

4. The acylaminopyrrolo-pyridone compound represented by general formula I as defined in claim 1, or the pharmaceutically acceptable salt thereof, or the enantiomer, the diastereomer, or the tautomer thereof, wherein m1 is 3;

or, $R_6$ is H;

or, $R_7$ is -L-$R_{10}$;

or, when $R_1$ is 3-8 membered cycloalkyl, C1-C8 alkyl substituted by 3-8-membered cycloalkyl, the 3-8-membered cycloalkyl and the C1-C8 alkyl substituted by 3-8-membered cycloalkyl are independently substituted by one or more substituents, the substituents are selected from halogen and C1-C6 alkyl.

5. The acylaminopyrrolo-pyridone compound represented by general formula I as defined in claim 1, or the pharmaceutically acceptable salt thereof, or the enantiomer, the diastereomer, or the tautomer thereof, wherein the acylaminopyrrolo-pyridone compound represented by formula (I) is as shown in the scheme 1 or scheme 2;

scheme 1: $X_1$ is CH; $X_2$ is NH;

$R_1$ is C1-C8 alkyl and 3-8 membered cycloalkyl; the C1-C8 alkyl and 3-8 membered cycloalkyl are optionally substituted by one or more substituents;

$R_2$, $R_3$, $R_5$ and $R_6$ are each independently hydrogen;

$R_4$ is

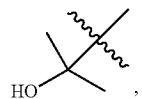

$R_7$ is -L-$R_{10}$;

or, $R_4$ is C1-C6 alkylsulfone or C1-C6 alkylsulfoxide, $R_6$ together with $R_7$ and the carbon atoms they are attached to form a 6 membered heterocycloalkyl or a 6 membered heterocycloalkyl substituted by one or more substituents, the substituents are independently selected from C1-C6 alkyl or =O;

scheme 2: $X_1$ is CH; $X_2$ is NH;

$R_1$ is independently C1-C8 alkyl or

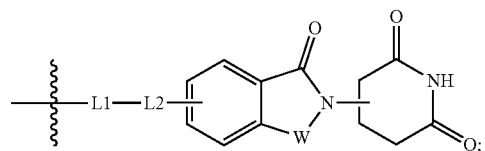

$R_2$, $R_3$, $R_5$ and $R_6$ are each independently hydrogen;

$R_4$ is

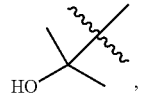

R7 is -L-R10;
  or, R4 is C1-C6 alkylsulfone or C1-C6 alkylsulfoxide, R6 together with R7 and the carbon atoms they are attached to form a 6 membered heterocycloalkyl or a 6 membered heterocycloalkyl substituted by one or more substituents, the substituents are independently selected from C1-C6 alkyl or =O.

6. The acylaminopyrrolo-pyridone compound represented by general formula I as defined in claim 1, or the pharmaceutically acceptable salt thereof, or the enantiomer, the diastereomer, or the tautomer thereof, wherein
  when R1 is C1-C8 alkyl or C1-C8 alkyl substituted by 3-8-membered cycloalkyl; the C1-C8 alkyl in the C1-C8 alkyl and C1-C8 alkyl substituted by 3-8-membered cycloalkyl is independently methyl, ethyl, n-propyl, isopropyl, n-butyl, isobutyl, sec-butyl or tert-butyl;
  or, when R1 is 3-8 membered cycloalkyl or C1-C8 alkyl substituted by 3-8 membered cycloalkyl, the 3-8 membered cycloalkyl in the 3-8 membered cycloalkyl or the C1-C8 alkyl substituted by 3-8 membered cycloalkyl is independently cyclopropyl, cyclobutyl, cyclopentyl and cyclohexyl;
  or, when the substituent in R1 is C1-C6 alkyl, C1-C6 alkyl-O— or C1-C6 alkyl-(SO2)—, the C1-C6 alkyl in the C1-C6 alkyl, the C1-C6 alkyl -O— and the C1-C6 alkyl-(SO2)— is independently methyl, ethyl, n-propyl, isopropyl, n-butyl, isobutyl, sec-butyl or tert-butyl;
  or, when L1 is -(C1-C8 alkyl)-, the C1-C8 alkyl is methyl, ethyl, n-propyl, isopropyl, n-butyl, isobutyl, sec-butyl, tert-butyl, n-pentyl or n-hexyl;
  or, when L1 is —(C2-C6 alkynyl)-, the C2-C6 alkynyl is ethynyl,

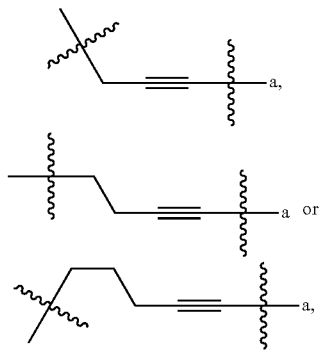

wherein, the terminal a means that it is connected to L2;
  or, when L1 is —(C1-C6 alkyl)-(CH2OCH2)m1—(C1-C6 alkyl)-, the C1-C6 alkyl is independently methyl, ethyl, n-propyl, isopropyl, n-butyl, isobutyl, sec-butyl or tert-butyl;
  or, m1 is 2 or 3;
  or, when R10 is independently C1-C6 alkyl, the C1-C6 alkyl is independently methyl, ethyl, n-propyl, isopropyl, n-butyl, isobutyl, sec-butyl or tert-butyl;
  or, when R10 is independently 6-10 membered aryl or 6-10 membered aryl substituted by one or more substituents, the 6-10 membered aryl in the 6-10 membered aryl or the 6-10 membered aryl substituted by one or more substituents is independently phenyl or naphthyl;
  or, when the substituent in R10 is C1-C6 alkyl, the substituent is independently methyl, ethyl, n-propyl, isopropyl, n-butyl, isobutyl, sec-butyl or tert-butyl;

or, when R6 together with R7 and the carbon atoms they are attached to form a 6 membered heterocycloalkyl or a 6 membered heterocycloalkyl substituted by one or more substituents; the 6 membered heterocycloalkyl in the 6 membered heterocycloalkyl or the 6 membered heterocycloalkyl substituted by one or more substituents is

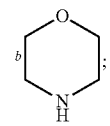

wherein, the terminal b means that it is connected to the benzene ring by a fused ring;
  or, when R6 together with R7 and the carbon atoms they are attached to form a 6 membered heterocycloalkyl or a 6 membered heterocycloalkyl substituted by one or more substituents, and the substituents are independently C1-C6 alkyl, the C1-C6 alkyl is independently methyl, ethyl, n-propyl, isopropyl, n-butyl, isobutyl, sec-butyl or tert-butyl.

7. The acylaminopyrrolo-pyridone compound represented by general formula I as defined in claim 1, or the pharmaceutically acceptable salt thereof, or the enantiomer, the diastereomer, or the tautomer thereof, wherein
  -L1-L2- is

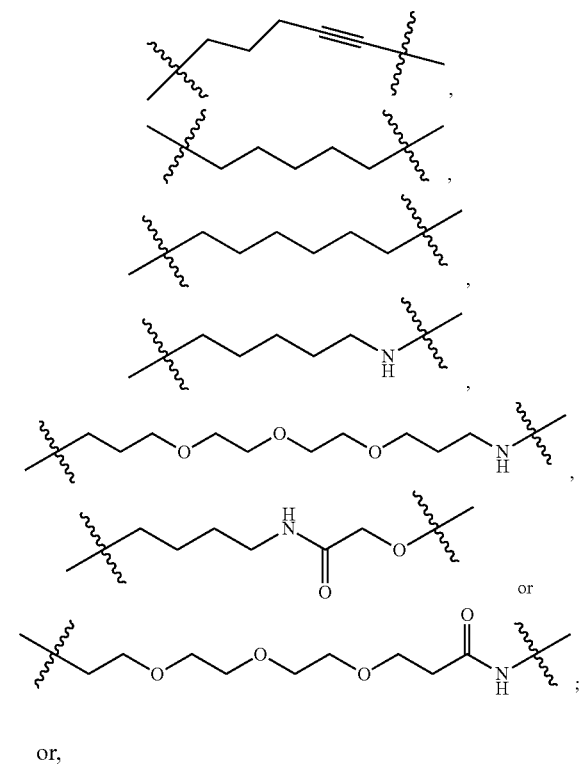

or,

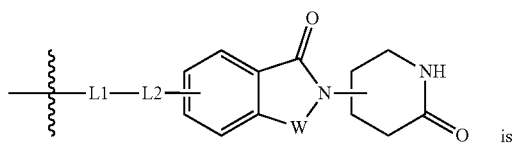

is

-continued

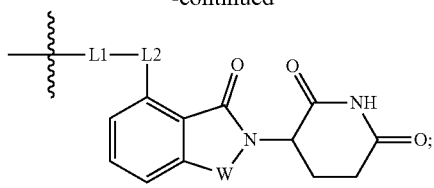

or, $R_4$ is

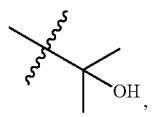 [SMILES: *C(C)(C)O]

$R_7$ is

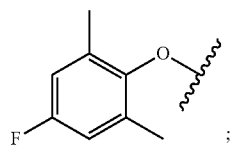 [SMILES: *Oc1c(C)cc(F)cc1C]

or, when $R_6$ together with $R_7$ and the carbon atoms they are attached to form a 6 membered heterocycloalkyl or a 6 membered heterocycloalkyl substituted by one or more substituents,

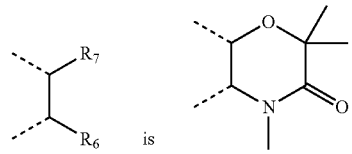

8. The acylaminopyrrolo-pyridone compound represented by general formula I as defined in claim 1, or the pharmaceutically acceptable salt thereof, or the enantiomer, the diastereomer, or the tautomer thereof, wherein $R_1$ is ethyl, isopropyl,

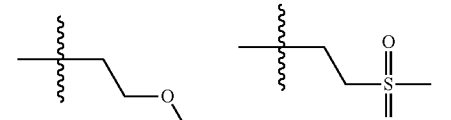

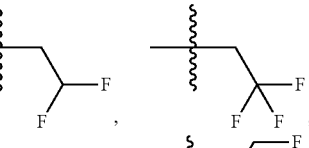

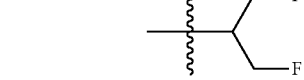

cyclopropyl, cyclopentyl,

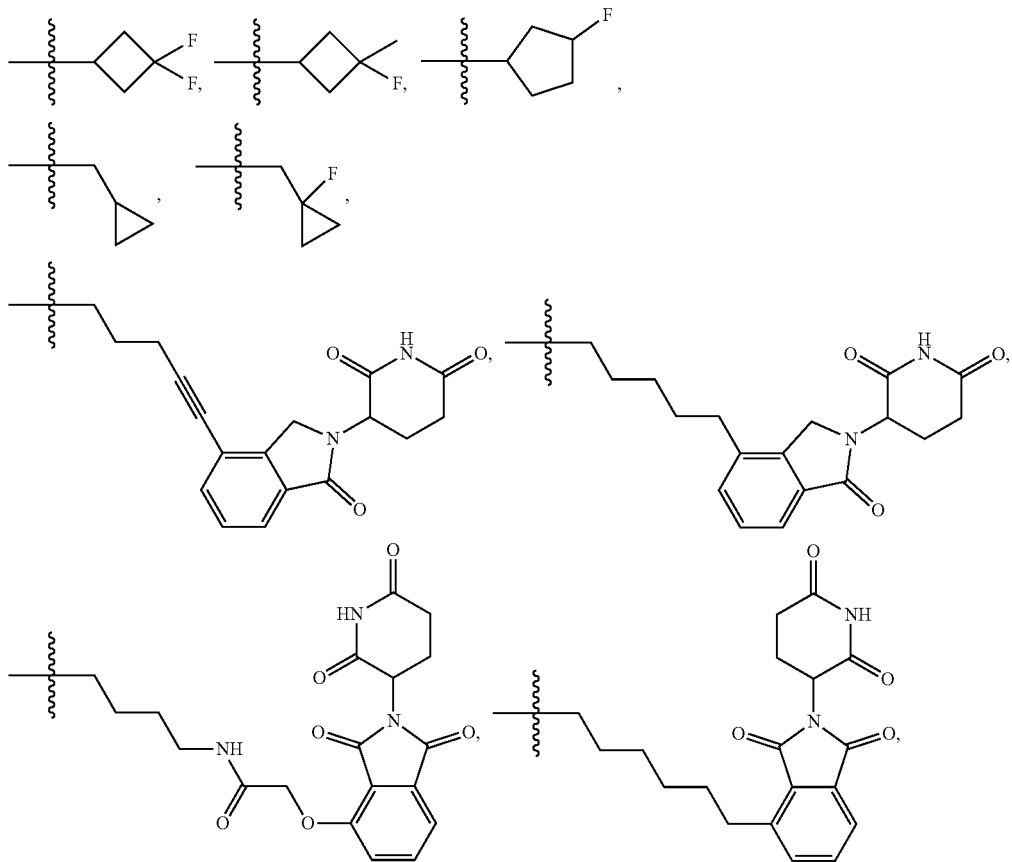

-continued

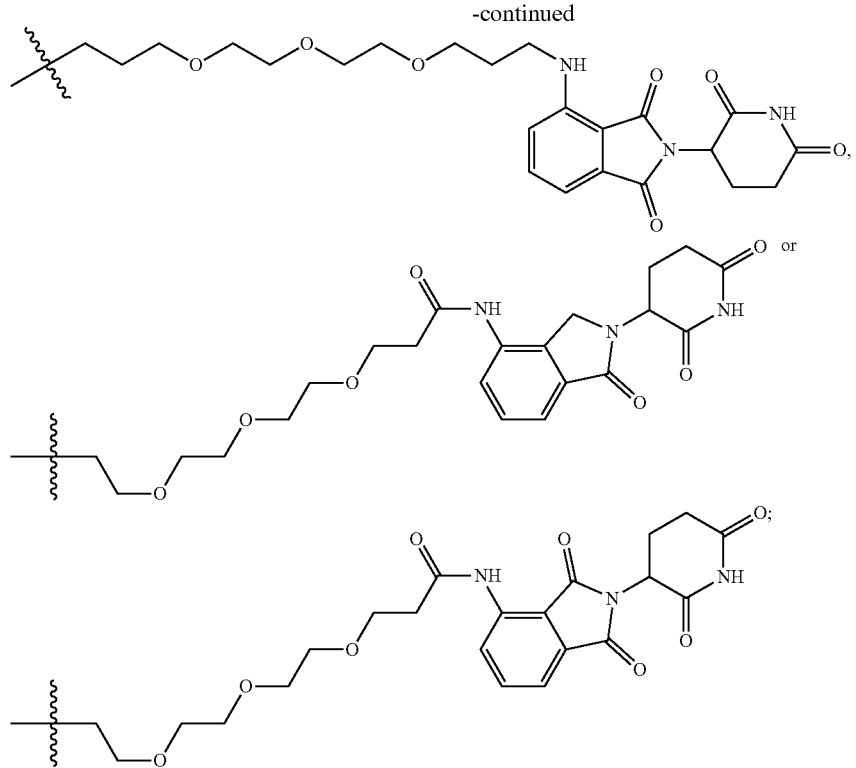

or, when

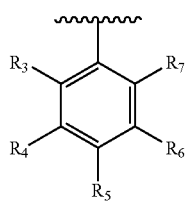 is 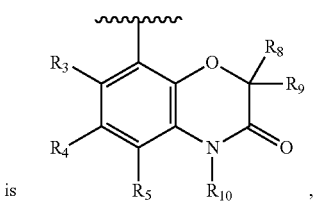, or, when

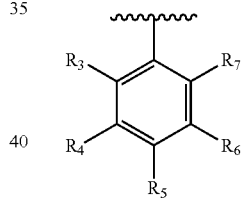 is 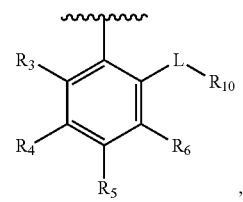,

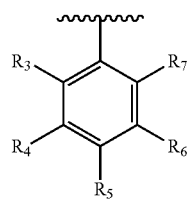 is

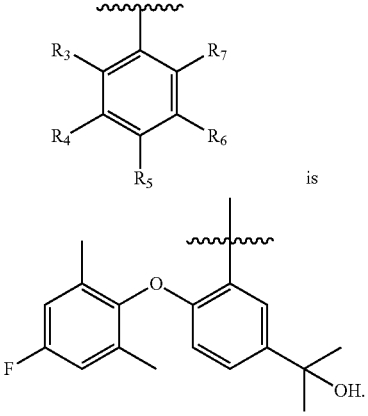

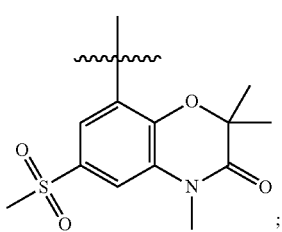;

9. The acylaminopyrrolo-pyridone compound represented by general formula I as defined in claim 1, or the pharmaceutically acceptable salt thereof, or the enantiomer, the diastereomer, or the tautomer thereof, wherein the acylaminopyrrolo-pyridone compound represented by formula I is selected from any one of the structures as follows:

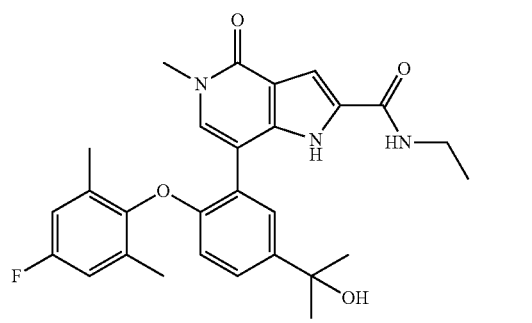
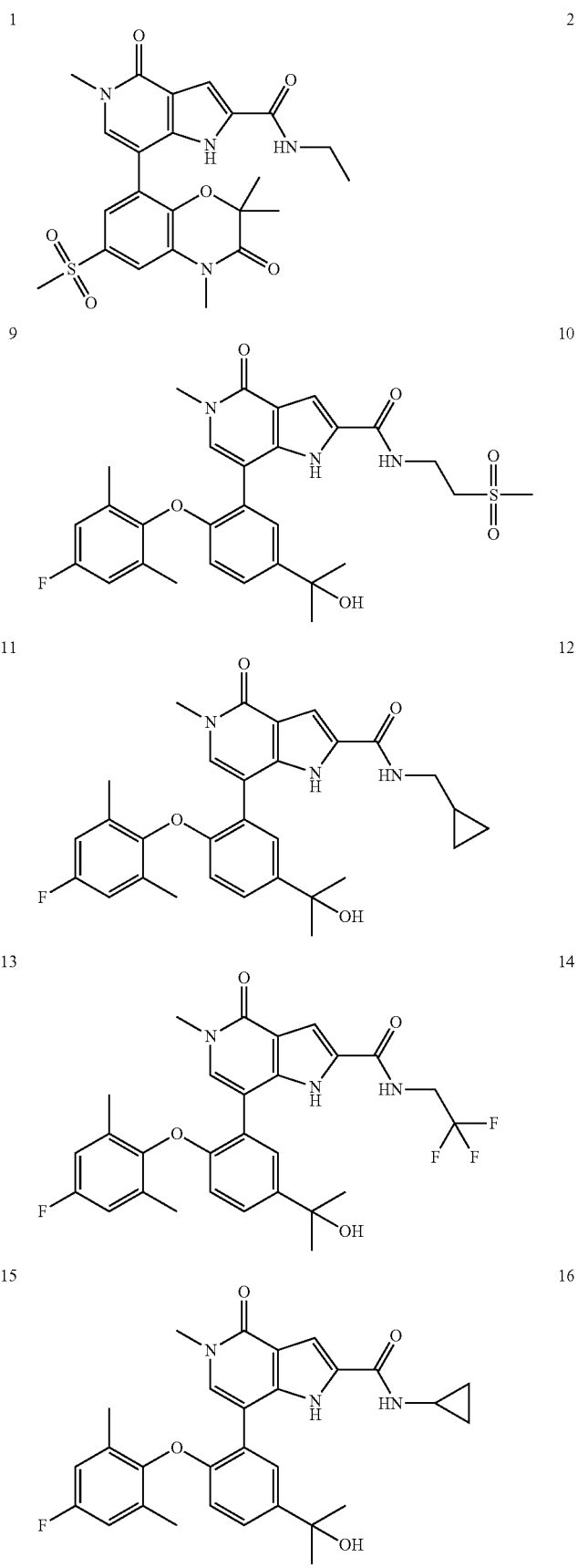

18
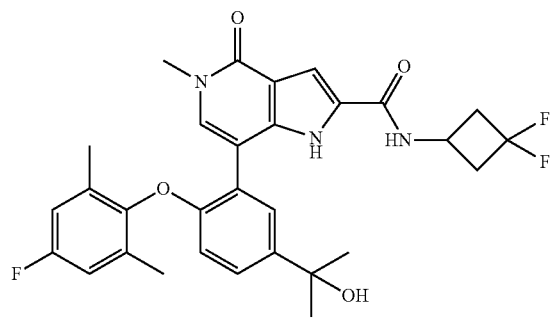
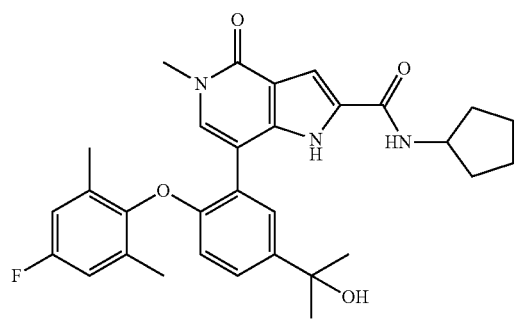
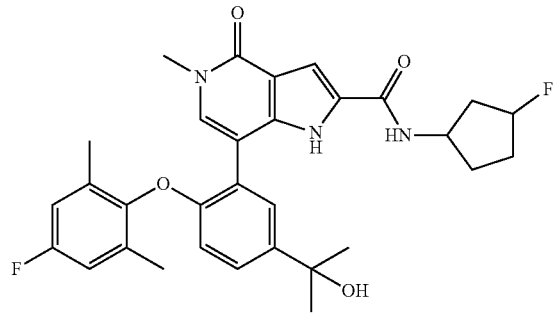
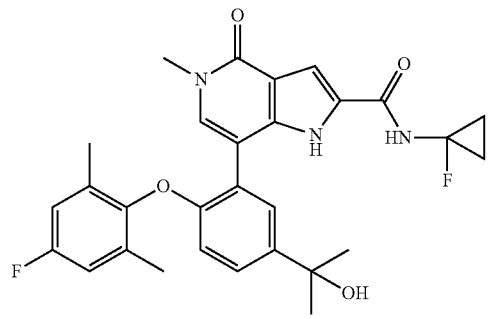
-continued
20
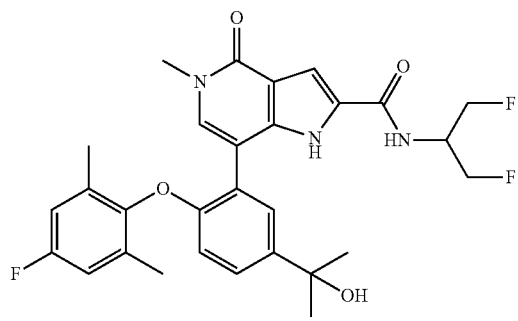
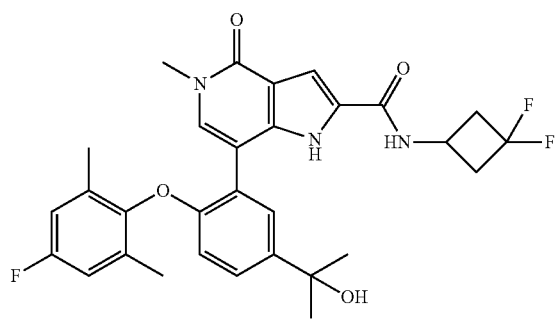
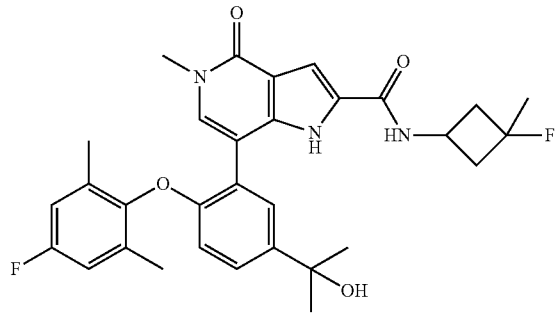
3
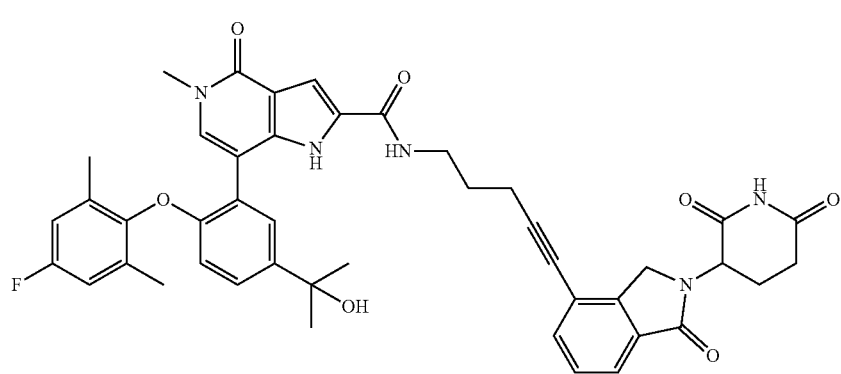

-continued
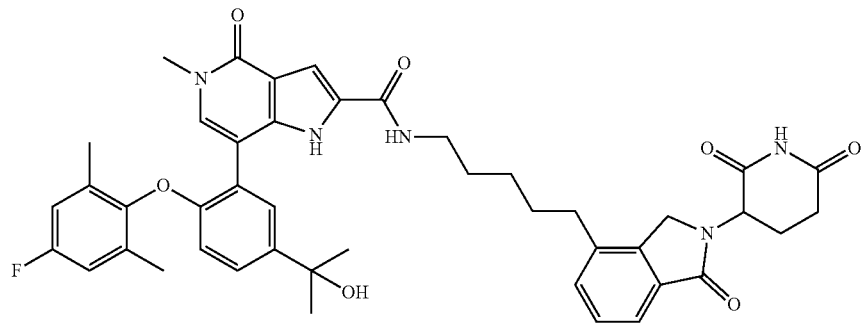
4
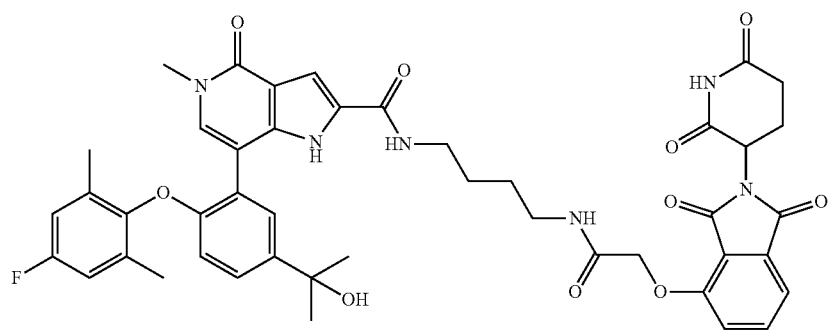
5
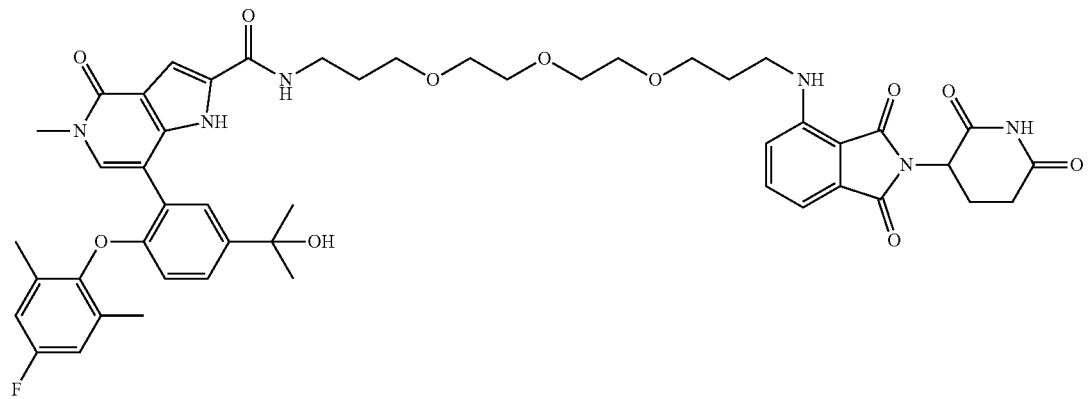
6
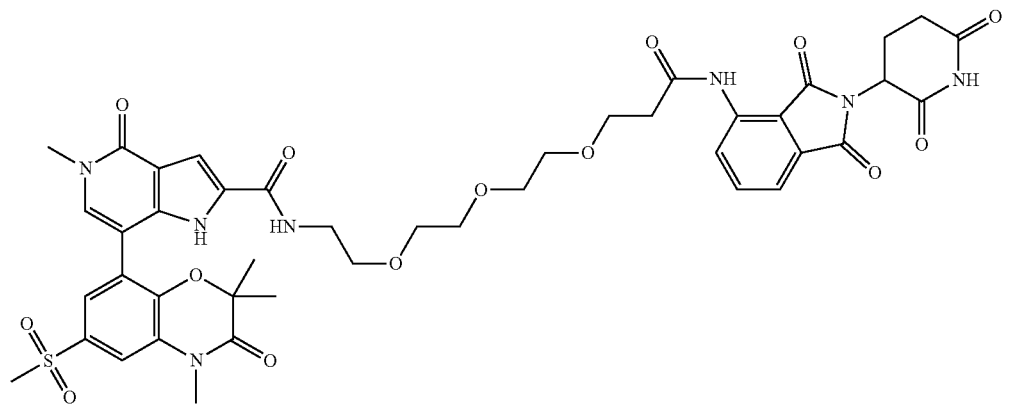
7

-continued
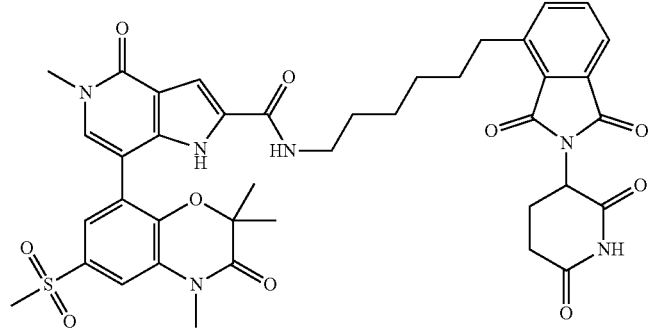
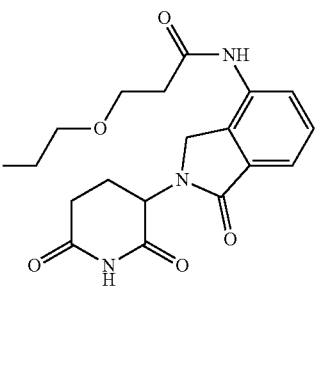
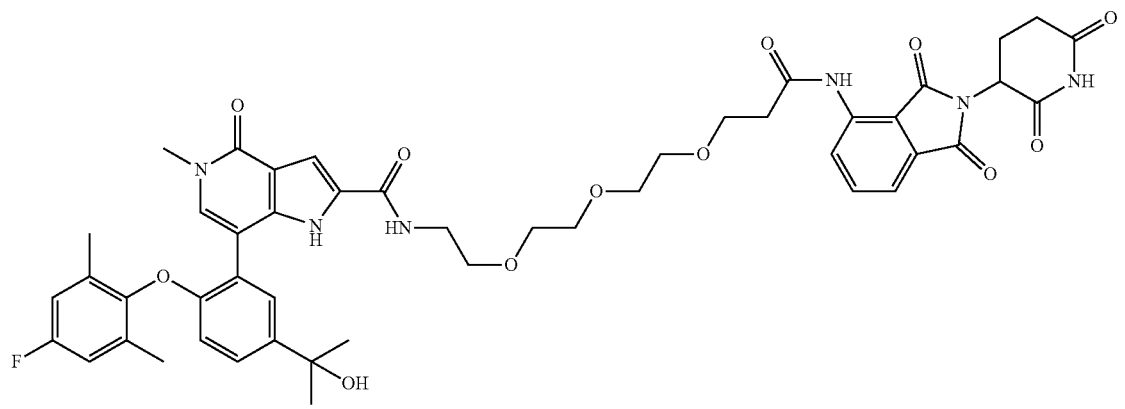
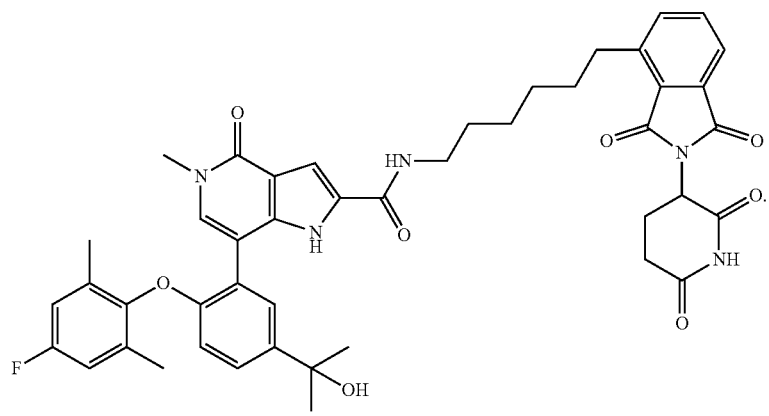

10. A preparation method of the acylaminopyrrolo-pyridone compound represented by formula I as defined in claim 1, wherein the preparation method comprises scheme 1 or scheme 2;

scheme 1 comprises the following steps: in a solvent, in the presence of alkali and condensation reagent, a condensation reaction shown as follows between a compound represented by formula D and R₁R₂NH is carried out to obtain the acylaminopyrrolo-pyridone compound represented by formula I;

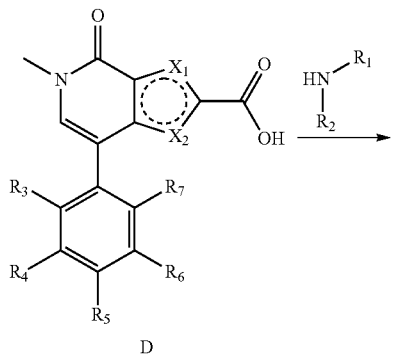

D

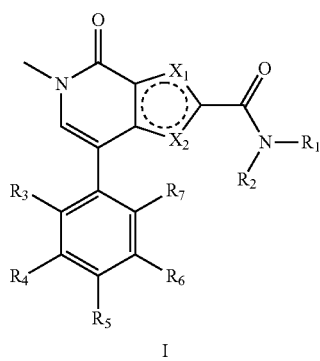

I scheme 2 comprises the following steps: in a solvent, in the presence of alkali and transition metal catalyst, a metal-catalyzed coupling reaction shown as follows between a compound represented by formula A' and a compound represented by formula B is carried out to obtain the acylaminopyrrolo-pyridone compound represented by formula I;

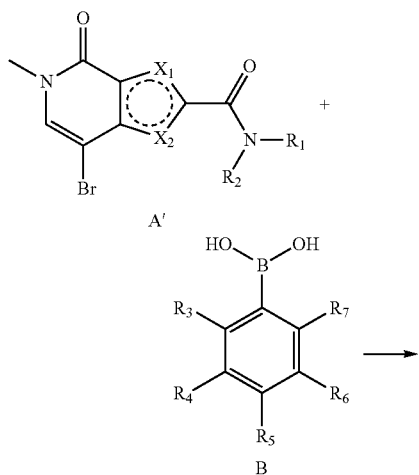

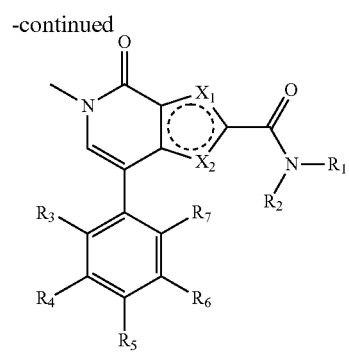

I wherein, $X_1$, $X_2$, $R_1$, $R_2$, $R_3$, $R_4$, $R_5$, $R_6$ and $R_7$ are as defined in claim 1.

11. A pharmaceutical composition, comprising the acylaminopyrrolo-pyridone compound represented by general formula I as defined in claim 1, or the pharmaceutically acceptable salt thereof, or the enantiomer, the diastereomer, or the tautomer thereof, and a pharmaceutically acceptable carrier.

12. A method for inhibiting BRD and/or c-Myc in a subject in need thereof, comprising administering an effective amount of the acylaminopyrrolo-pyridone compound represented by general formula I as defined in claim 1, or the pharmaceutically acceptable salt thereof, or the enantiomer, the diastereomer, or the tautomer thereof to the subject.

13. The acylaminopyrrolo-pyridone compound represented by general formula I as defined in claim 6, or the pharmaceutically acceptable salt thereof, wherein, when $R_1$ is C1-C8 alkyl or C1-C8 alkyl substituted by 3-8-membered cycloalkyl, the C1-C8 alkyl in the C1-C8 alkyl and C1-C8 alkyl substituted by 3-8-membered cycloalkyl is independently methyl, ethyl or isopropyl;

or, when $R_1$ is 3-8 membered cycloalkyl or C1-C8 alkyl substituted by 3-8 membered cycloalkyl, the 3-8 membered cycloalkyl in the 3-8 membered cycloalkyl or the C1-C8 alkyl substituted by 3-8 membered cycloalkyl is independently cyclopropyl or cyclobutyl;

or, when the substituent in $R_1$ is C1-C6 alkyl, C1-C6 alkyl-O— or C1-C6 alkyl-(SO₂)—, the C1-C6 alkyl in the C1-C6 alkyl, the C1-C6 alkyl-O— and the C1-C6 alkyl-(SO₂)— is independently methyl or ethyl;

or, when L1 is —(C1-C8 alkyl)-, the C1-C8 alkyl is n-butyl, n-pentyl or n-hexyl;

or, when L1 is —(C2-C6 alkynyl)-, the C2-C6 alkynyl is

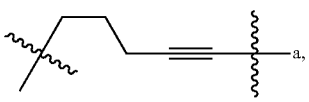

wherein, the terminal a means that it is connected to L2;

or, when L1 is —(C1-C6 alkyl)-(CH₂OCH₂)$_{m1}$—(C1-C6 alkyl)-, the C1-C6 alkyl is independently methyl, ethyl or n-propyl;

or, when $R_{10}$ is independently C1-C6 alkyl, the C1-C6 alkyl is independently methyl or ethyl;

or, when the substituent in $R_{10}$ is C1-C6 alkyl, the substituent is independently methyl or ethyl;

or, when $R_6$ together with $R_7$ and the carbon atoms they are attached to form a 6 membered heterocycloalkyl or a 6 membered heterocycloalkyl substituted by one or more substituents, and the substituents are independently C1-C6 alkyl, the C1-C6 alkyl is independently methyl or ethyl.

14. The acylaminopyrrolo-pyridone compound represented by general formula I as defined in claim 2, or the pharmaceutically acceptable salt thereof, wherein, $R_8$ and $R_9$ are independently C1-C6 alkyl.

\* \* \* \* \*